United States Patent
Shiraishi

Patent Number: 5,253,046
Date of Patent: Oct. 12, 1993

[54] COLOR IMAGE PICKUP APPARATUS FOR OBJECT IMAGE CONVERSION

[75] Inventor: Akihiko Shiraishi, Kawasaki, Japan

[73] Assignee: Canon Kabushiki Kaisha, Tokyo, Japan

[21] Appl. No.: 846,174

[22] Filed: Mar. 5, 1992

[30] Foreign Application Priority Data

| Mar. 7, 1991 | [JP] | Japan | 3-041639 |
| Mar. 7, 1991 | [JP] | Japan | 3-041640 |
| Mar. 7, 1991 | [JP] | Japan | 3-041641 |
| May 1, 1991 | [JP] | Japan | 3-100032 |
| May 1, 1991 | [JP] | Japan | 3-100033 |
| May 1, 1991 | [JP] | Japan | 3-100034 |

[51] Int. Cl.$^5$ .............................. H04N 9/07
[52] U.S. Cl. ...................... 358/43; 358/42; 358/44
[58] Field of Search .............. 358/41, 42, 43, 44, 358/29 C

[56] References Cited

U.S. PATENT DOCUMENTS

| 4,751,567 | 6/1988 | Hashimoto | 358/43 |
| 4,876,591 | 10/1989 | Muramatsu | 358/43 |
| 5,119,180 | 6/1992 | Okamoto | 358/43 |
| 5,150,204 | 9/1992 | Yamazaki | 358/43 |

*Primary Examiner*—James J. Groody
*Assistant Examiner*—Sherrie Hsia
*Attorney, Agent, or Firm*—Robin, Blecker, Daley & Driscoll

[57] ABSTRACT

A color image pickup apparatus for converting an object image into an electrical signal having luminance information and color information includes an image pickup element arranged in a rectangular matrix having pixels arranged at a horizontal pitch $P_H$ and a vertical pitch $P_V$, a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$, and a color information forming circuit having a first color signal forming circuit for forming the color information and a second color signal forming circuit for forming the color information, the first and second color signal forming circuits operating on the basis of first, second, and third color signals output from pixels corresponding to the first, second and third color filters, and a color information forming switch switching between the first and second color signal forming circuits in accordance with a frequency component in a scanning direction of the object image or a direction perpendicular to the scanning direction.

8 Claims, 39 Drawing Sheets

FIG. 1 PRIOR ART

| R | G | B | R |
|---|---|---|---|
| R | G | B | R |
| R | G | B | R |
| R | G | B | R |

FIG. 2 PRIOR ART

| R | G | R | G |
|---|---|---|---|
| R | G | R | G |
| B | G | B | G |
| B | G | B | G |

FIG. 3 PRIOR ART

| Mg | Gr | Mg | Gr |
|----|----|----|----|
| Cy | Ye | Cy | Ye |
| Mg | Gr | Mg | Gr |
| Ye | Cy | Ye | Cy |

FIG. 4A PRIOR ART

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG. 4B PRIOR ART

| R | Y | R | Y | R | Y |
|---|---|---|---|---|---|
| Y | B | Y | B | Y | B |
| R | Y | R | Y | R | Y |
| Y | B | Y | B | Y | B |
| R | Y | R | Y | R | Y |
| Y | B | Y | B | Y | B |

◉ --- BASEBAND

● --- CARRIER OF LUMINANCE SIGNAL

△ --- CARRIER OF COLOR DIFFERENCE SIGNAL

FIG. 7A

TIMING 1

| R | $G_2$ | R | $G_2$ | R | $G_2$ |
|---|---|---|---|---|---|
| $G_1$ | B | $G_1$ | B | $G_1$ | B |
| R | $G_2$ | R | $G_2$ | R | $G_2$ |
| $G_1$ | B | $G_1$ | B | $G_1$ | B |
| R | $G_2$ | R | $G_2$ | R | $G_2$ |
| $G_1$ | B | $G_1$ | B | $G_1$ | B |

FIG. 7B

TIMING 2

| R | $G_1$ | R | $G_1$ | R | $G_1$ |
|---|---|---|---|---|---|
| $G_2$ | B | $G_2$ | B | $G_2$ | B |
| R | $G_1$ | R | $G_1$ | R | $G_1$ |
| $G_2$ | B | $G_2$ | B | $G_2$ | B |
| R | $G_1$ | R | $G_1$ | R | $G_1$ |
| $G_2$ | B | $G_2$ | B | $G_2$ | B |

FIG. 10A

TIMING 1

| R | $Y_2$ | R | $Y_2$ | R | $Y_2$ |
|---|---|---|---|---|---|
| $Y_1$ | B | $Y_1$ | B | $Y_1$ | B |
| R | $Y_2$ | R | $Y_2$ | R | $Y_2$ |
| $Y_1$ | B | $Y_1$ | B | $Y_1$ | B |
| R | $Y_2$ | R | $Y_2$ | R | $Y_2$ |
| $Y_1$ | B | $Y_1$ | B | $Y_1$ | B |

FIG. 10B

TIMING 2

| R | $Y_1$ | R | $Y_1$ | R | $Y_1$ |
|---|---|---|---|---|---|
| $Y_2$ | B | $Y_2$ | B | $Y_2$ | B |
| R | $Y_1$ | R | $Y_1$ | R | $Y_1$ |
| $Y_2$ | B | $Y_2$ | B | $Y_2$ | B |
| R | $Y_1$ | R | $Y_1$ | R | $Y_1$ |
| $Y_2$ | B | $Y_2$ | B | $Y_2$ | B |

FIG. 12

| R | G₂ | R | G₂ | R | G₂ |
|---|---|---|---|---|---|
| G₁ | B | G₁ | B | G₁ | B |
| R | G₂ | R | G₂ | R | G₂ |
| G₁ | B | G₁ | B | G₁ | B |
| R | G₂ | R | G₂ | R | G₂ |
| G₁ | B | G₁ | B | G₁ | B |

FIG. 13

| R | G₁ | R | G₁ | R | G₁ |
|---|---|---|---|---|---|
| G₂ | B | G₂ | B | G₂ | B |
| R | G₁ | R | G₁ | R | G₁ |
| G₂ | B | G₂ | B | G₂ | B |
| R | G₁ | R | G₁ | R | G₁ |
| G₂ | B | G₂ | B | G₂ | B |

FIG. 15

| R | Y₂ | R | Y₂ | R | Y₂ |
|---|----|---|----|---|----|
| Y₁ | B | Y₁ | B | Y₁ | B |
| R | Y₂ | R | Y₂ | R | Y₂ |
| Y₁ | B | Y₁ | B | Y₁ | B |
| R | Y₂ | R | Y₂ | R | Y₂ |
| Y₁ | B | Y₁ | B | Y₁ | B |

FIG. 16

| R | Y₁ | R | Y₁ | R | Y₁ |
|---|----|---|----|---|----|
| Y₂ | B | Y₂ | B | Y₂ | B |
| R | Y₁ | R | Y₁ | R | Y₁ |
| Y₂ | B | Y₂ | B | Y₂ | B |
| R | Y₁ | R | Y₁ | R | Y₁ |
| Y₂ | B | Y₂ | B | Y₂ | B |

| R | G2 | R | G2 | R | G2 |
|---|----|---|----|---|----|
| G1 | B | G1 | B | G1 | B |
| R | G2 | R | G2 | R | G2 |
| G1 | B | G1 | B | G1 | B |
| R | G2 | R | G2 | R | G2 |
| G1 | B | G1 | B | G1 | B |

⊙ : BASEBAND
● : LUMINANCE SIGNAL CARRIER
△ : COLOR DIFFERENCE SIGNAL CARRIER

⊙ : BASEBAND
● : LUMINANCE SIGNAL CARRIER
△ : COLOR DIFFERENCE SIGNAL CARRIER

| R | G₁ | R | G₁ | R | G₁ |
|---|----|---|----|---|----|
| G₂ | B | G₂ | B | G₂ | B |
| R | G₁ | R | G₁ | R | G₁ |
| G₂ | B | G₂ | B | G₂ | B |
| R | G₁ | R | G₁ | R | G₁ |
| G₂ | B | G₂ | B | G₂ | B |

⊙ : BASEBAND
● : LUMINANCE SIGNAL CARRIER
△ : COLOR DIFFERENCE SIGNAL CARRIER

⊙ : BASEBAND
● : LUMINANCE SIGNAL CARRIER
△ : COLOR DIFFERENCE SIGNAL CARRIER

FIG. 29

| R | Y₂ | R | Y₂ | R | Y₂ |
|---|----|---|----|---|----|
| Y₁ | B | Y₁ | B | Y₁ | B |
| R | Y₂ | R | Y₂ | R | Y₂ |
| Y₁ | B | Y₁ | B | Y₁ | B |
| R | Y₂ | R | Y₂ | R | Y₂ |
| Y₁ | B | Y₁ | B | Y₁ | B |

FIG. 30

| R | Y₁ | R | Y₁ | R | Y₁ |
|---|----|---|----|---|----|
| Y₂ | B | Y₂ | B | Y₂ | B |
| R | Y₁ | R | Y₁ | R | Y₁ |
| Y₂ | B | Y₂ | B | Y₂ | B |
| R | Y₁ | R | Y₁ | R | Y₁ |
| Y₂ | B | Y₂ | B | Y₂ | B |

| R | G2 | R | G2 | R | G2 |
|---|---|---|---|---|---|
| G1 | B | G1 | B | G1 | B |
| R | G2 | R | G2 | R | G2 |
| G1 | B | G1 | B | G1 | B |
| R | G2 | R | G2 | R | G2 |
| G1 | B | G1 | B | G1 | B |

⊙ : BASEBAND
● : LUMINANCE SIGNAL CARRIER
△ : COLOR DIFFERENCE SIGNAL CARRIER

⊙ : BASEBAND

● : LUMINANCE SIGNAL CARRIER

△ : COLOR DIFFERENCE SIGNAL CARRIER

| R | G₁ | R | G₁ | R | G₁ |
|---|---|---|---|---|---|
| G₂ | B | G₂ | B | G₂ | B |
| R | G₁ | R | G₁ | R | G₁ |
| G₂ | B | G₂ | B | G₂ | B |
| R | G₁ | R | G₁ | R | G₁ |
| G₂ | B | G₂ | B | G₂ | B |

◉ : BASEBAND
● : LUMINANCE SIGNAL CARRIER
△ : COLOR DIFFERENCE SIGNAL CARRIER

⊙ : BASEBAND

● : LUMINANCE SIGNAL CARRIER

△ : COLOR DIFFERENCE SIGNAL CARRIER

FIG. 47

| R | Y | R | Y | R | Y |
|---|---|---|---|---|---|
| Y | B | Y | B | Y | B |
| R | Y | R | Y | R | Y |
| Y | B | Y | B | Y | B |
| R | Y | R | Y | R | Y |
| Y | B | Y | B | Y | B |

FIG. 48

| R | W | R | W | R | W |
|---|---|---|---|---|---|
| W | B | W | B | W | B |
| R | W | R | W | R | W |
| W | B | W | B | W | B |
| R | W | R | W | R | W |
| W | B | W | B | W | B |

FIG. 52

| R | G₂ | R | G₂ | R | G₂ |
|---|---|---|---|---|---|
| G₁ | B | G₁ | B | G₁ | B |
| R | G₂ | R | G₂ | R | G₂ |
| G₁ | B | G₁ | B | G₁ | B |
| R | G₂ | R | G₂ | R | G₂ |
| G₁ | B | G₁ | B | G₁ | B |

FIG. 53

| R | G₁ | R | G₁ | R | G₁ |
|---|---|---|---|---|---|
| G₂ | B | G₂ | B | G₂ | B |
| R | G₁ | R | G₁ | R | G₁ |
| G₂ | B | G₂ | B | G₂ | B |
| R | G₁ | R | G₁ | R | G₁ |
| G₂ | B | G₂ | B | G₂ | B |

FIG. 56A

TIMING 1

| R | G2 | R | G2 | R | G2 |
|---|----|---|----|---|----|
| G1 | B | G1 | B | G1 | B |
| R | G2 | R | G2 | R | G2 |
| G1 | B | G1 | B | G1 | B |
| R | G2 | R | G2 | R | G2 |
| G1 | B | G1 | B | G1 | B |

FIG. 56B

TIMING 2

| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

COLOR IMAGE PICKUP APPARATUS FOR OBJECT IMAGE CONVERSION

BACKGROUND OF THE INVENTION

1. Field of the Invention

The present invention relates to a color image pickup apparatus having an image pickup element having a plurality of light-receiving elements (pixels) two-dimensionally arranged in a matrix form and, more particularly, to a color image pickup apparatus capable of outputting an image having a high resolution, reduced moire, and a high S/N ratio.

2. Related Background Art

FIGS. 1, 2, and 3 are views showing color filter arrays of conventional color solid-state image pickup elements. FIG. 1 shows a stripe filter array in which red filters R, green filters G, and blue filters B are vertically arranged to constitute the respective stripe filters. FIGS. 2 and 3 are views showing so-called mosaic filters. FIG. 2 shows a filter array in which green filters G are constituted by stripe filters, and red and blue filters R and B are vertically arranged every two filters. The set of two red filters and two blue filters is arranged parallel to the green filters G constituting each stripe filter. In a filter array of FIG. 3, magenta, green, cyan, and yellow filters Mg, Gr, Cy, and Ye are arranged in an illustrated order to constitute a unit array consisting of eight color filters, i.e., two horizontal pixels and four vertical pixels.

The image pickup elements having the above color filter arrays pose the following problems. In the image pickup element having the color filters having the array shown in FIG. 1, a color difference signal carrier is generated at a frequency $\frac{1}{2}$ of the sampling frequency. For this reason, an image pickup operation cannot be performed up to a frequency $\frac{1}{2}$ of the Nyquist frequency serving as the sampling frequency to decrease an image resolution.

In the image pickup element having the array shown in FIG. 2, since the R and B filters having different bands are arranged in the vertical direction, a color moire pattern tends to be formed in the vertical direction. In particular, image quality deteriorates in chromatic images.

Since the image pickup element having the color filters constituting the array shown in FIG. 3 is constituted by complementary color filters having wide bands, a color moire tends not to be formed as compared with the image pickup element having the color filters constituting the array shown in FIG. 2. However, color difference signals have low S/N ratios. When an output signal is to be quantized to perform digital processing, the color difference signals have large quantization errors, resulting in inconvenience.

In both the image pickup elements having the color filters constituting the arrays shown in FIGS. 2 and 3, color difference signal carriers are generated at a frequency $\frac{1}{2}$ of the sampling frequency. For this reason, data up to a frequency $\frac{1}{2}$ of the Nyquist frequency as the sampling frequency cannot be picked up.

To the contrary, there is provided an image pickup element having a color filter array called a Bayer array, as disclosed in U.S. Pat. No. 3,971,065. As shown in FIGS. 4A and 4B, assume that the horizontal pitch of pixels in the image pickup element is defined as $P_H$ and the vertical pitch of pixels in the image pickup element is defined as $P_V$. In this case, green filters G (FIG. 4A) or luminance signal filters Y (FIG. 4B) are arranged to have an offset sampling structure having a horizontal pitch $2P_H$ and the vertical pitch $P_V$ and offset by $P_H$ in the horizontal direction. Red and blue filters R and B are arranged to have a rectangular matrix sampling structure having a horizontal pitch $2P_H$ and a vertical pitch $2P_V$. When the image pickup element having this Bayer array is used, a good image having less moire and a high S/N ratio is obtained, as is well known.

The following problem is still posed even if the image pickup elements having the Bayer arrays are used. FIGS. 5A and 5B are graphs showing the first quadrants obtained when the positions of signal carriers generated by the color filter image pickup elements shown in FIGS. 4A and 4B are plotted on the two-dimensional frequency plane $(f_H, f_V)$. In the color filter image pickup element shown in FIG. 4A, an output signal from each pixel is directly switched to form a luminance signal. In the color filter image pickup element shown in FIG. 4B, only signals from pixels corresponding to the Y filters are used to form a luminance signal.

In either case, color difference signal carriers are apparently generated at $(\frac{1}{2}P_H, 0)$ and $(0, \frac{1}{2}P_V)$ in the frequency space. That is, even in the image pickup element having the Bayer array, the color difference signal carrier is generated at a frequency $\frac{1}{2}$ of the sampling frequency. Therefore, data cannot be picked up to a frequency $\frac{1}{2}$ of the Nyquist frequency serving as the sampling frequency.

In a simple synthetic luminance signal obtained by switching output signals from the pixels or using signals from the pixels corresponding to G filters, a luminance signal having accurate spectral characteristics cannot be obtained. Therefore, the resultant luminance signal adversely affects color reproducibility or the like of an output image. For this reason, processing for substituting only a low-frequency component of the luminance signal with a luminance signal having accurate spectral characteristics has been conventionally performed. However, a circuit for forming the luminance signal having the accurate spectral characteristics becomes large in size.

SUMMARY OF THE INVENTION

The present invention has been made in consideration of the above situation, and has as its object to provide a color image pickup apparatus capable of obtaining a luminance signal whose spectral characteristics are corrected by a simple technique, and generating a good image having a high resolution, reduced moire, and a high S/N ratio.

In order to achieve the above object according to the first aspect of the present invention, there is provided a color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$; and c. color information forming means having first color signal forming means for forming the color information in accordance with a difference signal between a second color signal and a coincidence signal obtained by causing only a first color signal which is output from a pixel belonging to the same column as that of the second color signal to coincide therewith and a difference signal between a third color signal and a coincidence signal obtained by causing only a first color signal which is output from a pixel belonging to the same column as that of the third color signal to coincide therewith, and second color signal forming means for forming the color information in accordance with a difference signal between a second color signal and a coincidence signal obtained by causing only a first color signal which is output from a pixel belonging to the same row as that of the second color signal to coincide therewith and a difference signal between a third color signal and a coincidence signal obtained by causing only a first color signal which is output from a pixel belonging to the same row as that of the third color signal to coincide therewith, the first and second color signal forming means operating on the basis of the first, second, and third color signals output from pixels corresponding to the first, second, and third color filters, and the color information forming means switching between the first and second color signal forming means in accordance with a frequency component in a scanning direction of the object image or a direction perpendicular to the scanning direction.

According to the arrangement of the first aspect, the color difference signal carriers of a monochrome object at positions $(\frac{1}{2}P_H,0)$ and $(0,\frac{1}{2}P_V)$ in the two-dimensional frequency space are canceled to suppress the moire.

In order to achieve the above object according to the second aspect of the present invention, there is provided a color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$; and c. color information forming means for forming the color information in accordance with a difference signal between a second color signal and a coincidence signal obtained by causing only a first color signal which is output from a pixel belonging to the same column or row as that of the second color signal to coincide therewith and a difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters.

According to the arrangement of the second aspect, the color difference signal carriers of a monochrome object at positions $(\frac{1}{2}P_H,0)$ and $(0,\frac{1}{2}P_V)$ in the two-dimensional frequency space are canceled.

In order to achieve the above object according to still another aspect of the present invention, there is provided a color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. an optical low-pass filter having an optical member for splitting an incident beam into two beams spaced apart from each other by a distance D in a direction forming an angle $\theta$ with respect to a scanning direction of the image pickup element in clockwise and counterclockwise directions, the optical low-pass filter being arranged in an image pickup optical system and satisfying the following condition:

$0.8P_H P_V/|P_H \sin\theta + P_V \cos\theta| \leq D \leq 1.2P_H P_V/|P_H \sin\theta + P_V \cos\theta|$ for $0 \leq \theta \leq \pi/2$; and d. color information forming means for forming the color information in accordance with a difference signal between a second color signal and a coincidence signal obtained by causing only a first color signal which is output from a pixel belonging to the same column or row as that of the second color signal to coincide therewith and a difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters.

In order to achieve the above object according to the fourth aspect of the present invention, there is provided a color image pickup apparatus for converting an object image into an electrical signal having luminance information and color information, comprising:

an image pickup element arranged in a rectangular matrix having pixels arranged at a horizontal pitch $P_H$ and a vertical pitch $P_V$;

a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

an optical low-pass filter having an optical member for splitting an incident beam into two beams spaced apart from each other by a distance D in a direction forming an angle $\theta$ with respect to a scanning direction of the image pickup element in clockwise and counterclockwise directions, the optical low-pass filter being arranged in an image pickup optical system and satisfying the following condition:

$0.8P_H P_V/|P_H \sin\theta + P_V \cos\theta| \leq D \leq 1.2P_H P_V/|P_H \sin\theta + P_V \cos\theta|$ for $0 \leq \theta \leq \pi/2$; and color information forming means having first color signal forming means for forming the color information in accordance with a difference signal between a second color signal and a coincidence signal obtained by causing only a first color signal which is output from a pixel belonging to the same column as that of the second color signal to coincide therewith and a difference signal between a third color signal and a coincidence signal obtained by causing only a first color signal which is output from a pixel belonging to the same column as that of the third color signal to coincide therewith, and second color signal forming means for forming the color information in accordance with a difference signal between a second color signal and a coincidence signal obtained by causing only a first color signal which is output from a pixel belonging to the same row as that of the second color signal to coincide therewith and a difference signal between a third color signal and a coincidence signal obtained by causing only a first color signal which is output from a pixel belonging to the same row as that of the third color signal to coincide therewith, the first and second color signal forming means operating on the basis of the first, second, and third color signals output from pixels corresponding to the first, second, and third color filters, and the color information forming means switching between the first and second color signal forming means in accordance with a frequency component in a scanning direction of the object image or a direction perpendicular to the scanning direction.

In the arrangement of the third aspect, the color difference signal carrier of the monochrome object at the position $(\frac{1}{2}P_H,0)$ or $(0,\frac{1}{2}P_V)$ in the two-dimensional frequency space is canceled, and the color difference signal carriers at positions $(\pm\frac{1}{2}P_H,\pm\frac{1}{2}P_V)$ are suppressed. In the arrangement of the fourth aspect, the color difference signal carriers of the monochrome object at the positions $(\frac{1}{2}P_H,0)$ and $(0,\frac{1}{2}P_V)$ in the two-dimensional frequency space are canceled, and the color difference signal carriers at the positions $(\pm\frac{1}{2}P_H,\pm\frac{1}{2}P_V)$ are suppressed.

In order to achieve the above object according to the fifth aspect of the present invention, there is provided a color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. an optical low-pass filter having an optical member for splitting an incident beam into two beams spaced apart from each other by a distance D in a direction forming an angle $\theta$ with respect to a scanning direction of the image pickup element in clockwise and counterclockwise directions, the optical low-pass filter being arranged in an image pickup optical system and satisfying the following condition:

$0.8P_HP_V/|P_H\sin\theta+P_V\cos\theta|\leq D\leq$
$1.2P_HP_V/|P_H\sin\theta+P_V\cos\theta|$
for $0\leq\theta\leq\pi/2$;

d. color information forming means for forming the color information in accordance with a first difference signal between a second color signal and a coincidence signal obtained by causing only a first color signal which is output from a pixel belonging to the same column or row as that of the second color signal to coincide therewith and a second difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters; and e. luminance information forming means for forming the luminance information by multiplying the first and second difference signals with constants, respectively, and adding the multiplied signals to a signal obtained by synthesizing at least one of the first, second, and third color signals.

In order to achieve the above object according to the sixth aspect of the present invention, there is provided a color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. an optical low-pass filter having an optical member for splitting an incident beam into two beams spaced apart from each other by a distance D in a direction forming an angle $\theta$ with respect to a scanning direction of the image pickup element in clockwise and counterclockwise directions, the optical low-pass filter being arranged in an image pickup optical system and satisfying the following condition:

$0.8P_HP_V/|P_H\sin\theta+P_V\cos\theta|\leq D\leq$
$1.2P_HP_V/|P_H\sin\theta+P_V\cos\theta|$
for $0\leq\theta\leq\pi/2$;

d. color information forming means having first color signal forming means for forming the color information in accordance with a first difference signal between a second color signal and a coincidence signal obtained by causing only a first color signal which is output from a pixel belonging to the same column as that of the second color signal to coincide therewith and a second difference signal between a third color signal and a coincidence signal obtained by causing only a first color signal which is output from a pixel belonging to the same column as that of the third color signal to coincide therewith, and second color signal forming means for forming the color information in accordance with a third difference signal between a second color signal and a coincidence signal obtained by causing only a first color signal which is output from a pixel belonging to the same row as that of the second color signal to coincide therewith and a fourth difference signal between a third color signal and a coincidence signal obtained by causing only a first color signal which is output from a pixel belonging to the same row as that of the third color signal to coincide therewith, the first and second color signal forming means operating on the basis of the first, second, and third color signals output from pixels corresponding to the first, second, and third color filters, and the color information forming means switching between the first and second color signal forming means in accordance with a frequency component in a scanning direction of the object image or a direction perpendicular to the scanning direction; and e. luminance information forming means for forming the luminance information by multiplying the first or third difference signal and the second or fourth difference signal with constants, respectively, and adding the multiplied signals to a signal obtained by synthesizing at least one of the first, second, and third color signals.

In the arrangement of the fifth aspect, the color difference signal carrier of the monochrome object at the position ($\frac{1}{2}P_H,0$) or ($0,\frac{1}{2}P_V$) in the two-dimensional frequency space is canceled, and the color difference signal carriers at positions ($\pm\frac{1}{2}P_H,\pm\frac{1}{2}P_V$) are suppressed. In the arrangement of the sixth aspect, the color difference signal carriers of the monochrome object at the positions ($\frac{1}{2}P_H,0$) and ($0,\frac{1}{2}P_V$) in the two-dimensional frequency space are canceled, and the color difference signal carriers at the positions ($\pm\frac{1}{2}P_H,\pm\frac{1}{2}P_V$) are suppressed.

In addition, in the arrangements of the fifth and sixth aspects, the signals obtained by multiplying the difference signals with the constants are added to the synthesized luminance information to correct spectral characteristics of the luminance information.

In order to achieve the above object according to the seventh aspect of the present invention, there is provided a color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. color information forming means for forming the color information in accordance with a first difference signal between a second color signal and a coincidence signal obtained by causing only a first color signal which is output from a pixel belonging to the same column or row as that of the second color signal to coincide therewith and a second difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters; and d. luminance information forming means for forming the luminance information by multiplying the first and second difference signals with constants, respectively, and adding the multiplied signals to a signal obtained by synthesizing at least one of the first, second, and third color signals.

In the arrangement of the seventh aspect, the color difference signal carrier of the monochrome object at the position ($\frac{1}{2}P_H,0$) or ($0,\frac{1}{2}P_V$) in the two-dimensional frequency space is canceled. In addition, in the arrangements of the seventh aspect, the signals obtained by multiplying the first and second difference signals with the constants are added to the synthesized luminance information to correct spectral characteristics of the luminance information.

In order to achieve the above object according to the eighth aspect of the present invention, there is provided a color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling pitch $2P_V$;

c. color information forming means having first color signal forming means for forming the color information in accordance with a first difference signal between a second color signal and a coincidence signal obtained by causing only a first color signal which is output from a pixel belonging to the same column as that of the second color signal to coincide therewith and a second difference signal between a third color signal and a coincidence signal obtained by causing only a first color signal which is output from a pixel belonging to the same column as that of the third color signal to coincide therewith, and second color signal forming means for forming the color information in accordance with a third difference signal between a second color signal and a coincidence signal obtained by causing only a first color signal which is output from a pixel belonging to the same row as that of the second color signal to coincide therewith and a fourth difference signal between a third color signal and a coincidence signal obtained by causing only a first color signal which is output from a pixel belonging to the same row as that of the third color signal to coincide therewith, the first and second color signal forming means operating on the basis of the first, second, and third color signals output from pixels corresponding to the first, second, and third color filters, and the color information forming means switching between the first and second color signal forming means in accordance with a frequency component in a scanning direction of the object image or a direction perpendicular to the scanning direction; and d. luminance information forming means for forming the luminance information by multiplying the first or third difference signal and the second or fourth difference signal with constants, respectively, and adding the multiplied signals to a signal obtained by synthesizing at least one of the first, second, and third color signals.

In the arrangement of the eighth aspect, the color difference signal carriers of the monochrome object at the positions ($\frac{1}{2}P_H,0$) and ($0,\frac{1}{2}P_V$) in the two-dimensional frequency space are canceled, and the moire can be suppressed.

In addition, in the arrangement of the eighth aspect, the signals obtained by multiplying the first and second or third and fourth difference signals with the constants are added to the synthesized luminance information to correct spectral characteristics of the luminance information.

BRIEF DESCRIPTION OF THE DRAWINGS

FIG. 1 is a view showing a conventional color filter array;

FIG. 2 is a view showing another conventional color filter array;

FIG. 3 is a view showing still another conventional color filter array;

FIGS. 4A and 4B are views showing conventional color filter arrays having Bayer arrays, respectively;

FIGS. 7A and 7B are views for explaining the first embodiment;

FIGS. 10A and 10B are views for explaining the second embodiment;

FIG. 12 is a view for explaining signal processing of the third embodiment;

FIG. 13 is a view for explaining signal processing of the fourth embodiment of the present invention;

FIG. 15 is a view for explaining signal processing of the fifth embodiment;

FIG. 16 is a view for explaining signal processing of the sixth embodiment of the present invention;

FIG. 29 is a view for explaining the ninth embodiment;

FIG. 30 is a view for explaining the tenth embodiment of the present invention;

FIG. 47 is a view showing a Bayer array;

FIG. 48 is a view showing another Bayer array;

FIG. 52 is a view for explaining signal processing of the eighteenth and twentieth embodiments;

FIG. 53 is a view for explaining signal processing of the nineteenth and twenty-first embodiments;

FIGS. 56A and 56B are views for explaining the twenty-second embodiment; and

DETAILED DESCRIPTION OF THE PREFERRED EMBODIMENTS

The present invention will be described in detail with reference to the preferred embodiments hereinafter.

Figure 6:
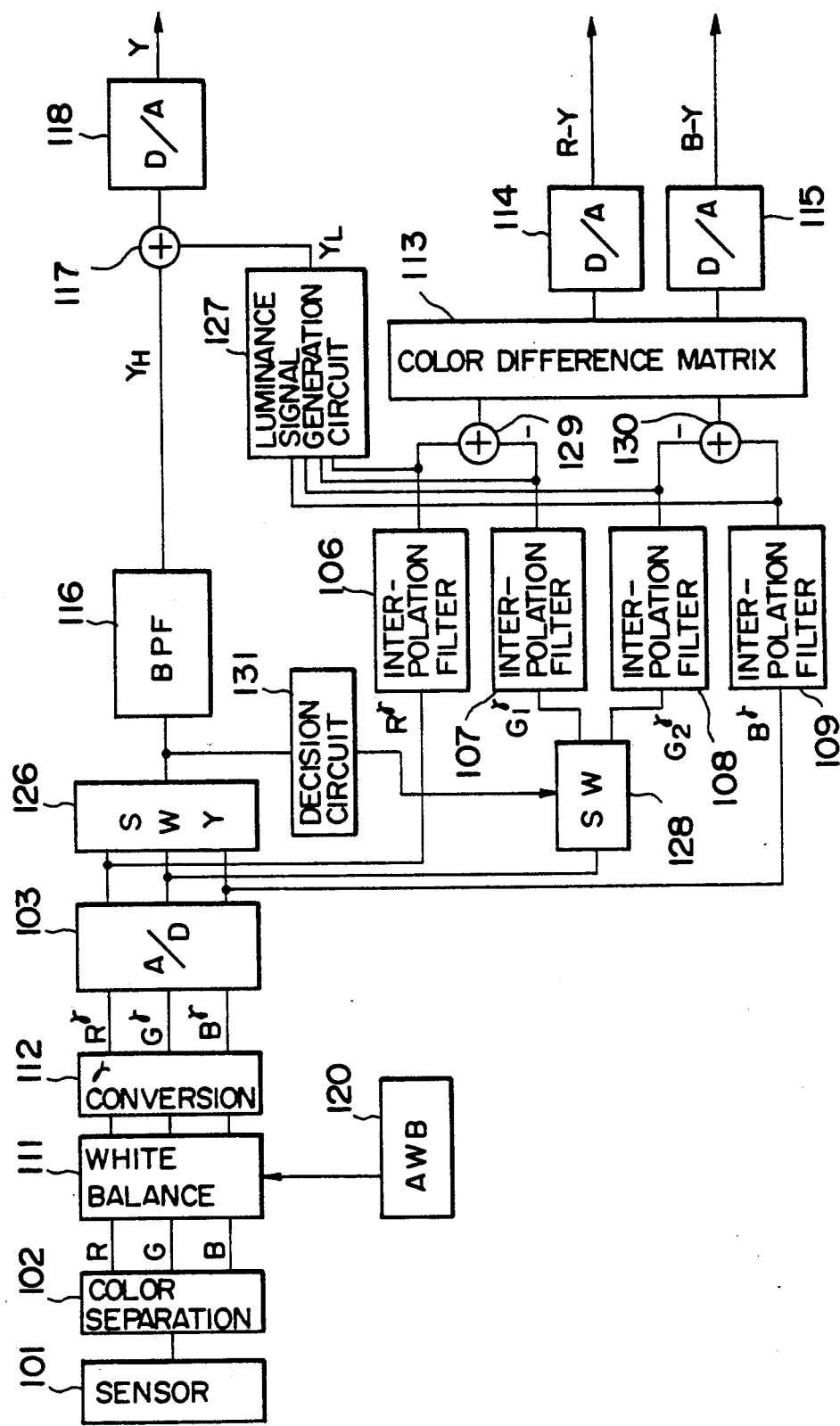
FIG. 6 is a block diagram showing the first embodiment of the present invention.

FIG. 6 is a block diagram showing a "color image pickup apparatus" as the first embodiment of the present invention. R, G, and B filters (filter array) having a Bayer array shown in FIG. 4A are arranged in an image pickup element (sensor) 101. An image signal read from the image pickup element 101 pixel by pixel is separated into R, G, and B signals by a color separation unit 102. The R, G, and B signals are subjected to white balance adjustment by a white balance unit 111 on the basis of color temperature information obtained from a white balance sensor (AWB) 120. An output from the white balance unit 111 is subjected to $\gamma$ correction by a Y correction unit 112. An output from the Y correction unit 112 is A/D-converted by an A/D (analog-to-digital) converter 103.

A luminance signal is switched by a switch circuit (SWY) 126 and is rearranged in a read order. The rearranged luminance signal is extracted as a high-frequency component $Y_H$ of the luminance signal by a band-pass filter (BPF) 116. The high-frequency component $Y_H$ of the luminance signal is added by an adder 117 to a low-frequency component $Y_L$ of the luminance signal obtained by a technique to be described later. A sum signal is converted by a D/A (digital-to-analog) converter 118, and an analog signal is output from the D/A converter 118.

Meanwhile, a G (γth power) signal of outputs from the A/D converter 103 is separated by a switch (SW) 128 into $G_1$ (γth power) and $G_2$ (γth power) signals located at the illustrated positions at two timings, i.e., timing 1 shown in FIG. 7A and timing 2 shown in FIG. 7B. This operation can be performed by operating the switch 128, e.g., every horizontal scanning period. Switching between timings 1 and 2 is performed by a decision circuit 131 (to be described later) in accordance with a luminance signal of an object to be photographed. The separated $G_1$ (γth power) and $G_2$ (γth power) signals are input together with an R (γth power) signal and a B (γth power) signal to interpolation filters 106, 107, 108, and 109, respectively, thereby obtaining coincident R (γth power), $G_1$ (γth power), $G_2$ (γth power), and B (γth power) signals. In addition to the coincidence operation by interpolation in the interpolation filters 106 to 109, linear processing such as two-dimensional low-pass filtering and edge emphasis are performed. Since these processing operations are linear processing operations, they can be performed after addition and matrix processing (both will be described in detail later).

The coincident R (γth power) and $G_1$ (γth power) signals are subtracted from each other by an adder 129, and an (R (γth power)—$G_1$ (γth power)) signal is output from the adder 129. Similarly, the B (γth power) and $G_2$ (γth power) signals are subtracted from each other by an adder 130, and a (B (γth power)—$G_2$ (γth power)) signal is output from the adder 130. These output signals are input to a color difference matrix processor 113, and the following matrix operation is performed to derive color difference signals R-Y and B-Y.

$$\begin{bmatrix} R - Y \\ B - Y \end{bmatrix} = \begin{bmatrix} 0.70 & -0.11 \\ -0.30 & +0.89 \end{bmatrix} \begin{bmatrix} R^\gamma - G_1^\gamma \\ B^\gamma - G_2^\gamma \end{bmatrix}$$

Assume that switching between the $G_1$ (γth power) and $G_2$ (γth power) signals is performed at timing 1 shown in FIG. 7A, and that a monochrome object at a position ($\frac{1}{2}P_H$,0) in the frequency space is picked up by the image pickup element 101. This object represents vertical fringes having a period $2P_H$. For this object, conditions R (γth power)=$G_1$ (γth power) and B (γth power)=$G_2$ (γth power) are established. The color difference signals, i.e., the (R (γth power)—$G_1$ (γth power)) signal and the (B (γth power)—$G_2$ (γth power)) signal respectively output from the adders 129 and 130 become zero. Therefore, the color difference signals R-Y and B-Y output from the color difference matrix processor 113 become zero and are not output. This indicates that the carrier of the color difference signal at the frequency point ($\sim P_H$,0) is canceled. In other words, the carrier of the R (γth power) signal is set in phase with that of the $G_1$ (γth power), and the carrier of the B (γth power) is also in phase with that of the $G_2$ (γth power) signal at the frequency point ($\frac{1}{2}P_H$,0). Since these difference signals, i.e., the (R (γth power)—$G_1$ (γth power)) signal and the (B (γth power)—$G_2$ (γth power)) signal, can cancel their carriers at this frequency, the carriers of the color difference signals are not generated.

Assume that switching between the $G_1$ (γth power) and $G_2$ (γth power) signals is performed at timing 2 shown in FIG. 7B, and that a monochrome object at a position (0,$\frac{1}{2}P_V$) in the frequency space is picked up by the image pickup element 101. This object represents horizontal fringes having a period $2P_V$. For this object, the color difference signals, i.e., the (R (γth power)—G (γth power)) signal and the (B (γth power)—$G_2$ (γth power)) signal respectively output from the adders 129 and 130 become zero. Therefore, the color difference signals R-Y and B-Y output from the color difference matrix processor 113 become zero and are not output. This indicates that the carrier of the color difference signal at the frequency point (0,$\frac{1}{2}P_V$) is canceled. In other words, the carrier of the R (γth power) signal is set in phase with that of the $G_1$ (γth power), and the carrier of the B (γth power) is also in phase with that of the $G_2$ (γth power) signal at the frequency point (0,$\frac{1}{2}P_V$). Since these difference signals, i.e., the (R (γth power)—$G_2$ (γth power)) signal and the (B (γth power)—$G_2$ (γth power)) signal, can cancel their carriers at this frequency, the carriers of the color difference signals are not generated.

These color difference signals are converted into analog signals by D/A converters 114 and 115, and the analog signals are output. A low-frequency component of the luminance signal is generated by a luminance signal generation circuit 127 in accordance with outputs from the interpolation filters 106, 107, 108, and 109 as follows:

$$Y_L = 0.30R \text{ (γth power)} + [\alpha G_1 \text{ (γth power)} + \beta G_2 \text{ (γth power)}] + 0.11B \text{ (γth power)}$$
$$\text{for } \alpha + \beta = 0.59$$

The low-frequency component is added to the high-frequency component $Y_H$ by the adder 117. An output from the adder 117 is D/A-converted by the D/A converter 118, and an analog signal is output. Since the color difference signals R-Y and B-Y and the low-frequency component $Y_L$ of the luminance signal generally have bandwidths sufficiently narrower than the luminance signal Y, operations of the adders 129 and 130, the color difference matrix processor 113, the luminance signal generation circuit 127, and the like for the interpolated coincident R (γth power), $G_1$ (γth power), $G_2$ (γth power), and B (γth power) signals may be performed using a clock having a lower clock rate than that of the luminance signal Y by extraction or interlacing.

When an output signal obtained from the processing block shown in FIG. 6 is to be recorded in an analog form, the D/A converters 118, 114, and 115 are necessary. However, when this output signal is recorded in a digital form in a magnetic medium, an optomagnetic medium, an E²PROM (Electrically Erasable PROM), or the like, the above D/A converters can be omitted.

Figure 8A:
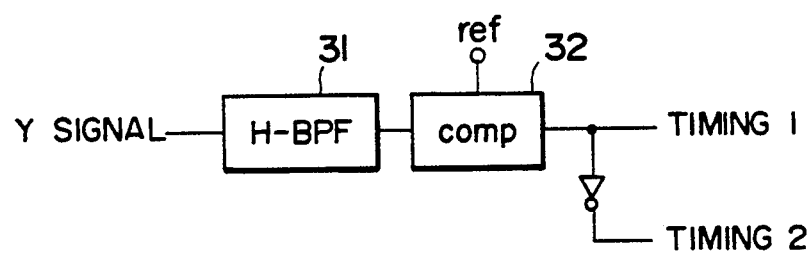
FIGS. 8A and 8B are block diagrams showing arrangements of a decision circuit.

The decision circuit 131 will be described below. FIG. 8A shows an arrangement of this decision circuit. The luminance signal Y output from the switch circuit 126 is filtered by a band-pass filter (H-BPF) 31 in the horizontal direction to extract a horizontal high-frequency component. This extracted output is input to a comparator (comp) 32 and is compared with a predetermined threshold value. When it is decided that the input signal level is higher than the threshold level and the horizontal high-frequency component value is large, timing 1 is selected to cancel the carrier of the horizontal color difference signal (FIG. 7A). Otherwise, timing 2 for canceling the vertical color difference signal carrier is selected (FIG. 7B).

Figure 8B:
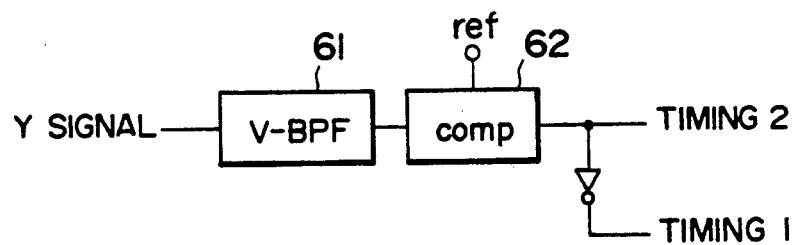

The decision circuit 131 may have an arrangement show in FIG. 8B. That is, the luminance signal Y output from the switch circuit 126 is filtered by a band-pass filter (V-BPF) 61 in the vertical direction to extract a vertical high-frequency component. This extracted output is input to a comparator (comp) 62 and is compared with a predetermined threshold value. When it is decided that the input signal level is higher than the threshold level and the vertical high-frequency component value is large, timing 2 is selected to cancel the carrier of the vertical color difference signal. Otherwise, timing 1 for canceling the horizontal color difference signal carrier is selected.

As described above, since the color filters constituting the Bayer array are used, the moire is minimized, and a high S/N ratio can be obtained. In addition, since a signal processing means suitable for the Bayer array is used, a higher resolution can be obtained.

The second embodiment of the present invention will be described below.

Figure 9:
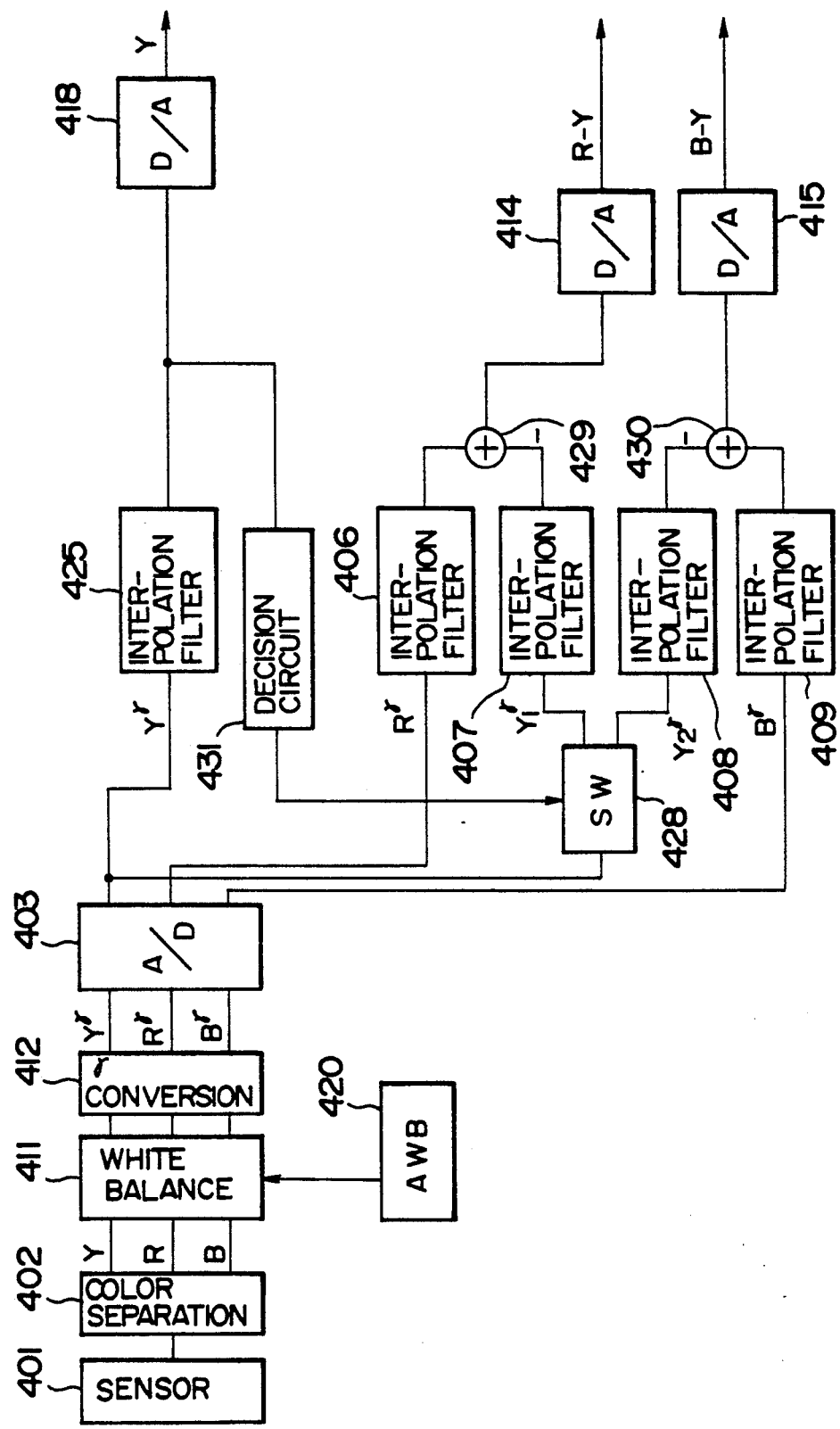
FIG. 9 is a block diagram showing the second embodiment.

FIG. 9 is a block diagram showing a signal processing section of a color image pickup apparatus of the second embodiment of the present invention. Y, R, and B filters having a Bayer array shown in FIG. 4B are arranged in an image pickup element (sensor) 401. An image signal read from the image pickup element 401 pixel by pixel is separated into Y, R, and B signals by a color separation unit 402. The Y, R, and B signals are subjected to white balance adjustment by a white balance unit 411 on the basis of color temperature information obtained from a white balance sensor (AWB) 420. An output from the white balance unit 411 is subjected to $\gamma$ correction by a $\gamma$ correction unit 412. An output from the $\gamma$ correction unit 412 is A/D-converted by an A/D (analog-to-digital) converter 403.

A luminance signal is obtained as follows. An offset sampling structure of a Y ($\gamma$th power) signal is two-dimensionally interpolated by an interpolation filter 425, and an output from the interpolation filter 425 is D/A-converted by a D/A converter 418. An analog signal is thus output from the D/A converter 418. In addition to the coincidence operation by interpolation in the interpolation filter 425, processing such as two-dimensional low-pass filtering and edge emphasis are performed.

Meanwhile, a Y ($\gamma$th power) signal of outputs from the A/D converter 403 is separated by a switch 428 into $Y_1$ ($\gamma$th power) and $Y_2$ ($\gamma$th power) signals located at the illustrated positions at two timings, i.e., timing 1 shown in FIG. 10A and timing 2 shown in FIG. 10B. This operation can be performed by operating the switch 428, e.g., every horizontal scanning period. Switching between timings 1 and 2 is performed by a decision circuit 431 (to be described later) in accordance with a luminance signal of an object to be photographed.

The separated $Y_1$ ($\gamma$th power) and $Y_2$ ($\gamma$th power) signals are input together with an R ($\gamma$th power) signal and a B ($\gamma$th power) signal to interpolation filters 406, 407, 408, and 409, respectively, thereby obtaining coincident R ($\gamma$th power), $Y_1$ ($\gamma$th power), $Y_2$ ($\gamma$th power), and B ($\gamma$th power) signals. In addition to the coincidence operation by interpolation in the interpolation filters 406 to 409, linear processing such as two-dimensional low-pass filtering and edge emphasis are performed. Since these processing operations are linear processing operations, they can be performed after addition (to be described in detail later). The coincident R ($\gamma$th power) and Y ($\gamma$th power) signals are subtracted from each other by an adder 429, and an R-Y signal is output from the adder 429. Similarly, the B ($\gamma$th power) and $Y_2$ ($\gamma$th power) signals are subtracted from each other by an adder 430, and a B-Y signal is output from the adder 430.

Assume that switching between the $Y_1$ ($\gamma$th power) and $Y_2$ ($\gamma$th power) signals is performed at timing 1 shown in FIG. 10A, and that a monochrome object at a position ($\frac{1}{2}P_H$,0) in the frequency space is picked up by the image pickup element 401. This object represents vertical fringes having a period $2P_H$. For this object, the signals R-Y and B-Y respectively output from the adders 429 and 430 become zero and are not output. This indicates that the carrier of the color difference signal at the frequency point ($\frac{1}{2}P_H$,0) is canceled. In other words, the carrier of the R ($\gamma$th power) signal is set in phase with that of the $Y_1$ ($\gamma$th power), and the carrier of the B ($\gamma$th power) is also in phase with that of the $Y_2$ ($\gamma$th power) signal at the frequency point ($\frac{1}{2}P_H$,0). Since these R-Y and B-Y can cancel their carriers at this frequency, the carriers of the color difference signals are not generated.

Assume that switching between the $Y_1$ ($\gamma$th power) and $Y_2$ ($\gamma$th power) signals is performed at timing 2 shown in FIG. 10B, and that a monochrome object at a position (0,$\frac{1}{2}P_V$) in the frequency space is picked up by the image pickup element 401. This object represents horizontal fringes having a period $2P_V$. For this object, the color difference signals R-Y and B-Y respectively output from the adders 429 and 430 become zero. Therefore, the color difference signals R-Y and B-Y output from the adders 429 and 430 become zero and are not output. This indicates that the carrier of the color difference signal at the frequency point (0,$\frac{1}{2}P_V$) is canceled. In other words, the carrier of the R ($\gamma$th power) signal is set in phase with that of the $Y_1$ ($\gamma$th power), and the carrier of the B ($\gamma$th power) is also in phase with that of the $Y_2$ ($\gamma$th power) signal at the frequency point (0,$\frac{1}{2}P_V$). Since these difference signals R-Y and B-Y can cancel their carriers at this frequency, the carriers of the color difference signals are not generated. These color difference signals are converted into analog signals by D/A converters 414 and 415, and the analog signals are output. Since the color difference signals R-Y and B-Y generally have bandwidths sufficiently narrower than the luminance signal Y, operations of the adders 429 and 430, and the like for the interpolated coincident R ($\gamma$th power), $Y_1$ ($\gamma$th power), $Y_2$ ($\gamma$th power), and B ($\gamma$th power) signals may be performed using a clock having a lower clock rate than that of the luminance signal Y by extraction or interlacing.

When an output signal obtained from the processing block shown in FIG. 4A or 4B is to be recorded in an analog form, the D/A converters 418, 414, and 415 are necessary. However, when this output signal is recorded in a digital form in a magnetic medium, an opto-magnetic medium, an $E^2PROM$ (Electrically Erasable PROM), or the like, the above D/A converters can be omitted.

Figure 5A:
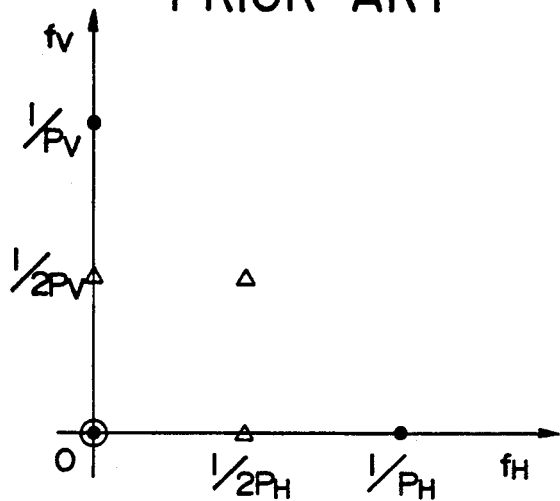
FIGS. 5A and 5B are graphs showing the positions of signal carriers of the color filter arrays shown in FIGS. 4A and 4B, respectively.
Figure 5B:
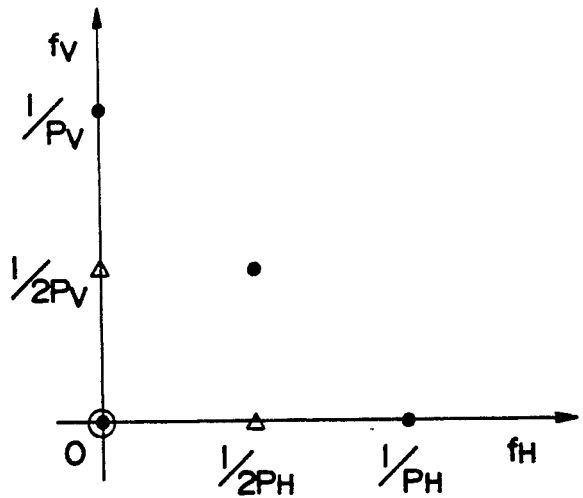

The decision circuit 431 will be described below. In this embodiment, the decision circuit shown in FIG. 8A or 8B is used. In the arrangement of FIG. 8A, the luminance signal Y output from the interpolation filter 425 is filtered by a band-pass filter (H-BPF) 31 in the horizontal direction to extract a horizontal high-frequency component. This extracted output is input to a comparator (comp) 32 and is compared with a predetermined threshold value. When it is decided that the input signal level is higher than the threshold level and the horizontal high-frequency component value is large, timing 1 is selected to cancel the carrier of the horizontal color difference signal (FIG. 5A). Otherwise, timing 2 for canceling the vertical color difference signal carrier is selected (FIG. 5B).

In the arrangement of the decision circuit shown in FIG. 8B, the luminance signal Y output from the interpolation filter 425 is filtered by a band-pass filter (V-BPF) 61 in the vertical direction to extract a vertical high-frequency component. This extracted output is input to a comparator (comp) 62 and is compared with a predetermined threshold value. When it is decided that the input signal level is higher than the threshold level and the vertical high-frequency component value is large, timing 2 is selected to cancel the carrier of the vertical color difference signal. Otherwise, timing 1 for canceling the horizontal color difference signal carrier is selected (see FIGS. 10A and 10B).

As described above, since the color filters constituting the Bayer array are used in the image pickup element, appropriate signal processing is performed. There is therefore provided a color image pickup apparatus capable of producing an image having a high resolution, less moire, and a high S/N ratio.

The present invention will be described in more detail with reference to still another embodiment of the present invention.

Figure 11:
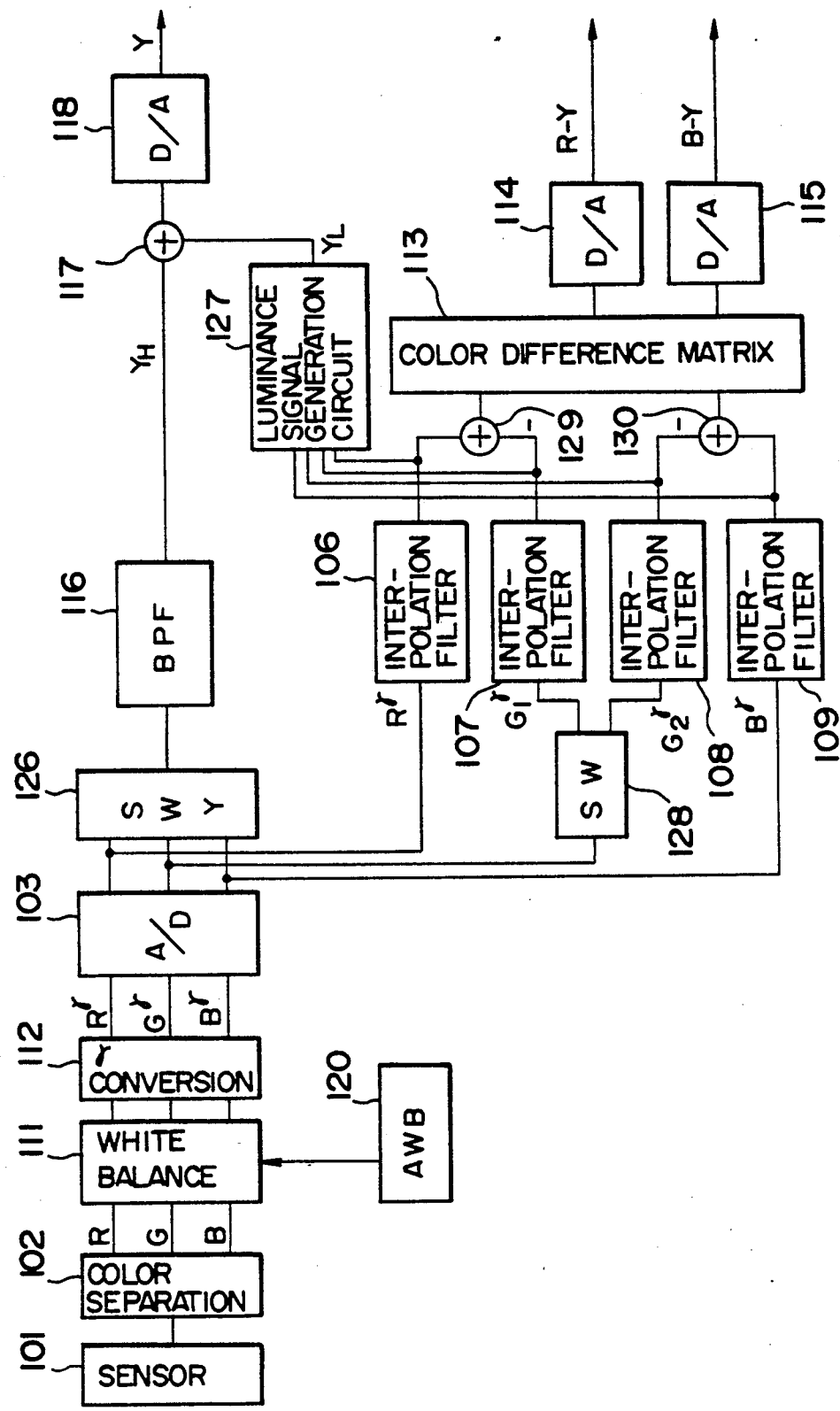
FIG. 11 is a block diagram showing the third embodiment of the present invention.

FIG. 11 is a block diagram showing a "color image pickup apparatus" as the third embodiment of the present invention. R, G, and B filters (filter array) having a Bayer array shown in FIG. 4A are arranged in an image pickup element (sensor) 101. An image signal read from the image pickup element 101 pixel by pixel is separated into R, G, and B signals by a color separation unit 102. The R, G, and B signals are subjected to white balance adjustment by a white balance unit 111 on the basis of color temperature information obtained from a white balance sensor (AWB) 120. An output from the white balance unit 111 is subjected to $\gamma$ correction by a $\gamma$ correction unit 112. An output from the $\gamma$ correction unit 112 is A/D-converted by an A/D (analog-to-digital) converter 103.

A luminance signal is switched by a switch circuit (SWY) 126 and is rearranged in a read order. The rearranged luminance signal is extracted as a high-frequency component $Y_H$ of the luminance signal by a band-pass filter (BPF) 116. The high-frequency component $Y_H$ of the luminance signal is added by an adder 117 to a low-frequency component $Y_L$ of the luminance signal obtained by a technique to be described later. A sum signal is converted by a D/A (digital-to-analog) converter 118, and an analog signal is output from the D/A converter 118.

Meanwhile, a G ($\gamma$th power) signal of outputs from the A/D converter 103 is separated by a switch (SW) 128 into $G_1$ ($\gamma$th power) and $G_2$ ($\gamma$th power) signals located at the illustrated positions in FIG. 12. This operation can be performed by operating the switch 128, e.g., every horizontal scanning period. The separated $G_1$ ($\gamma$th power) and $G_2$ ($\gamma$th power) signals are input together with an R ($\gamma$th power) signal and a B ($\gamma$th power) signal to interpolation filters 106, 107, 108, and 109, respectively, thereby obtaining coincident R ($\gamma$th power), $G_1$ ($\gamma$th power), $G_2$ ($\gamma$th power), and B ($\gamma$th power) signals. In addition to the coincidence operation by interpolation in the interpolation filters 106 to 109, linear processing such as two-dimensional low-pass filtering and edge emphasis are performed. Since these processing operations are linear processing operations, they can be performed after addition and matrix processing (both will be described in detail later).

The coincident R ($\gamma$th power) and $G_1$ ($\gamma$th power) signals are subtracted from each other by an adder 129, and an (R ($\gamma$th power)−$\gamma G_1$ ($\gamma$th power)) signal is output from the adder 129. Similarly, the B ($\gamma$th power) and $G_2$ ($\gamma$th power) signals are subtracted from each other by an adder 130, and a (B ($\gamma$th power)−$G_2$ ($\gamma$th power)) signal is output from the adder 130. These output signals are input to a color difference matrix processor 113, and the following matrix operation is performed to derive color difference signals R-Y and B-Y.

$$\begin{bmatrix} R - Y \\ B - Y \end{bmatrix} = \begin{bmatrix} 0.70 & -0.11 \\ -0.30 & +0.89 \end{bmatrix} \begin{bmatrix} R^\gamma - G_1^\gamma \\ B^\gamma - G_2^\gamma \end{bmatrix}$$

Assume that a monochrome object at a position ($\frac{1}{2}P_H$,0) in the frequency space is picked up by the image pickup element 101. This object represents vertical fringes having a period $2P_H$. For this object, conditions R ($\gamma$th power)=$G_1$ ($\gamma$th power) and B ($\gamma$th power)=$G_2$ ($\gamma$th power) are established. The color difference signals, i.e., the (R ($\gamma$th power)−$G_1$ ($\gamma$th power)) signal and the (B ($\gamma$th power)−$G_2$ ($\gamma$th power)) signal respectively output from the adders 129 and 130 become zero. Therefore, the color difference signals R-Y and B-Y output from the color difference matrix processor 113 become zero and are not output. This indicates that the carrier of the color difference signal at the frequency point ($\frac{1}{2}P_H$,0) is canceled. In other words, the carrier of the R ($\gamma$th power) signal is set in phase with that of the $G_1$ ($\gamma$th power), and the carrier of the B ($\gamma$th power) is also in phase with that of the $G_2$ ($\gamma$th power) signal at the frequency point ($\frac{1}{2}P_H$,0). Since these difference signals, i.e., the (R ($\gamma$th power)−$G_1$ ($\gamma$th power)) signal and the (B ($\gamma$th power)−$G_2$ ($\gamma$th power)) signal, can cancel their carriers at this frequency, the carriers of the color difference signals are not generated. These color difference signals are converted into analog signals by D/A converters 114 and 115, and the analog signals are output. A low-frequency component of the luminance signal is generated by a luminance signal generation circuit 127 in accordance with outputs from the interpolation filters 106, 107, 108, and 109 as follows:

$Y_L = 0.30R$ ($\gamma$th power) + [$\alpha G_1$ ($\gamma$th power) + $\beta G_2$ ($\gamma$th power)] + $0.11B$ ($\gamma$th power)

for $\alpha + \beta = 0.59$

The low-frequency component is added to the high-frequency component $Y_H$ by the adder 117. An output from the adder 117 is D/A-converted by the D/A converter 118, and an analog signal is output. Since the color difference signals R-Y and B-Y and the low-frequency component $Y_L$ of the luminance signal generally have bandwidths sufficiently narrower than the luminance signal Y, operations of the adders 129 and 130, the color difference matrix processor 113, the luminance signal generation circuit 127, and the like for the interpolated coincident R ($\gamma$th power), $G_1$ ($\gamma$th power), $G_2$ ($\gamma$th power), and B ($\gamma$th power) signals may be performed using a clock having a lower clock rate than that of the luminance signal Y by extraction or interlacing.

As described above, according to this embodiment, since stripe filters are not used, the moire can be minimized. In addition, since complementary color filters are not used, a high S/N ratio can be obtained. Since the color difference signal carriers at the frequency point ($\frac{1}{2}P_H$,0) can be canceled, a higher resolution can be obtained.

The fourth embodiment of the present invention will be described below.

A filter array as in the first embodiment (FIG. 4A) is arranged in an image pickup element 101. The overall arrangement of the fourth embodiment is substantially the same as that of FIG. 11, except that a G ($\gamma$th power) signal output from an A/D converter 103 is separated into $G_1$ ($\gamma$th power) and $G_2$ ($\gamma$th power) signals located at positions shown in FIG. 13 by a switch 128.

Assume that a monochrome object at a position (0,$\frac{1}{2}$ $P_V$) in the frequency space image pickup element 101. This Object represents horizontal fringes having a period $2P_V$. For this object, conditions R ($\gamma$th power)=$G_1$ ($\gamma$th power) and B ($\gamma$th power)=$G_2$ ($\gamma$th power) are established. The color difference signals, i.e., the (R ($\gamma$th power)—$G_1$ ($\gamma$th power)) signal and the (B ($\gamma$th power)—$G_2$ ($\gamma$th power)) signal respectively output from adders 129 and 130 become zero. Therefore, the color difference signals R-Y and B-Y output from a color difference matrix processor 113 become zero and are not output. This indicates that the carrier of the color difference signal at the frequency point (0,$\frac{1}{2}P_V$) is canceled. In other words, the carrier of the R ($\gamma$th power) signal is set in phase with that of the $G_1$ ($\gamma$th power), and the carrier of the B ($\gamma$th power) is also in phase with that of the $G_2$ ($\gamma$th power) signal at the frequency point (0,$\frac{1}{2}P_V$). Since these difference signals, i.e., the (R ($\gamma$th power)—G ($\gamma$th power)) signal and the (B ($\gamma$th power)—$G_2$ ($\gamma$th power)) signal, can cancel their carriers at this frequency, the carriers of the color difference signals are not generated.

When an output signal obtained from the apparatus shown in FIG. 11 is to be recorded in an analog form, D/A converters 118, 114, and 115 are necessary. However, when this output signal is recorded in a digital form in a magnetic medium, an optomagnetic medium, an E$^2$PROM (Electrically Erasable PROM), or the like, the above D/A converters can be omitted.

The fifth embodiment of the present invention will be described below.

Figure 14:
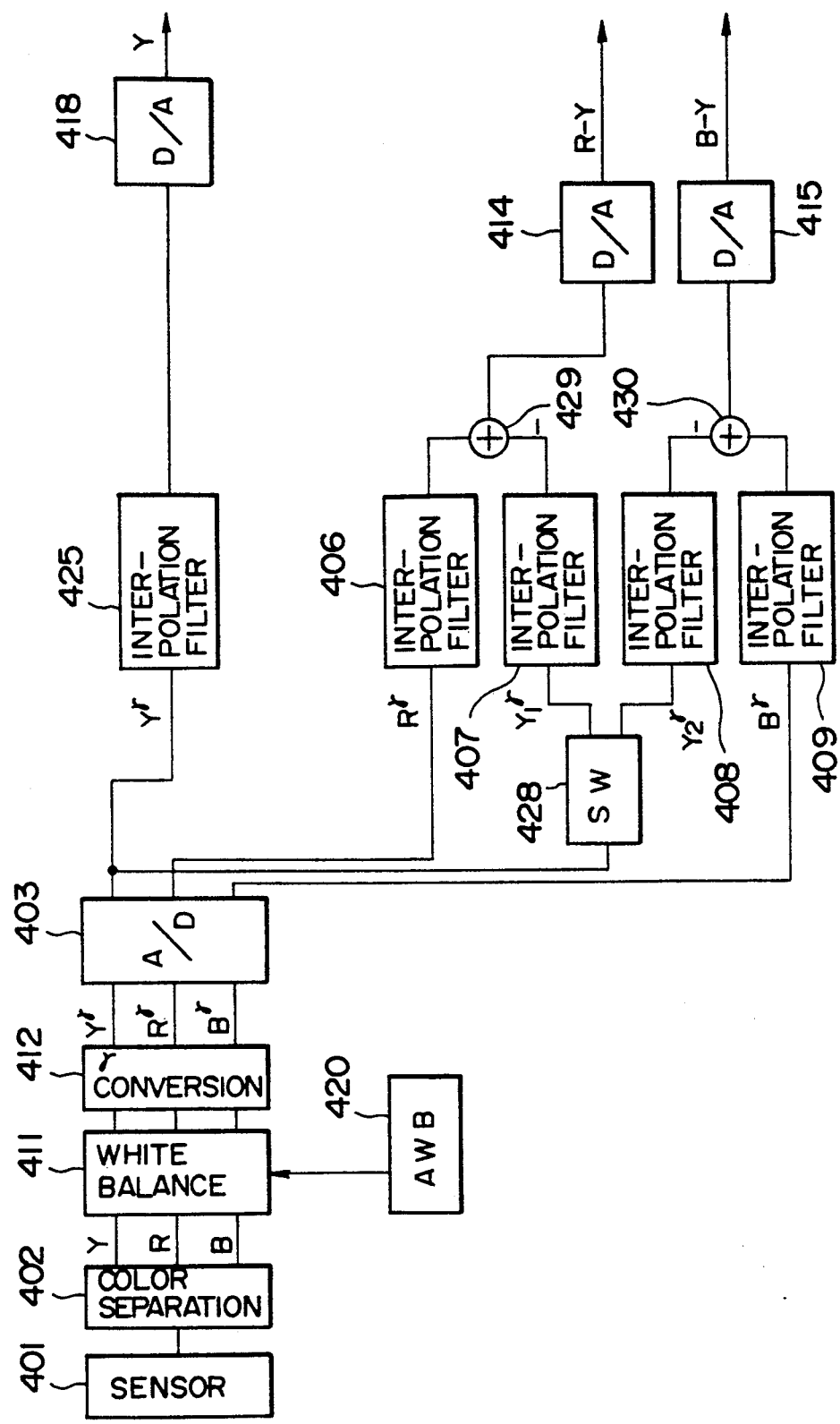
FIG. 14 is a block diagram showing the fifth embodiment of the present invention.

FIG. 14 is a block diagram showing a signal processing section of a "color image pickup apparatus" of the fifth embodiment of the present invention. Y, R, and B filters having a Bayer array shown in FIG. 4B are arranged in an image pickup element (sensor) 401. An image signal read from the image pickup element 401 pixel by pixel is separated into Y, R, and B signals by a color separation unit 402. The Y, R, and B signals are subjected to white balance adjustment by a white balance unit 411 on the basis of color temperature information obtained from a white balance sensor (AWB) 420. An output from the white balance unit 411 is subjected to $\gamma$ correction by a $\gamma$ correction unit 412. An output from the Y correction unit 412 is A/D-converted by an A/D (analog-to-digital) converter 403.

A luminance signal is obtained as follows. An offset sampling structure of a Y ($\gamma$th power) signal is two-dimensionally interpolated by an interpolation filter 425, and an output from the interpolation filter 425 is D/A-converted by a D/A converter 418. An analog signal is thus output from the D/A converter 418. In addition to the coincidence operation by interpolation in the interpolation filter 425, linear processing such as two-dimensional low-pass filtering and edge emphasis are performed.

Meanwhile, a Y ($\gamma$th power) signal of outputs from the A/D converter 403 is separated by a switch 428 into $Y_1$ ($\gamma$th power) and $Y_2$ ($\gamma$th power) signals located at positions shown in FIG. 15. This operation can be performed by operating the switch 428, e.g., every horizontal scanning period. The separated $Y_1$ ($\gamma$th power) and $Y_2$ ($\gamma$th power) signals are input together with an R ($\gamma$th power) signal and a B ($\gamma$th power) signal to interpolation filters 406, 407, 408, and 409, respectively, thereby obtaining coincident R ($\gamma$th power), $Y_1$ ($\gamma$th power), $Y_2$ ($\gamma$th power), and B ($\gamma$th power) signals. In addition to the coincidence operation by interpolation in the interpolation filters 406 to 409, linear processing such as two-dimensional low-pass filtering and edge emphasis are performed. Since these processing operations are linear processing operations, they can be performed after addition (to be described in detail later).

The coincident R ($\gamma$th power) and $Y_1$ ($\gamma$th power) signals are subtracted from each other by an adder 429, and an R-Y signal is output from the adder 429. Similarly, the B ($\gamma$th power) and $Y_2$ ($\gamma$th power) signals are subtracted from each other by an adder 430, and a B-Y signal is output from the adder 430.

Assume that a monochrome object at a position ($\frac{1}{2}P_H$,0) in the frequency space is picked up by the image pickup element 401. This object represents vertical fringes having a period $2P_2$. For this object, the signals R-Y and B-Y respectively output from the adders 429 and 430 become zero and are not output. This indicates that the carrier of the color difference signal at the frequency point ($\frac{1}{2}P_H$,0) is canceled.

The sixth embodiment of the present invention will be described below.

An image pickup element has a Bayer array (FIG. 4B) as in the fifth embodiment. The overall arrangement of the sixth embodiment is substantially the same as that of the fifth embodiment shown in FIG. 14, except that a Y ($\gamma$th power) signal output from an A/D converter 403 is separated into $Y_1$ ($\gamma$th power) and $Y_2$ ($\gamma$th power) signals located at positions shown in FIG. 16 by a switch 428.

Assume that a monochrome object at a position (0,$\frac{1}{2}P_V$) in the frequency space is picked up by an image pickup element 401. This object represents horizontal fringes having a period $2P_V$. For this object, the signals R-Y and B-Y respectively output from adders 429 and 430 become zero and are not output. This indicates that the carrier of the color difference signal at the frequency point (0,$\frac{1}{2}P_V$) is canceled.

The present invention will be described in detail with reference to still another embodiment.

Figure 17:
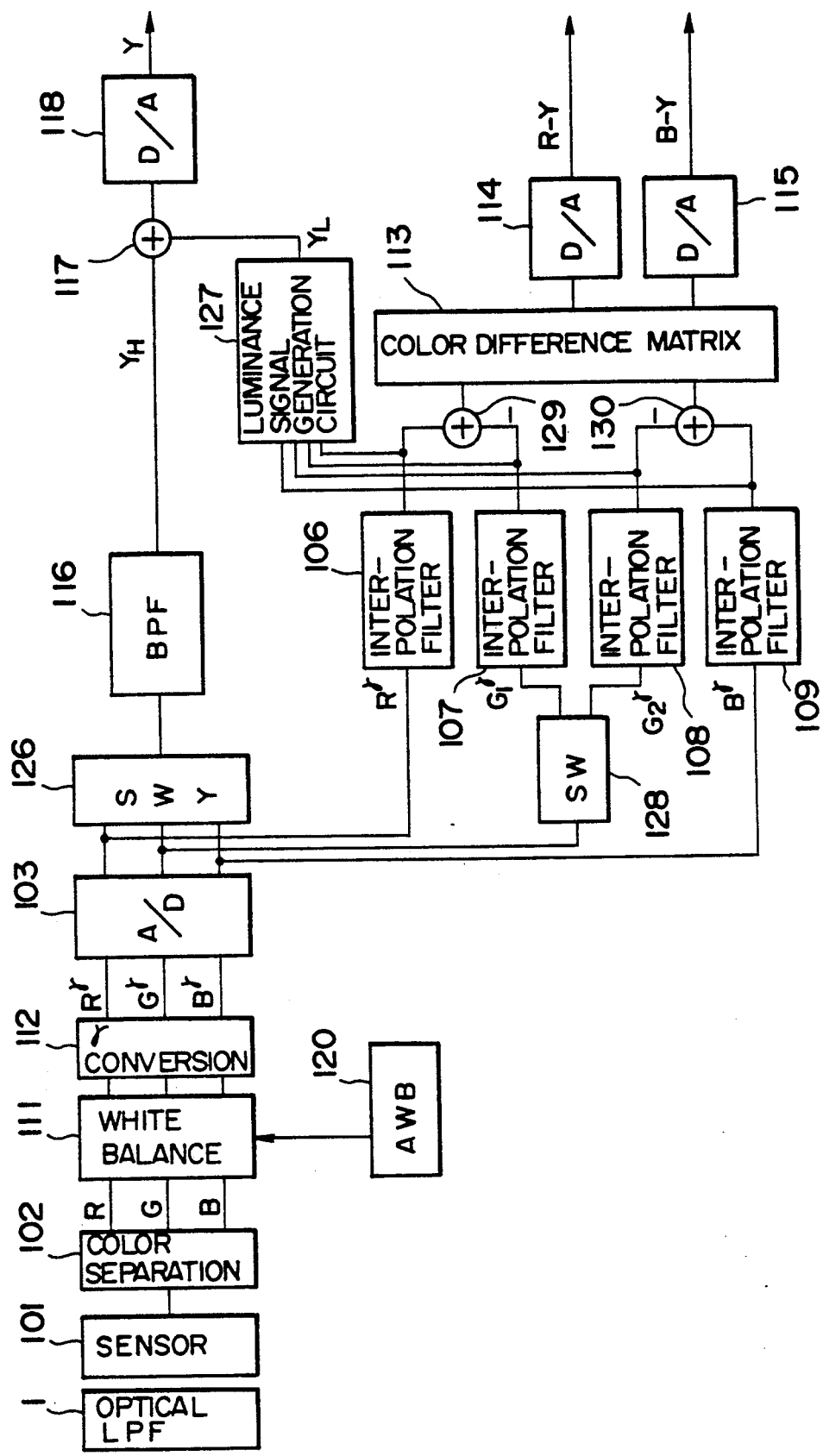
FIG. 17 is a block diagram showing the seventh embodiment of the present invention.

FIG. 17 is a block diagram showing a "color image pickup apparatus" as the seventh embodiment of the present invention. R, G, and B filters (filter array) having a Bayer array shown in FIG. 4A are arranged in an image pickup element (sensor) 101. An image signal read from the image pickup element 101 pixel by pixel is separated into R, G, and B signals by a color separation unit 102. The R, G, and B signals are subjected to white balance adjustment by a white balance unit 111 on the basis of color temperature information obtained from a white balance sensor (AWB) 120. An output from the white balance unit 111 is subjected to $\gamma$ correction by a $\gamma$ correction unit 112. An output from the Y correction unit 112 is A/D-converted by an A/D (analog-to-digital) converter 103.

A luminance signal is switched by a switch circuit (SWY) 126 and is rearranged in a read order. The rearranged luminance signal is extracted as a high-frequency component $Y_H$ of the luminance signal by a band-pass filter (BPF) 116. The high-frequency component $Y_H$ of the luminance signal is added by an adder 117 to a low-frequency component $Y_L$ of the luminance signal obtained by a technique to be described later. A sum signal is converted by a D/A (digital-to-analog) converter 118, and an analog signal is output from the D/A converter 118.

Figures 18, 19:
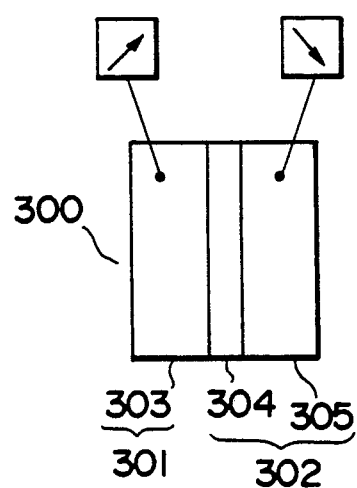
FIG. 18 is a view for explaining the seventh embodiment.
FIG. 19 is a view showing an optical low-pass filter used in the seventh embodiment.

Meanwhile, a G ($\gamma$th power) signal of outputs from the A/D converter 103 is separated by a switch (SW) 128 into $G_1$ ($\gamma$th power) and $G_2$ ($\gamma$th power) signals located at positions shown in FIG. 18. This operation can be performed by operating the switch 128, e.g., every horizontal scanning period. The separated $G_1$ ($\gamma$th power) and $G_2$ ($\gamma$th power) signals are input together with an R ($\gamma$th power) signal and a B ($\gamma$th power) signal to interpolation filters 106, 107, 108, and 109, respectively, thereby obtaining coincident R ($\gamma$th power), $G_1$ ($\gamma$th power), $G_2$ ($\gamma$th power), and B ($\gamma$th power) signals. In addition to the coincidence operation by interpolation in the interpolation filters 106 to 109, linear processing such as two-dimensional low-pass filtering and edge emphasis are performed. Since these processing operations are linear processing operations, they can be performed after addition and matrix processing (both will be described in detail later).

The coincident R ($\gamma$th power) and $G_1$ ($\gamma$th power) signals are subtracted from each other by an adder 129, and an (R ($\gamma$th power)—$G_1$ ($\gamma$th power)) signal is output from the adder 129. Similarly, the B ($\gamma$th power) and $G_2$ ($\gamma$th power) signals are subtracted from each other by an adder 130, and a (B ($\gamma$th power)—$G_2$ ($\gamma$th power)) signal is output from the adder 130. These output signals are input to a color difference matrix processor 113, and the following matrix operation is performed to derive color difference signals R-Y and B-Y.

$$\begin{bmatrix} R - Y \\ B - Y \end{bmatrix} = \begin{bmatrix} 0.70 & -0.11 \\ -0.30 & +0.89 \end{bmatrix} \begin{bmatrix} R^\gamma - G_1^\gamma \\ B^\gamma - G_2^\gamma \end{bmatrix}$$

Assume that a monochrome object at a position ($\frac{1}{2}P_H$,0) in the frequency space is picked up by the image pickup element 101. This object represents vertical fringes having a period $2P_H$. For this object, conditions R ($\gamma$th power)=$G_1$ ($\gamma$th power) and B ($\gamma$th power)=$G_2$ ($\gamma$th power) are established. The color difference signals, i.e., the (R ($\gamma$th power)—$G_1$ ($\gamma$th power)) signal and the (B ($\gamma$th power)—$G_2$ ($\gamma$th power)) signal respectively output from the adders 129 and 130 become zero. Therefore, the color difference signals R-Y and B-Y output from the color difference matrix processor 113 become zero and are not output. This indicates that the carrier of the color difference signal at the frequency point ($\frac{1}{2}P_H$,0) is canceled. In other words, the carrier of the R ($\gamma$th power) signal is set in phase with that of the $G_1$ ($\gamma$th power), and the carrier of the B ($\gamma$th power) is also in phase with that of the $G_2$ ($\gamma$th power) signal at the frequency point ($\frac{1}{2}P_H$,0). Since these difference signals, i.e., the (R ($\gamma$th power)—$G_1$ ($\gamma$th power)) signal and the (B ($\gamma$th power)—$G_2$ ($\gamma$th power)) signal, can cancel their carriers at this frequency, the carriers of the color difference signals are not generated. Color difference signal carriers are not generated at a position ($-\frac{1}{2}P_H$,0) symmetrical with the point ($\frac{1}{2}H_P$,0) about the $f_V$-axis for the same reason. These color difference signals are converted into analog signals by D/A converters 114 and 115, and the analog signals are output. A low-frequency component of the luminance signal is generated by a luminance signal generation circuit 127 in accordance with outputs from the interpolation filters 106, 107, 108, and 109 as follows:

$$Y_L = 0.30R \text{ ($\gamma$th power)} + [\alpha G_1 \text{ ($\gamma$th power)} + \beta G_2 \text{ ($\gamma$th power)}] + 0.11B \text{ ($\gamma$th power)}$$
$$\text{for } \alpha + \beta = 0.59$$

The low-frequency component is added to the high-frequency component $Y_H$ by the adder 117. An output from the adder 117 is D/A-converted by the D/A converter 118, and an analog signal is output. Since the color difference signals R-Y and B-Y and the low-frequency component Yr of the luminance signal generally have bandwidths sufficiently narrower than the luminance signal Y, operations of the adders 129 and 130, the color difference matrix processor 113, the luminance signal generation circuit 127, and the like for the interpolated coincident R ($\gamma$th power), $G_1$ ($\gamma$th power), $G_2$ ($\gamma$th power), and B ($\gamma$th power) signals may be performed using a clock having a lower clock rate than that of the luminance signal Y by extraction or interlacing.

An optical low-pass filter 1 shown in FIG. 17 will be described below.

FIG. 19 shows an arrangement of the optical low-pass filter 1 of this embodiment. Referring to FIG. 19, an optical low-pass filter 300 comprises an optical member 301 for splitting an incident beam into two beams spaced apart from each other by a distance $D_1$ in a direction rotated through $\theta_1$ counterclockwise with respect to the scanning direction, and an optical member 302 for splitting an incident beam into two beams spaced apart from each other by a distance $D_2$ in a direction rotated through $\theta_2$ clockwise with respect to the scanning direction. The optical member 301 comprises a birefringent plate 303 whose direction of projection to a plane parallel to an image plane of the optical axis has an angle $\theta_1$ in the counterclockwise direction with respect to the scanning direction. The optical member 302 comprises a $\lambda/4$ plate 304 for converting a linearly polarized component into a circularly polarized component and a birefringent plate 305 whose direction of projection to a plane parallel to an image plane of the optical axis has an angle $\theta_2$ in the clockwise direction with respect to the scanning direction. These components satisfy the following conditions:

$$0.8 P_H P_V / |P_H \sin\theta_1 + P_V \cos\theta_1| \leq D_1 \leq 1.2 _H P_V / |P_H \sin\theta_1 + \quad \text{(i)}$$

$$0 \leq \theta_1 \leq \pi/2$$

$$0.8 P_H P_V/|P_H\sin\theta_2 + P_V\cos\theta_2| \leq D_2 \leq 1.2 P_H P_V/|P_H\sin\theta_2 + P_V\cos\theta_2| \quad \text{(ii)}$$

$$0 \leq \theta_2 \leq \pi/2$$

Figure 20:
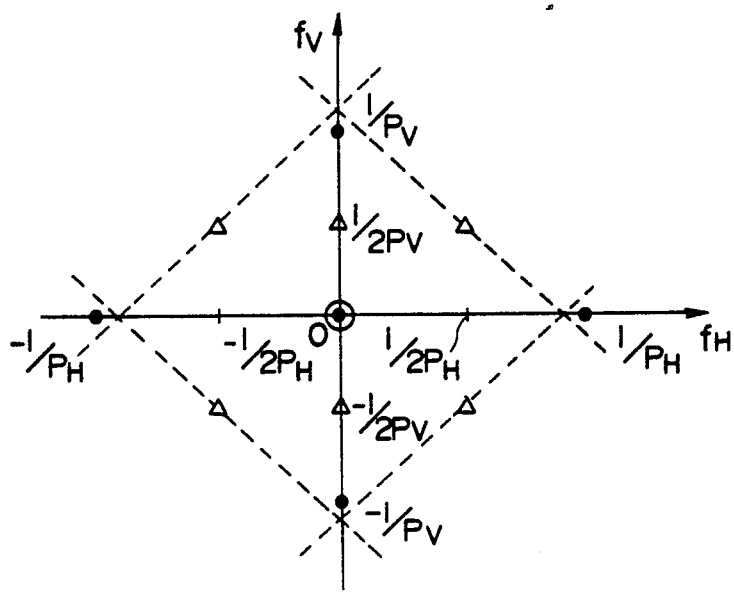
FIG. 20 is a view for explaining the optical low-pass filter shown in FIG. 19.

When the values $D_1$ and $D_2$ exceed the lower limits of inequalities (i) and (ii), folded distortion is increased, resulting in inconvenience. When these values exceed the upper limits, the resolution is decreased, resulting in inconvenience. When an application field is limited and only a frequency component having a specific direction is an issue, either the optical member 301 or 302 can be used. At this time, the $\lambda/4$ plate 304 constituting the optical member 302 need not be used, so that the optical member 302 comprises only the birefringent plate 305. FIG. 20 shows spatial frequency characteristics of this optical low-pass filter 300. More specifically, FIG. 20 shows a case under the following conditions:

$$\theta_1 = \theta_2 = \pi/4$$

$$D_1 = D_2 = \sqrt{2}\, P_H P_V/(P_H + P_V)$$

At this time, as indicated by dotted lines in FIG. 20, all the color difference signal carriers at positions $(\pm\frac{1}{2}P_H, \pm\frac{1}{2}P_V)$ on the spatial frequency plane $(f_H, f_V)$ are trapped, and the color difference signal carriers at positions $(0, \pm\frac{1}{2}P_V)$ can be sufficiently suppressed, thereby obtaining a good image having minimum folded distortion. If $\theta_1 = \theta_2 = \pi/4$ is established, the optical low-pass filter may be arranged as indicated as a filter 500 shown in FIG. 21. More specifically, the filter 500 comprises an optical member 501 and an optical member 502. The optical member 501 comprises a birefringent plate 503 having a direction of projection to a surface parallel to the image plane of the optical axis at an angle of $\pi/4$ in the counterclockwise direction with respect to the scanning direction and a birefringent plate 504 having a direction of projection to a surface parallel to the image plane of the optical axis at an angle of $\pi/4$ in the clockwise direction with respect to the scanning direction. The optical member 502 comprises a birefringent plate 505 having a direction of projection to a surface parallel to the image plane of the optical axis in the scanning direction. The beam distances of the birefringent plates 503, 504, and 505 are given as $D_1/\sqrt{2}$, $D_1/\sqrt{2}$, and $D_2$, respectively.

With the above arrangement, a beam incident on the first optical member 501 is split into two beams spaced apart from each other by a distance $D_1$ by the polarization behavior of the birefringent plate. The propagation direction of beams is a $\pi/2$ clockwise direction with respect to the scanning direction. The optical low-pass filter shown in FIG. 19 can have the same spatial frequency characteristics as those for $\theta_1 = \theta_2 = \pi/4$.

Figure 22:
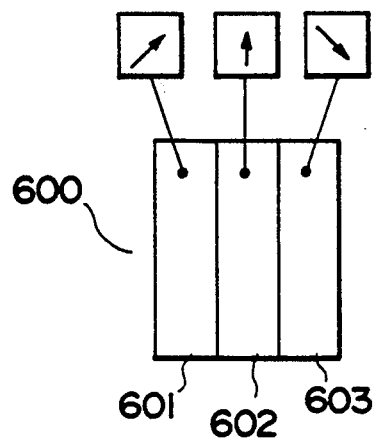
FIG. 22 is a view of an optical low-pass filter used in another modification of the seventh embodiment.

The optical low-pass filter 1 may have an arrangement shown in FIG. 22. This optical low-pass filter 600 comprises an optical member 601 consisting of a birefringent plate for splitting a beam in a $\pi/4$ counterclockwise direction with respect to the scanning direction, an optical member 602 consisting of a birefringent plate for splitting a beam in a $\pi/2$ counterclockwise direction with respect to the scanning direction, and an optical member 603 consisting of a birefringent plate for splitting a beam in a $\pi/4$ clockwise direction with respect to the scanning direction.

The beam splitting widths of the optical members 601, 602, and 603 are defined as $D_1$, $D_2$, and $D_3$:

$$D_1 = D_3 = \sqrt{2}\, P_H P_V/(P_H + P_V)$$

$$D_2 = P_V$$

Figure 23:
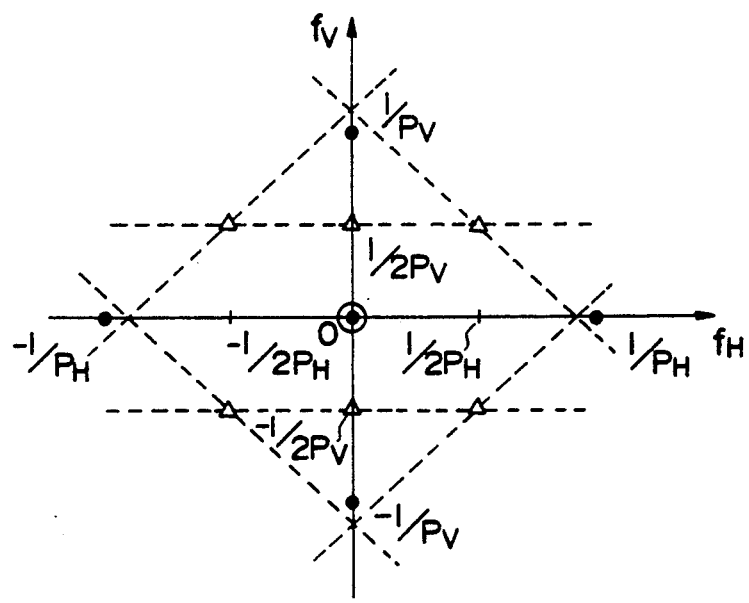
FIG. 23 is a view for explaining the optical low-pass filter shown in FIG. 22.

The spatial frequency characteristics of an optical low-pass filter are given as shown in FIG. 23. All the color difference signal carriers at points $(\pm\frac{1}{2}P_H, \pm\frac{1}{2}P_V)$ and $(0, \pm\frac{1}{2}P_V)$ are trapped, and folded distortion can be properly suppressed.

As described above, according to this embodiment, since the color filters constituting the Bayer array are used, the moiré can be minimized and a high S/N ratio can be obtained. In addition, since the optical low-pass filter and the signal processing means which are suitable for the Bayer array are used, a higher resolution can be obtained.

The eighth embodiment of the present invention will be described below.

Figures 24, 25:
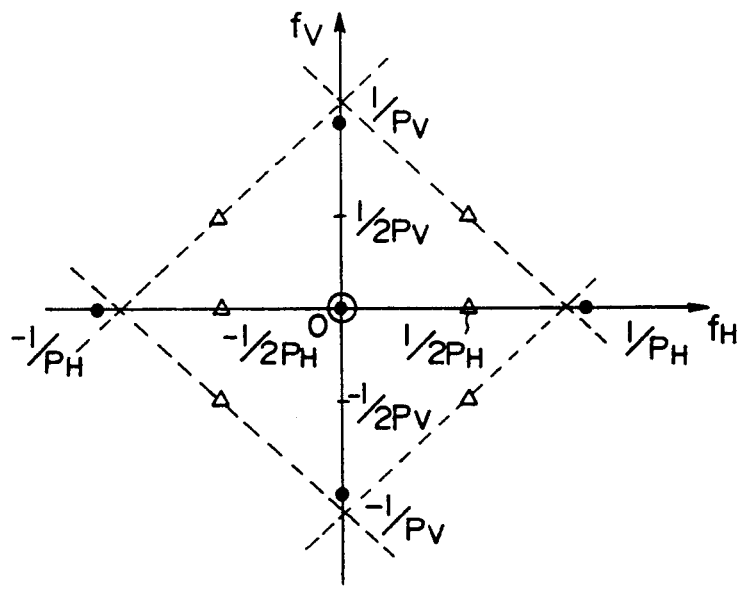
FIG. 24 is a view for explaining the eighth embodiment of the present invention.
FIG. 25 is a view for explaining the optical low-pass filters shown in FIGS. 19 and 21.

An image pickup element 101 has color filters identical to those of the first embodiment shown in FIG. 4A, and the overall arrangement of the eighth embodiment is the same as that of FIG. 17. A G ($\gamma$th power) signal is separated into $G_1$ ($\gamma$th power) and $G_2$ ($\gamma$th power) signals located at positions shown in FIG. 24 by a switch 128. Assume a monochrome object at a position $(0, \frac{1}{2}P_V)$ in the frequency space is picked up by the image pickup element 101. This object represents horizontal fringes having a period $2P_V$. For this object, the color difference signals, i.e., the (R ($\gamma$th power)—$G_1$ ($\gamma$th power)) signal and the (B ($\gamma$th power)—$G_2$ ($\gamma$th power)) signal respectively output from adders 129 and 130 become zero. Therefore, the color difference signals R-Y and B-Y output from a color difference matrix processor 113 become zero and are not output. This indicates that the carrier of the color difference signal at the frequency point $(0, \frac{1}{2}P_V)$ is canceled. In other words, the carrier of the R ($\gamma$th power) signal is set in phase with that of the G ($\gamma$th power), and the carrier of the B ($\gamma$th power) is also in phase with that of the $G_2$ ($\gamma$th power) signal at the frequency point $(0, \frac{1}{2}P_V)$. Since these difference signal and the (B ($\gamma$th power)—$G_2$ ($\gamma$th power)) signal, can cancel their carriers at this frequency, the carriers of the color difference signals are not generated. Color difference signal carriers are not generated at a position $(0, \frac{1}{2}P_V)$ symmetrical with the point $(0, \frac{1}{2}P_V)$ about the $f_H$-axis for the same reason. When an output signal obtained from the apparatus shown in FIG. 17 is to be recorded in an analog form, D/A converters 118, 114, and 115 are necessary. However, when this output signal is recorded in a digital form in a magnetic medium, an optomagnetic medium, an E$^2$PROM (Electrically Erasable PROM), or the like, the above D/A converters can be omitted. The spatial frequency characteristics obtained by employing the optical low-pass filter shown in FIG. 19 or 21 in this image pickup apparatus are shown in FIG. 25. All the color difference signal carriers at points $(\pm\frac{1}{2}P_H, \pm\frac{1}{2}P_V)$ on the spatial frequency plane $(f_H, f_V)$ are trapped, and color difference signal carriers at points $(\pm\frac{1}{2}P_H, 0)$ are sufficiently suppressed. Folded distortion can be properly suppressed.

Figure 26:
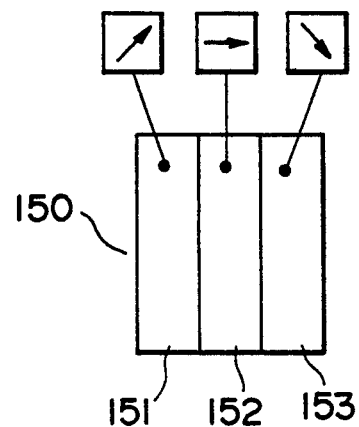
FIG. 26 is a view of an optical low-pass filter used in a modification of the eighth embodiment.

The optical low-pass filter may have an arrangement shown in FIG. 26. This optical low-pass filter 150 comprises an optical member 151 consisting of a birefringent plate for splitting a beam in a $\pi/4$ counterclockwise direction with respect to the scanning direction, an optical member 152 consisting of a birefringent plate for splitting a beam in a direction parallel to the scanning direction, and an optical member 153 consisting of a birefringent plate for splitting a beam in a $\pi/4$ clockwise direction with respect to the scanning direction. The beam splitting widths of the optical members 151, 152, and 153 are defined as $D_1$, $D_2$, and $D_3$:

$$D_1 = D_3 = \sqrt{2}\ P_H P_V/(P_H + P_V)$$

$$D_2 = P_H$$

Figure 27:
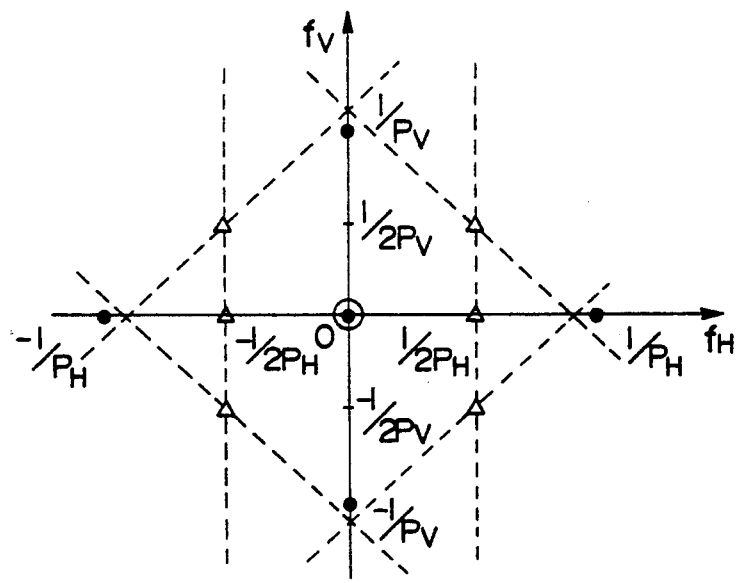
FIG. 27 is a view for explaining the optical low-pass filter shown in FIG. 26.

The spatial frequency characteristics of an optical low-pass filter 150 are given as shown in FIG. 27. All the color difference signal carriers at points $(\pm\tfrac{1}{2}P_H,\pm\tfrac{1}{2}P_V)$ and $(\pm\tfrac{1}{2}P_H,0)$ are trapped, and folded distortion can be properly suppressed.

Figure 28:
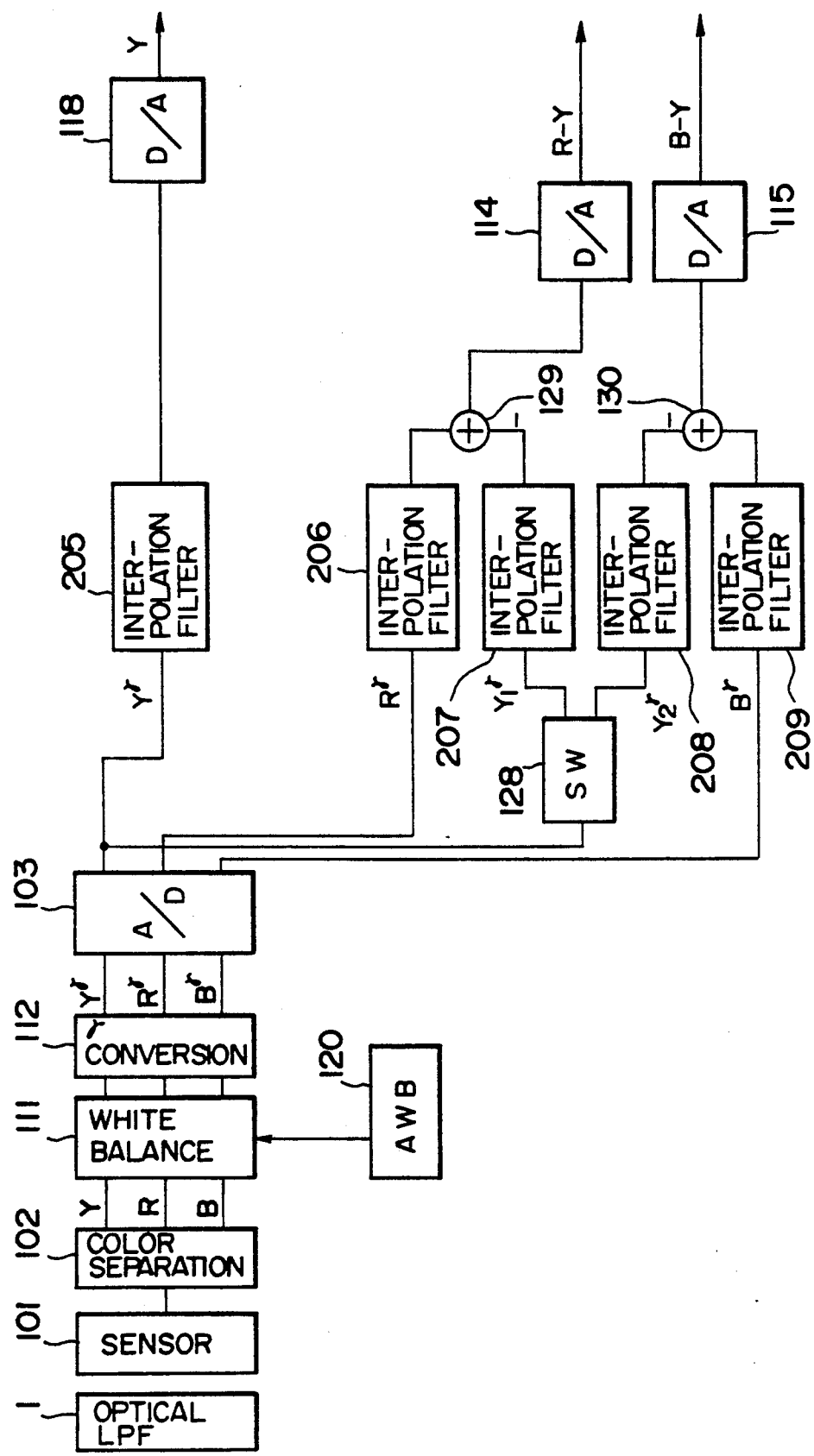
FIG. 28 is a block diagram showing the ninth embodiment of the present invention.

FIG. 28 is a block diagram of a "color image pickup apparatus" according to a ninth embodiment. A beam from an object to be photographed is incident on an image pickup element (sensor) 101 through an optical low-pass filter 1 by a focusing optical system (not shown).

Figure 21:
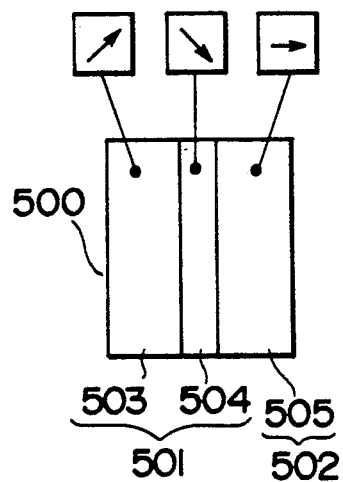
FIG. 21 is a view of an optical low-pass filter used in a modification of the seventh embodiment.

The optical low-pass filter 1 has an arrangement shown in FIG. 19, 21, or 22 and properly suppresses folded distortion. The image pickup element (sensor) 101 has YRB filters constituting a Bayer array shown in FIG. 4B. An image signal read from the image pickup element 101 pixel by pixel is separated into Y, R, and B signals by a color separation unit 102. The Y, R, and B signals are subjected to white balance adjustment by a white balance unit 111 on the basis of color temperature information obtained from a white balance sensor 120. An output from the white balance unit 111 is subjected to $\gamma$ correction by a $\gamma$ correction unit 112. An output from the $\gamma$ correction unit 112 is A/D-converted by an A/D (analog-to-digital) converter 103. A luminance signal is obtained as follows. An offset sampling structure of a Y ($\gamma$th power) signal is two-dimensionally interpolated by an interpolation filter 205, and an output from the interpolation filter 205 is D/A-converted by a D/A converter 118. An analog signal is thus output from the D/A converter 118. In addition to the coincidence operation by interpolation in the interpolation filter 205, processing such as two-dimensional low-pass filtering and edge emphasis are performed. Meanwhile, a Y ($\gamma$th power) signal of outputs from the A/D converter 103 is separated by a switch 128 into $Y_1$ ($\gamma$th power) and $Y_2$ ($\gamma$th power) signals located at the illustrated positions shown in FIG. 29. This operation can be performed by operating the switch 128, e.g., every horizontal scanning period. The separated $Y_1$ ($\gamma$th power) and $Y_2$ ($\gamma$th power) signals are input together with an R ($\gamma$th power) signal and a B ($\gamma$th power) signal to interpolation filters 206, 207, 208, and 209, respectively, thereby obtaining coincident R ($\gamma$th power), $Y_1$ ($\gamma$th power), $Y_2$ ($\gamma$th power), and B ($\gamma$th power) signals. In addition to the coincidence operation by interpolation in the interpolation filters 206 to 209, linear processing such as two-dimensional low-pass filtering and edge emphasis are performed. Since these processing operations are linear processing operations, they can be performed after addition (to be described in detail later). The coincident R ($\gamma$th power) and $Y_1$ ($\gamma$th power) signals are subtracted from each other by an adder 129, and an R-Y signal is output from the adder 129. Similarly, the B ($\gamma$th power) and $Y_2$ ($\gamma$th power) signals are subtracted from each other by an adder 130, and a B-Y signal is output from the adder 130.

Assume a monochrome object at a position ($\tfrac{1}{2}P_H,0$) in the frequency space is picked up by the image pickup element 101. This object represents vertical fringes having a period $2P_H$. For this object, the signals R-Y and B-Y respectively output from the adders 129 and 130 become zero and are not output. This indicates that the carrier of the color difference signal at the frequency point ($\tfrac{1}{2}P_2,0$) is canceled. In other words, the carrier of the R ($\gamma$th power) signal is set in phase with that of the $Y_1$ ($\gamma$th power), and the carrier of the B ($\gamma$th power) is also in phase with that of the $Y_2$ ($\gamma$th power) signal at the frequency point ($\tfrac{1}{2}P_H,0$). Since these R-Y and B-Y can cancel their carriers at this frequency, the carriers of the color difference signals are not generated. These color difference signals are D/A-converted into analog signals by D/A converters 114 and 115. Color difference signal carriers are not generated at a position $(-\tfrac{1}{2}P_H,0)$ symmetrical with the point ($\tfrac{1}{2}H_P,0$) about the $f_V$-axis for the same reason. Since the color difference signals R-Y and B-Y generally have bandwidths sufficiently narrower than the luminance signal Y, operations of the adders 129 and 130, and the like for the interpolated and coincided R ($\gamma$th power), $Y_1$ ($\gamma$th power), $Y_2$ ($\gamma$th power), and B ($\gamma$th power) signals may be performed using a clock having a lower clock rate than that of the luminance signal Y by extraction or interlacing. In this embodiment, unlike in the seventh and eighth embodiments, the carriers of not the color difference signals but the luminance signals appear at positions $(\pm\tfrac{1}{2}P_H,\pm\tfrac{1}{2}P_V)$ on the spatial frequency plane ($f_H,f_V$). The optical low-pass filters 300, 500, and 600 shown in FIGS. 19, 21, and 22 have frequency characteristics represented by the dotted lines in FIGS. 20 and 23, so that the above carriers can be trapped and folded distortion is also properly suppressed.

The tenth embodiment of the present invention will be described below.

An image pickup element 101 has color filters identical to those of the ninth embodiment shown in FIG. 4B, and the overall arrangement of the tenth embodiment is the same as that of FIG. 28. A Y ($\gamma$th power) signal is separated into $Y_1$ ($\gamma$th power) and $Y_2$ ($\gamma$th power) signals located at positions shown in FIG. 30 by a switch 128.

Assume a monochrome object at a position $(0,\tfrac{1}{2}P_V)$ in the frequency space is picked u by the image pickup element 101. This object represents horizontal fringes having a period $2P_V$. For this object, the color difference signals R-Y and B-Y respectively output from adders 129 and 130 become zero. Therefore, the color difference signals R-Y and B-Y output from the adders 129 and 130 become zero and are not output. This indicates that the carrier of the color difference signal at the frequency point $(0,\tfrac{1}{2}P_V)$ is canceled. In other words, the carrier of the R ($\gamma$th power) signal is set in phase with that of the $Y_1$ ($\gamma$th power), and the carrier of the B ($\gamma$th power) is also in phase with that of the $Y_2$ ($\gamma$th power) signal at the frequency point $(0,\tfrac{1}{2}P_V)$. Since these difference signals R-Y and B-Y can cancel their carriers at this frequency, the carriers of the color difference signals are not generated. When an output signal obtained from the apparatus shown in FIG. 28 is to be recorded in an analog form, D/A converters 118, 114, and 115 are necessary. However, when this output signal is recorded in a digital form in a magnetic medium, an optomagnetic medium, an E²PROM (Electrically Erasable PROM), or the like, the above D/A converters can be omitted.

The optical low-pass filter 1 may comprise an arrangement shown in FIG. 19, 21, or 26. The spatial frequency characteristics of such a filter are excellent to properly suppress folded distortion, as shown in FIGS. 25 and 27.

Figure 31:
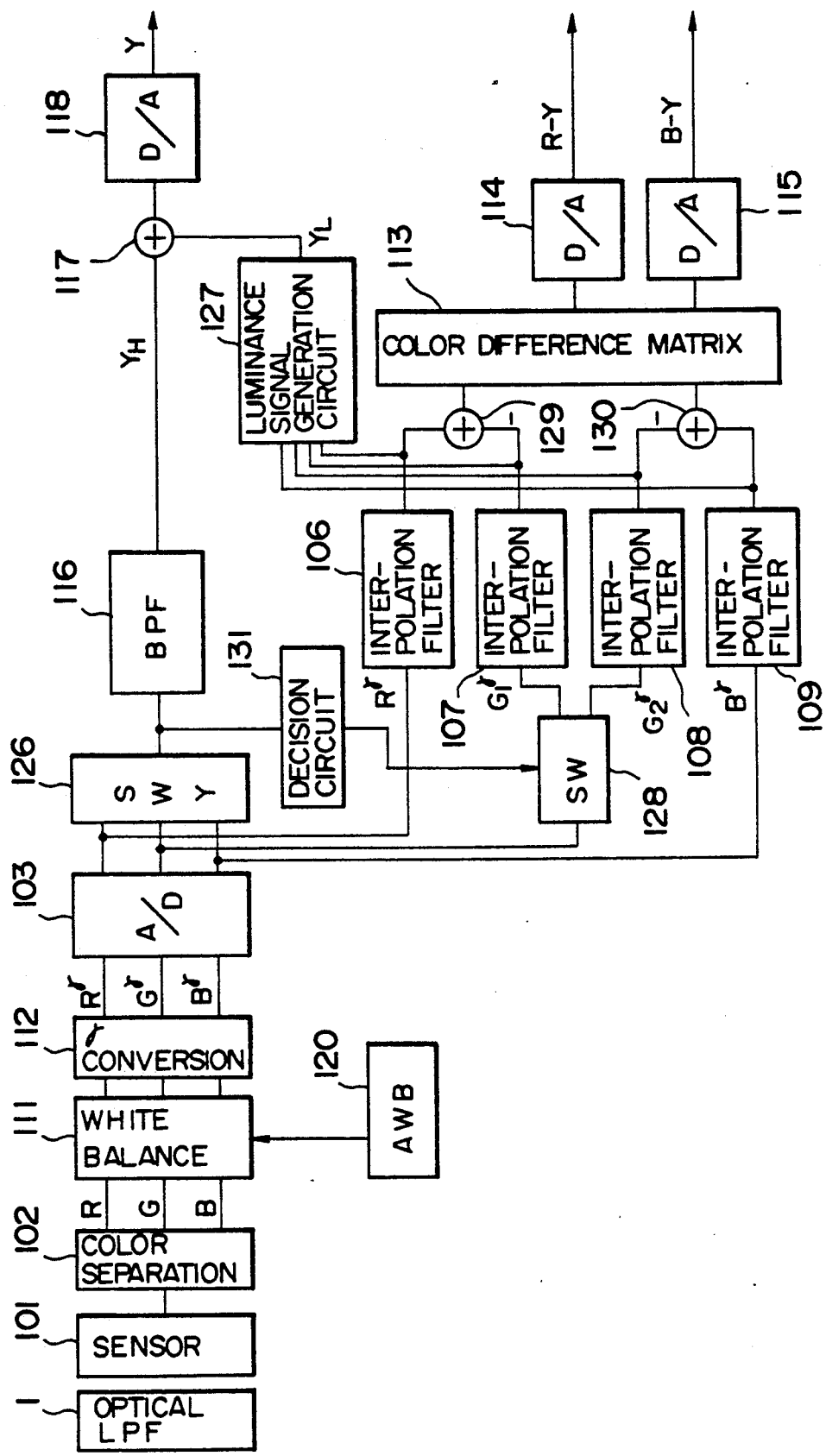
FIG. 31 is a view for explaining the eleventh embodiment of the present invention.
Figure 32:
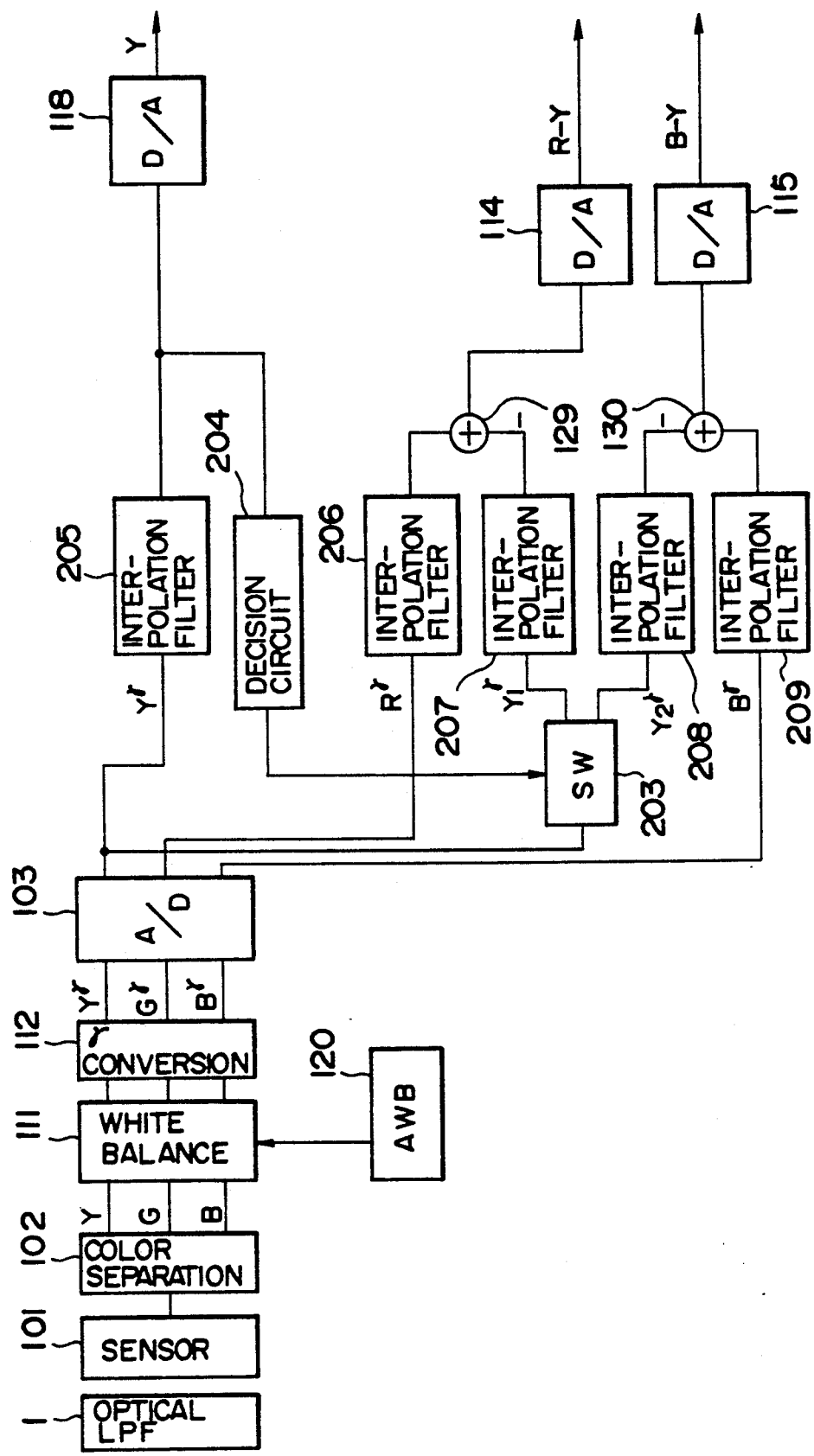
FIG. 32 is a block diagram showing the twelfth embodiment of the present invention.

In addition, the color difference signals may be formed as follows. That is, as shown in FIG. 31, separation of the G ($\gamma$th power) signal by the switch 128 can be switched between timings shown in FIG. 18 and FIG. 24 in accordance with a luminance signal of an object. This arrangement will be described as the eleventh embodiment. Selection of the timing of FIG. 18 or 24 is determined by a decision circuit 131 (to be described later). Similarly, as shown in FIG. 32, separation of the Y ($\gamma$th power) signal by a switch 203 is performed by switching between timings shown in FIGS. 29 and 30 in accordance with a luminance signal of the object, as shown in FIG. 32. This arrangement will be described as the twelfth embodiment.

Selection of either timing is determined by a decision circuit 204 (to be described later). Arrangements and operations of the decision circuit 131 (FIG. 31) and 204 (FIG. 32) will be described below. The luminance signal output from the switch circuit 126 or the interpolation filter 205 is filtered by a band-pass filter (H-BPF) 31 in the horizontal direction to extract a horizontal high-frequency component. This extracted output is input to a comparator (comp) 32 and is compared with a predetermined threshold value. When it is decided that the input signal level is higher than the threshold level and the horizontal high-frequency component value is large, the timing in FIG. 18 is selected to cancel the carrier of the horizontal color difference signal. Otherwise, the timing (FIG. 24) for canceling the vertical color difference signal carrier is selected.

Figure 34:
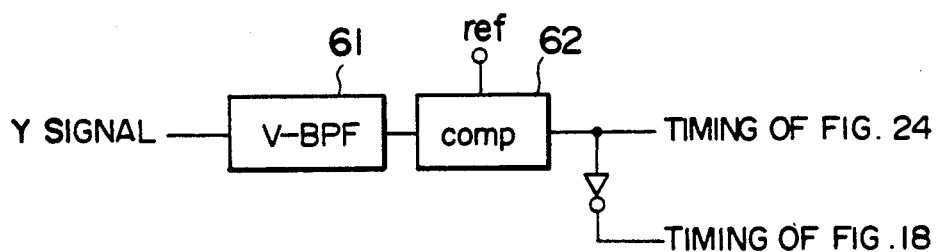
FIG. 34 is a block diagram showing another arrangement of the decision circuit.

The decision circuits 131 and 204 may be arranged as in the circuit of FIG. 34. More specifically, the luminance signal output from the switch circuit 126 or the interpolation filter 205 is filtered by a band-pass filter (V-BPF) 61 in the vertical direction to extract a vertical high-frequency component. This extracted output is input to a comparator (comp) 62 and is compared with a predetermined threshold value. When it is decided that the input signal level is higher than the threshold level and the vertical high-frequency component value is large, the timing shown in FIG. 24 is selected to cancel the carrier of the vertical color difference signal. Otherwise, the timing of FIG. 18 for canceling the horizontal color difference signal carrier is selected. In this manner, since the carriers to be canceled can be changed in accordance with the horizontal or vertical frequency components of the object in the eleventh or twelfth embodiment, a good image having minimum folded distortion can be obtained. If the optical low-pass filter 1 has arrangements shown in FIGS. 19, 21, 22, and 26, folded distortion can be properly suppressed.

As described above, since the color filters constituting the Bayer array are used in the image pickup element, appropriate signal processing is performed. There is therefore provided a color image pickup apparatus capable of producing an image having a high resolution, reduced moiré, and a high S/N ratio.

The present invention will be described in detail with reference to still another embodiment hereinafter.

Figure 35:
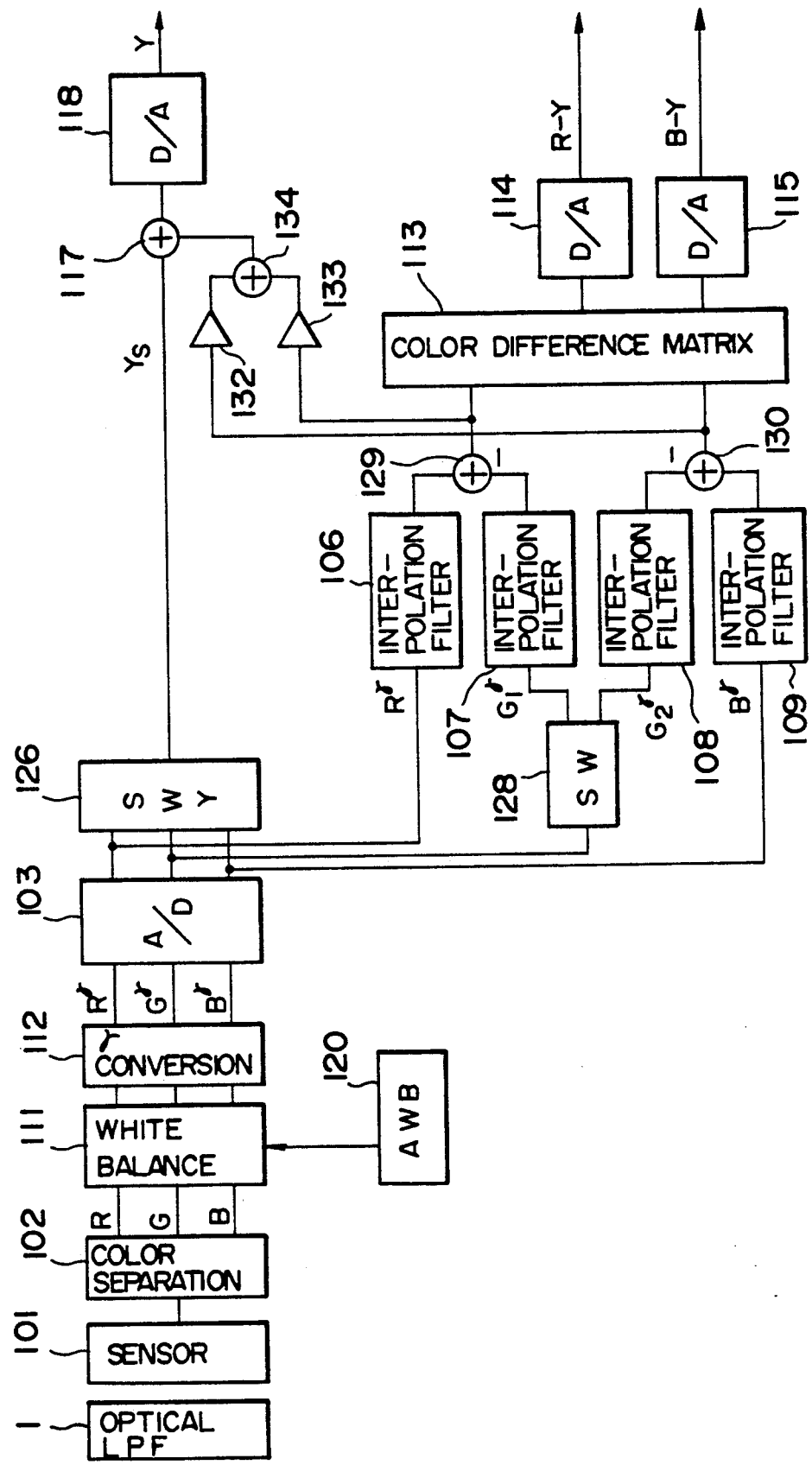
FIG. 35 is a block diagram showing the thirteenth embodiment of the present invention.

FIG. 35 is a block diagram showing a "color image pickup apparatus" as the thirteenth embodiment of the present invention. R, G, and B filters (filter array) having a Bayer array shown in FIG. 4A are arranged in an image pickup element (sensor) 101. An image signal read from the image pickup element 101 pixel by pixel is separated into R, G, and B signals by a color separation unit 102. The R, G, and B signals are subjected to white balance adjustment by a white balance unit 111 on the basis of color temperature information obtained from a white balance sensor (AWB) 120. An output from the white balance unit 111 is subjected to $\gamma$ correction by a $\gamma$ correction unit 112. An output from the $\gamma$ correction unit 112 is A/D-converted by an A/D (analog-to-digital) converter 103.

A luminance signal is switched by a switch circuit (SWY) 126 and is rearranged in a read order. The rearranged luminance signal is read as a luminance signal $Y_S$ including a high-frequency component. This luminance signal $Y_S$ is added by an adder 117 to signals representing the products between constants and a first difference signal, i.e., an (R ($\gamma$th power)—$G_1$ ($\gamma$th power)) signal and a second difference signal, i.e., a (B ($\gamma$th power)—$G_2$ ($\gamma$th power)) signal. An output from the adder 117 is D/A-converted by a D/A (digital-to-analog) converter 118.

Figures 36, 37:
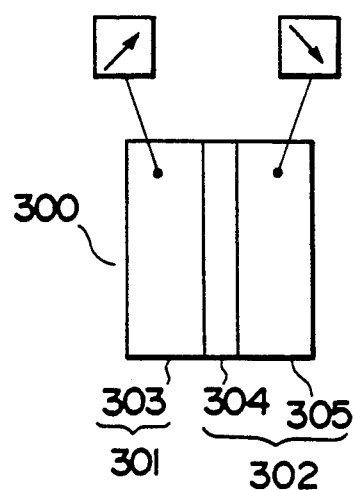
FIG. 36 is a view for explaining the thirteenth embodiment.
FIG. 37 is a view showing an optical low-pass filter used in a modification of the thirteenth embodiment.

Meanwhile, a G ($\gamma$th power) signal of outputs from the A/D converter 103 is separated by a switch (SW) 128 into $G_1$ ($\gamma$th power) and $G_2$ ($\gamma$th power) signals located at positions shown in FIG. 36. This operation can be performed by operating the switch 128, e.g., every horizontal scanning period. The separated G ($\gamma$th power) and $G_2$ ($\gamma$th power) signals are input together with an R l$\gamma$th power) signal and a B ($\gamma$th power) signal to interpolation filters 106, 107, 108, and 109, respectively, thereby obtaining coincident R ($\gamma$th power), $G_1$ ($\gamma$th power), $G_2$ ($\gamma$th power), and B ($\gamma$th power) signals. In addition to the coincidence operation by interpolation in the interpolation filters 106 to 109, linear processing such as two-dimensional low-pass filtering and edge emphasis are performed. Since these processing operations are linear processing operations, they can be performed after addition and matrix processing (both will be described in detail later).

The coincident R ($\gamma$th power) and $G_1$ ($\gamma$th power) signals are subtracted from each other by an adder 129, and an (R ($\gamma$th power)—$G_1$ ($\gamma$th power)) signal is output from the adder 129. Similarly, the B ($\gamma$th power) and $G_2$ ($\gamma$th power) signals are subtracted from each other by an adder 130, and a (B ($\gamma$th power)—$G_2$ ($\gamma$th power)) signal is output from the adder 130. These output signals are input to a color difference matrix processor 113, and the following matrix operation is performed to derive color difference signals R-Y and B-Y.

$$\begin{bmatrix} R - Y \\ B - Y \end{bmatrix} = \begin{bmatrix} 0.70 & -0.11 \\ -0.30 & +0.89 \end{bmatrix} \begin{bmatrix} R^\gamma - G_1^\gamma \\ B^\gamma - G_2^\gamma \end{bmatrix}$$

Assume a monochrome object at a position ($\frac{1}{2}P_H$,0) in the frequency space is picked up by the image pickup element 101. This object represents vertical fringes having a period $2P_H$. For this object, conditions R ($\gamma$th power)=$G_1$ ($\gamma$th power) and B ($\gamma$th power)=$G_2$ ($\gamma$th power) are established. The color difference signals, i.e., the (R ($\gamma$th power)—$G_1$ ($\gamma$th power)) signal and the (B ($\gamma$th power)—$G_2$ ($\gamma$th power)) signal respectively output from the adders 129 and 130 become zero. Therefore, the color difference signals R-Y and B-Y output from the color difference matrix processor 113 become zero and are not output. This indicates that the carrier of the color difference signal at the frequency point ($\frac{1}{2}P_H$,0) is canceled. In other words, the carrier of the R ($\gamma$th power), signal is set in phase with that of the G ($\gamma$th power), and the carrier of the B ($\gamma$th power) is also in phase with that of the $G_2$ ($\gamma$th power) signal at the frequency point ($\frac{1}{2}P_H$,0). Since these difference signals, i.e., the (R ($\gamma$th power)—$G_1$ ($\gamma$th power)) signal and the (B ($\gamma$th power)—$G_2$ ($\gamma$th power)) signal, can cancel their carriers at this frequency, the carriers of the color difference signals are not generated. Color difference signal carriers are not generated at a position ($-\frac{1}{2}P_H$,0) symmetrical with the point ($\frac{1}{2}H_P$,0) about the $f_V$-axis for the same reason. These color difference signals are D/A-converted by D/A converters 114 and 115.

The first difference signal (R ($\gamma$th power)—$G_1$ ($\gamma$th power)) signal and the second difference signal (B ($\gamma$th power)—$G_2$ ($\gamma$th power)) are multiplied with constants by constant multipliers 132 and 133 and are added by an adder 134. An output from the adder 134 is added to the luminance signal $Y_S$ by the adder 117, thereby obtaining a luminance signal Y whose spectral characteristics are corrected.

The principle of this operation will be described below.

Assume that outputs from the respective pixels of the image pickup element 101 are simply synthesized, and the resultant luminance signal is defined as $Y_S$. The luminance signal $Y_S$ is obtained by switching the output signals from the respective pixels by means of the switch circuit 126. One of the color-separated components, e.g., a G signal may be used. To the contrary, the luminance signal whose spectral characteristics are corrected to be equal to visibility sensitivity is defined as $Y_L$. The luminance signal $Y_L$ can be formed by linear coupling of coincident color signals and is defined as follows:

$$Y_L = \gamma R^Y + \alpha G_1^Y + \beta G_2^Y + \epsilon B^Y$$
for $\delta + \alpha + \beta + \epsilon = 1$ (1)

In the NTSC scheme, $$\delta = 0.30, \alpha + \beta = 0.59, \epsilon = 0.11 \quad (2)$$

The luminance signal $Y_L$ has a lower band than that of the luminance signal $Y_S$. Of all the luminance signals $Y_S$, a luminance signal having the same band as that of the luminance signal $Y_L$ is defined as $Y_{SL}$.

At this time, the luminance signal Y is corrected by substituting the low-frequency component $Y_{SL}$ of the luminance signal $Y_S$ with the luminance signal $Y_L$ having the correct spectral characteristics. That is, $$Y = (Y_S - Y_{SL}) + Y_L = Y_L + (Y_L - Y_{SL}) \quad (3)$$

The luminance signal $Y_{SL}$ can be expressed by linear coupling of respective color signals and is defined as follows:

$$Y_{SL} = sR^\gamma + tG_1^\gamma + uG_2^\gamma + wB^\gamma$$

for $s + t + u + w = 1$ (4)

At this time, terms within the parentheses on the right side in equation (3) are defined as follows:

$$Y_L - Y_{SL} = (\delta - s)R^\gamma - (t - \alpha)G_1^\gamma + (\epsilon - w)B^\gamma - (u - \beta)G_2$$

wherein if $\delta - s = t - \alpha$, then $s + t = \alpha + \delta$ and $\delta + \alpha + \beta + \epsilon = s + t + u + w (<1)$, so that $\beta + \epsilon \leq u + w$ therefore $$\epsilon - w = u - \beta$$

If the following conditions are given:

$$C_1 = \delta - s = t - \alpha \quad (5)$$

$$C_2 = \epsilon - w = u - \beta \quad (6)$$

the following equation is derived:

$$Y_L - Y_{SL} = C_1(R^\gamma - G_1^\gamma) + C_2(B^\gamma - G_2^\gamma)$$

A substitution of this equation into equation (3) yields the following:

$$Y = Y_S + C_1(R^\gamma - G_1^\gamma) + C_2(R^\gamma - G_2^\gamma) \quad (7)$$

The spectral characteristics of the luminance signal Y are obtained by adding products of the constants and the first and second difference signals (R ($\gamma$th power)—$G_1$($\gamma$th power)) and (B ($\gamma$th power)—$G_2$ ($\gamma$th power)) to the simply synthesized luminance signal $Y_S$.

When the luminance signal $Y_S$ is obtained by a switching operation of the switch circuit 126, values s, t, u, and w in equation (4) satisfy the following equation:

$$s = t = u = w = 0.25 \quad (8)$$

the following relations are derived from equations (2), (5), and (6):

$$\alpha = 0.20, \beta = 0.39,$$

$$C_1 = 0.05, C_2 = -0.14 \quad (9)$$

When the luminance signal $Y_S$ is obtained using the G signal, the values s, t, u, and w are given as follows:

$$s = w = 0, t = u = 0.5 \quad (10)$$

The following relations are then derived from equations (2), (5), and (6):

$$\alpha = 0.20, \beta = 0.39,$$

$$C_1 = 0.30, C_2 = 0.11 \quad (11)$$

The luminance signal whose spectral characteristics are corrected as described above is D/A-converted by the D/A converter 118, and an analog signal is output from the D/A converter 118. Since the color difference signals R-Y and B-Y and the low-frequency component $Y_L$ of the luminance signal generally have bandwidths sufficiently narrower than the luminance signal Y, operations of the adders 129 and 130, the color difference matrix processor 113, the adder 117, and the like for the interpolated coincident R (γth power), G₁ (γth power), G₂ (γth power), and B (γth power) signals may be performed using a clock having a lower clock rate than that of the luminance signal Y by extraction or interlacing.

An optical low-pass filter shown in FIG. 35 will be described below.

FIG. 37 shows an arrangement of the optical low-pass filter 1 of this embodiment. Referring to FIG. 37, an optical low-pass filter 300 comprises an optical member 301 for splitting an incident beam into two beams spaced apart from each other by a distance $D_1$ in a direction rotated through $\theta_1$ counterclockwise with respect to the scanning direction, and an optical member 302 for splitting an incident beam into two beams spaced apart from each other by a distance $D_2$ in a direction rotated through $\theta_2$ clockwise with respect to the scanning direction. The optical member 301 comprises a birefringent plate 303 whose direction of projection to a plane parallel to an image plane of the optical axis has an angle $\theta_1$ in the counterclockwise direction with respect to the scanning direction. The optical member 302 comprises a λ/4 plate 304 for converting a linearly polarized component into a circularly polarized component and a birefringent plate 305 whose direction of projection to a plane parallel to an image plane of the optical axis has an angle $\theta_2$ in the clockwise direction with respect to the scanning direction. These components satisfy the following conditions:

$$0.8 P_H P_V / |P_H \sin\theta_1 + P_V \cos\theta_1| \leq D_1 \leq 1.2 P_H P_V / |P_H \sin\theta_1 + P_V \cos\theta_1| \quad \text{(i)}$$

$$0 \leq \theta_1 \leq \pi/2$$

$$0.8 P_H P_V / |P_H \sin\theta_2 + P_V \cos\theta_2| \leq D_2 \leq 1.2 P_H P_V / |P_H \sin\theta_2 + P_V \cos\theta_2| \quad \text{(ii)}$$

$$0 \leq \theta_2 \leq \pi/2$$

Figure 38:
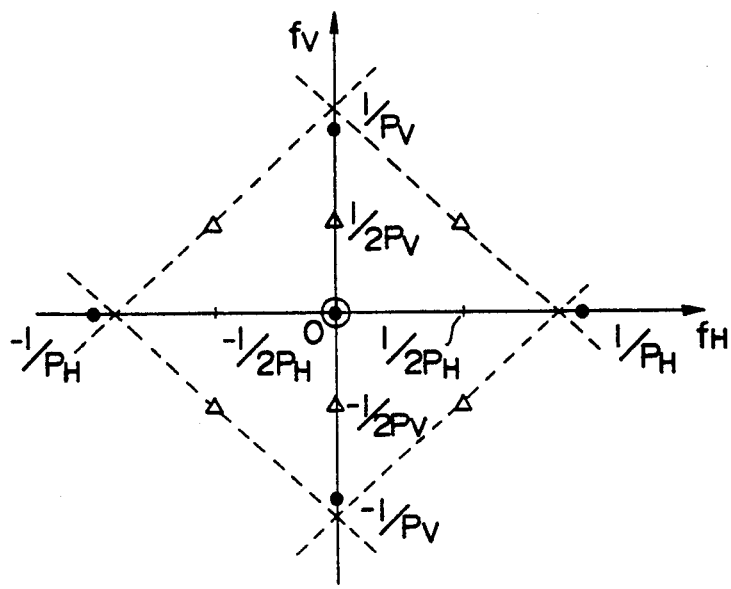
FIG. 38 is a view for explaining the optical low-pass filter shown in FIG. 37.

When the values $D_1$ and $D_2$ exceed the lower limits of inequalities (i) and (ii), folded distortion is increased, resulting in inconvenience. When these values exceed the upper limits, the resolution is decreased, resulting in inconvenience. When an application field is limited and only a frequency component having a specific direction is an issue, either the optical member 301 or 302 can be used. At this time, the λ/4 plate 304 constituting the optical member 302 need not be used, so that the optical member 302 comprises only the birefringent plate 305. FIG. 38 shows spatial frequency characteristics of this optical low-pass filter 300. More specifically, FIG. 38 shows a case under the following conditions:

$$\theta_1 = \theta_2 = \pi/4$$

$$D_1 = D_2 = \sqrt{2}\, P_H P_V / (P_H + P_V)$$

At this time, as indicated by dotted lines in FIG. 38, all the color difference signal carriers at positions $(\pm\frac{1}{2}P_H, \pm\frac{1}{2}P_V)$ on the spatial frequency plane ($f_H, f_V$) are trapped, and the color difference signal carriers at positions $(0, \pm\frac{1}{2}P_V)$ can be sufficiently suppressed, thereby obtaining a good image having minimum folded distortion. If $\theta_1=\theta_2\pi/4$ is established, the optical low-pass filter may be arranged as indicated as a filter 500 shown in FIG. 39. More specifically, the filter 500 comprises an optical member 501 and an optical member 502. The optical member 501 comprises a birefringent plate 503 having a direction of projection to a surface parallel to the image plane of the optical axis at an angle of π/4 in the counterclockwise direction with respect to the scanning direction and a birefringent plate 504 having a direction of projection to a surface parallel to the image plane of the optical axis at an angle of π/4 in the clockwise direction with respect to the scanning direction. The optical member 502 comprises a birefringent plate 505 having a direction of projection to a surface parallel to the image plane of the optical axis in the scanning direction. The beam distances of the birefringent plates 503, 504, and 505 are given as $D_1/\sqrt{2}$, $D_1/\sqrt{2}$, and $D_2$, respectively.

With the above arrangement, a beam incident on the first optical member 501 is split into two beams spaced apart from each other by a distance D by the polarization behavior of the birefringent plate. The propagation direction of beams is a π/2 clockwise direction with respect to the scanning direction. The optical low-pass filter shown in FIG. 37 can have the same spatial frequency characteristics as those for $\theta_1=\theta_2=\pi/4$.

Figure 40:
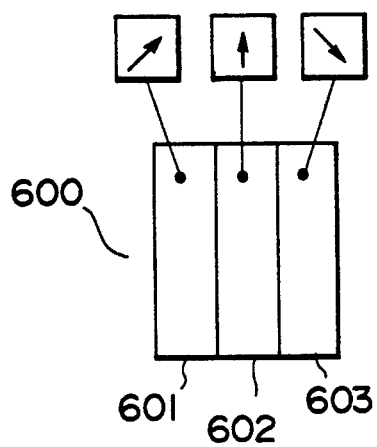
FIG. 40 is a view showing an optical low-pass filter used in another modification of the thirteenth embodiment.

The optical low-pass filter 1 may have an arrangement shown in FIG. 40. This optical low-pass filter 600 comprises an optical member 601 consisting of a birefringent plate for splitting a beam in a π/4 counterclockwise direction with respect to the scanning direction, an optical member 602 consisting of a birefringent plate for splitting a beam in a π/2 counterclockwise direction with respect to the scanning direction, and an optical member 603 consisting of a birefringent plate for splitting a beam in a π/4 clockwise direction with respect to the scanning direction.

The beam splitting widths of the optical members 601, 602, and 603 are defined as $D_1$, $D_2$, and $D_3$:

$$D_1 = D_3 = \sqrt{2}\, P_H P_V / (P_H + P_V)$$

$$D_2 = P_V$$

Figure 41:
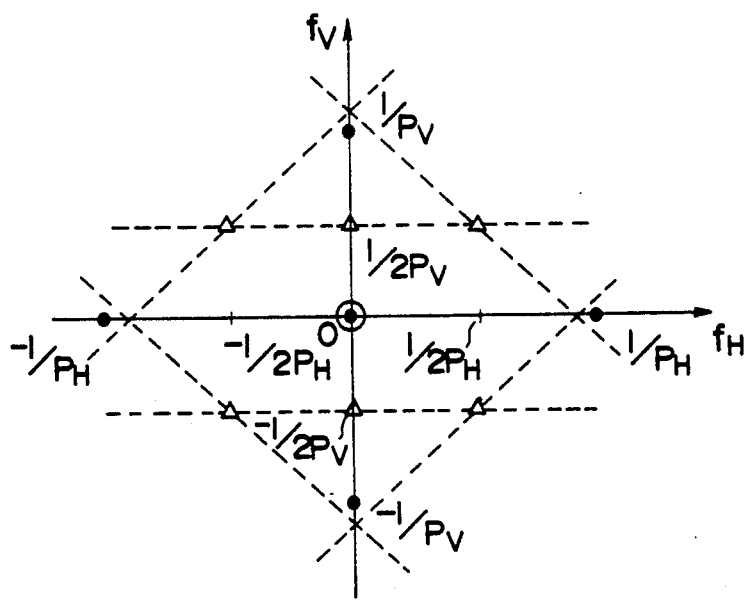
FIG. 41 is a view of the optical low-pass filter shown in FIG. 40.

The spatial frequency characteristics of an optical low-pass filter are given as shown in FIG. 41. All the color difference signal carriers at points $(\pm\frac{1}{2}P_H, \pm\frac{1}{2}P_V)$ and $(0, \pm\frac{1}{2}P_V)$ are trapped, and folded distortion can be properly suppressed.

As described above, according to this embodiment, since the color filters constituting the Bayer array are used, the moiré can be minimized and a high S/N ratio can be obtained. In addition, since the optical low-pass filter and the signal processing means which are suitable for the Bayer array are used, a higher resolution can be obtained.

The luminance information whose spectral characteristics are corrected by a simple technique is obtained.

The fourteenth embodiment of the present invention will be described below.

Figures 42, 43:
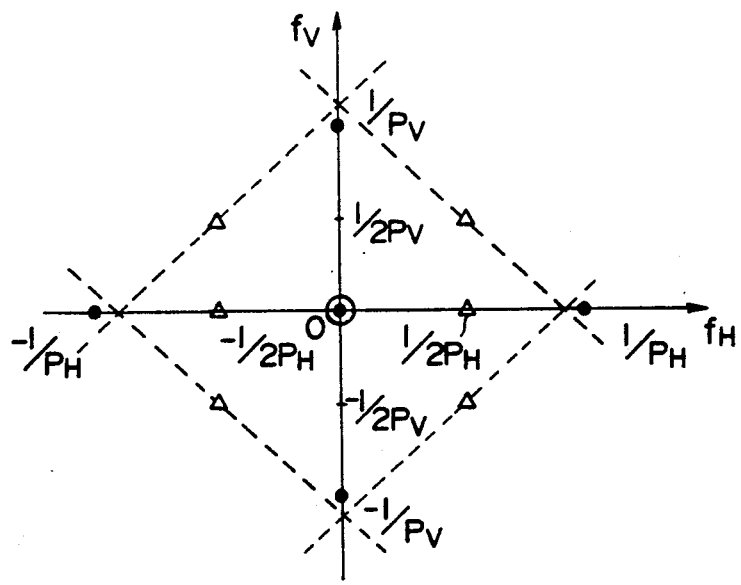
FIG. 42 is a view for explaining the fourteenth embodiment of the present invention.
FIG. 43 is a view for explaining the optical low-pass filters shown in FIGS. 37 and 39.

An image pickup element 101 has color filters identical to those of the thirteenth embodiment shown in FIG. 4A, and the overall arrangement of the eighth embodiment is the same as that of FIG. 42. A G (γth power) signal is separated into G (γth power) and G₂ (γth power) signals located at positions shown in FIG. 42 by a switch 128. Assume a monochrome object at a position $(0,\frac{1}{2}P_V)$ in the frequency space is picked up by the image pickup element 101. This object represents horizontal fringes having a period $2P_V$. For this object, the color difference signals, i.e., the (R (γth power)—G$_1$ (γth power)) signal and the (B (γth power)—G$_2$ (γth power)) signal respectively output from adders 129 and 130 become zero. Therefore, the color difference signals R-Y and B-Y output from a color difference matrix processor 113 become zero and are not output. This indicates that the carrier of the color difference signal at the frequency point $(0, \frac{1}{2}P_V)$ is canceled. In other words, the carrier of the R (γth power) signal is set in phase with that of the G$_1$ (γth power), and the carrier of the B (γth power) is also in phase with that of the G$_2$ (γth power) signal at the frequency point $(0, \frac{1}{2}P_V)$. Since these difference signals, i.e., the (R (γth power)—G$_1$ (γth power)) signal and the (B (γth power)—G$_2$ (γth power)) signal, can cancel their carriers at this frequency, the carriers of the color difference signals are not generated. Color difference signal carriers are not generated at a position $(0, -\frac{1}{2}P_V)$ symmetrical with the point $(0, \frac{1}{2}P_V)$ about the $f_H$-axis for the same reason. When an output signal obtained from the apparatus shown in FIG. 35 is to be recorded in an analog form, D/A converters 118, 114, and 115 are necessary. However, when this output signal is recorded in a digital form in a magnetic medium, an optomagnetic medium, an E$^2$PROM (Electrically Erasable PROM), or the like, the above D/A converters can be omitted. The spatial frequency characteristics obtained by employing the optical low-pass filter shown in FIG. 37 or 39 in this image pickup apparatus are shown in FIG. 43. All the color difference signal carriers at points $(\pm \frac{1}{2}P_H, \pm \frac{1}{2}P_V)$ on the spatial frequency plane $(f_H, f_V)$ are trapped, and color difference signal carriers at points $(\pm \frac{1}{2}P_H, 0)$ are sufficiently suppressed. Folded distortion can be properly suppressed.

Figure 44:
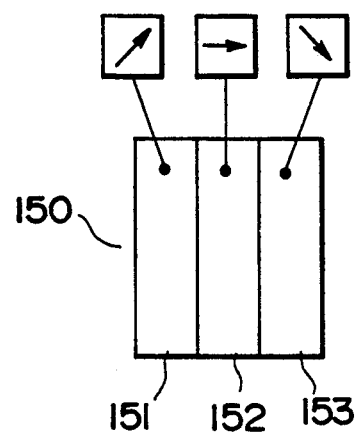
FIG. 44 is a view of an optical low-pass filter used in a modification of the fourteenth embodiment.

The optical low-pass filter may have an arrangement shown in FIG. 44. This optical low-pass filter 150 comprises an optical member 151 consisting of a birefringent plate for splitting a beam in a π/4 counterclockwise direction with respect to the scanning direction, an optical member 152 consisting of a birefringent plate for splitting a beam in a direction parallel to the scanning direction, and an optical member 153 consisting of a birefringent plate for splitting a beam in a π/4 clockwise direction with respect to the scanning direction. The beam splitting widths of the optical members 151, 152, and 153 are defined as D$_1$, D$_2$, and D$_3$:

$$D_1 = D_3 = \sqrt{2} \, P_H P_V/(P_H + P_V)$$

$$D_2 = P_H$$

Figure 45:
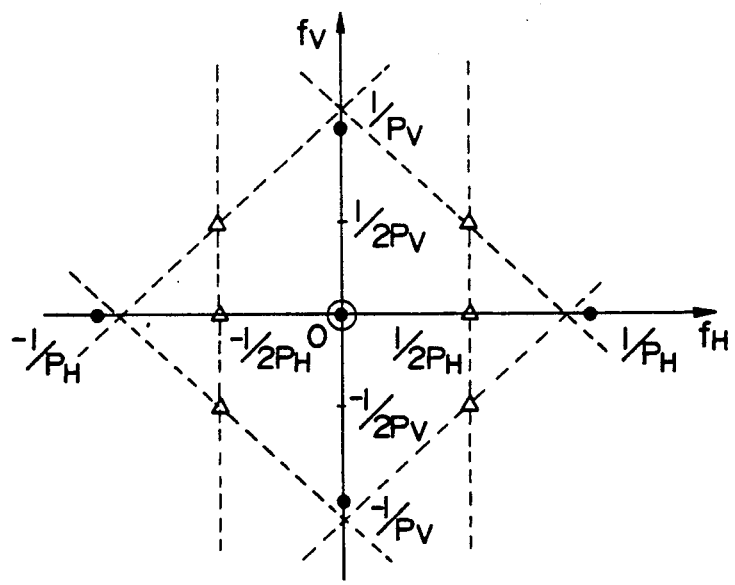
FIG. 45 is a view for explaining the optical low-pass filter shown in FIG. 44.

The spatial frequency characteristics of an optical low-pass filter 150 are given as shown in FIG. 45. All the color difference signal carriers at points $(\pm \frac{1}{2}P_H, \pm \frac{1}{2}P_V)$ and $(0, \pm \frac{1}{2}P_V)$ are trapped, and folded distortion can be properly suppressed.

The luminance information is obtained in the same manner as in the thirteenth embodiment.

The fifteenth embodiment of the present invention will be described below.

Figure 46:
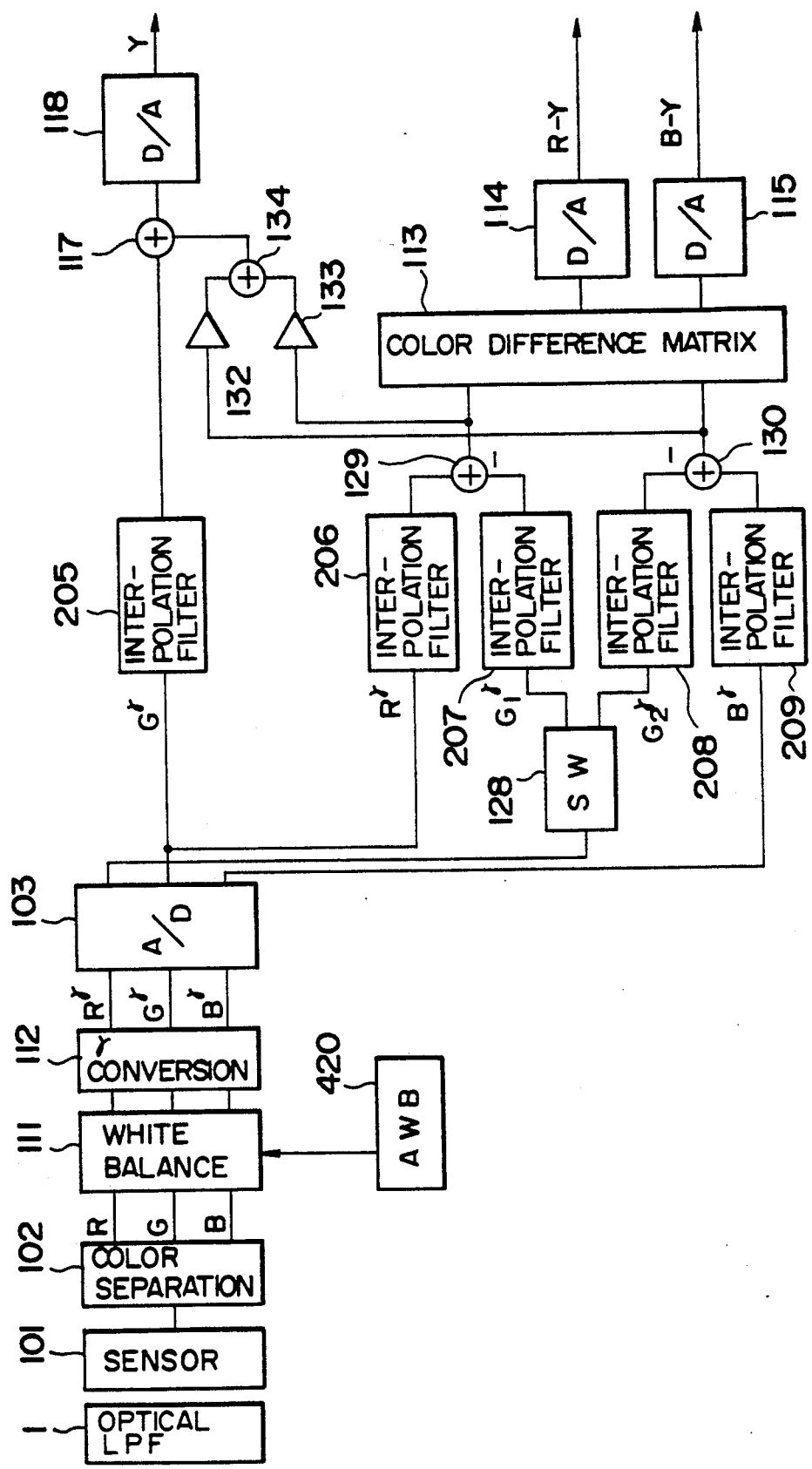
FIG. 46 is a block diagram showing the fifteenth embodiment of the present invention.

FIG. 46 is a block diagram of a "color image pickup apparatus" according to this embodiment. A beam from an object to be photographed is incident on an image pickup element (sensor) 101 through an optical low-pass filter 1 by a focusing optical system (not shown).

Figure 39:
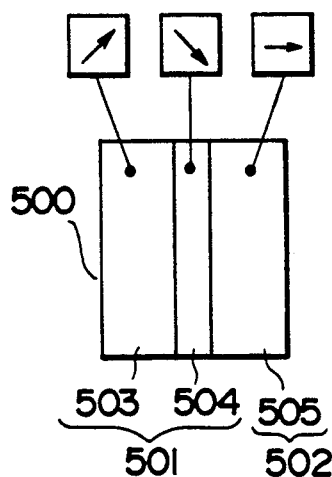
FIG. 39 is a view of an optical low-pass filter used in a modification of the thirteenth embodiment.

The optical low-pass filter 1 has an arrangement shown in FIG. 37, 39, or 40 and properly suppresses folded distortion. The image pickup element (sensor) 101 has R, G, and B filters constituting a Bayer array shown in FIG. 4A. An image signal read from the image pickup element 101 pixel by pixel is separated into R, G, and B signals by a color separation unit 102. The G, and B signals are subjected to white balance adjustment by a white balance unit 111 on the basis of color temperature information obtained from a white balance sensor 420. An output from the white balance unit 111 is subjected to γ correction by a Y correction unit 112. An output from the γ correction unit 112 is A/D-converted by an A/D (analog-to-digital) converter 103. A luminance signal is obtained as follows. An offset sampling structure of a G (γth power) signal is two-dimensionally interpolated by an interpolation filter 205, and an output from the interpolation filter 205 is D/A-converted by a D/A converter 118. An analog signal is thus output from the D/A converter 118. In addition to the coincidence operation by interpolation in the interpolation filter 205, processing such as two-dimensional low-pass filtering and edge emphasis are performed. Meanwhile, a G (γth power) signal of outputs from the A/D converter 103 is separated by a switch 128 into G$_1$ (γth power) and G$_2$ (γth power) signals located at the illustrated positions shown in FIG. 36. This operation can be performed by operating the switch 128, e.g., every horizontal scanning period. The separated G$_1$ (γth power) and G$_2$ (γth power) signals are input together with an R (γth power) signal and a B (γth power) signal to interpolation filters 206, 207, 208, and 209, respectively, thereby obtaining coincident R (γth power), G$_1$ (γth power), G$_2$ (γth power), and B (γth power) signals. In addition to the coincidence operation by interpolation in the interpolation filters 206 to 209, linear processing such as two-dimensional low-pass filtering and edge emphasis are performed. Since these processing operations are linear processing operations, they can be performed after addition (to be described in detail later). The coincident R (γth power) and G$_1$ (γth power) signals are subtracted from each other by an adder 129, and an (R (γth power)—G$_1$ (γth power)) signal is output from the adder 129. Similarly, the B (γth power) and G$_2$ (γth power) signals are subtracted from each other by an adder 130, and a (B (γth power)—G$_2$ (γth power)) signal is output from the adder 130. Color difference signals R-Y and B-Y are generated by a color difference matrix processor 113 as in the thirteenth and fourteenth embodiments.

Assume a monochrome object at a position $(\frac{1}{2}P_H, 0)$ in the frequency space is picked up by the image pickup element 101. This object represents vertical fringes having a period $2P_H$. For this object, the (R (γth power)—G$_1$ (γth power)) signal and the (B (γth power)—G$_2$ (γth power)) signal respectively output from the adders 129 and 130 become zero and are not output. This indicates that the carrier of the color difference signal at the frequency point $(\frac{1}{2}P_H, 0)$ is canceled. In other words, the carrier of the R (γth power) signal is set in phase with that of the G$_1$ (γth power), and the carrier of the B (γth power) is also in phase with that of the G$_2$ (γth power) signal at the frequency point $(\frac{1}{2}P_H, 0)$. Since these R-Y and B-Y can cancel their carriers at this frequency, the carriers of the color difference signals are not generated. These color difference signals are D/A-converted into analog signals by D/A converters 114 and 115. Color difference signal carriers are not generated at a position $(-\frac{1}{2}P_H, 0)$ symmetrical with the point $(\frac{1}{2}H_P, 0)$ about the $f_V$-axis for the same reason.

Since the color difference signals R-Y and B-Y generally have bandwidths sufficiently narrower than the luminance signal Y, operations of the adders 129 and 130, and the like for the interpolated coincident R ($\gamma$th power), G$_1$ ($\gamma$th power), G$_2$ ($\gamma$th power), and B ($\gamma$th power) signals may be performed using a clock having a lower clock rate than that of the luminance signal Y by extraction or interlacing. In this embodiment, unlike in the thirteenth and fourteenth embodiments, the carriers of not the color difference signals but the luminance signals appear at positions ($\pm\frac{1}{2}P_H, \pm\frac{1}{2}P_V$) on the spatial frequency plane ($f_H, f_V$). The optical low-pass filters 300, 500, and 600 shown in FIGS. 37, 39, and 40 have frequency characteristics represented by the dotted lines in FIGS. 38 and 41, so that the above carriers can be trapped and folded distortion is also properly suppressed.

The luminance information is formed by directly using the G signal as Y$_S$ in the above description of the principle.

The fifteenth embodiment of the present invention will be described below.

An image pickup element 101 has color filters identical to those of the fourteenth embodiment shown in FIG. 4A, and the overall arrangement of the tenth embodiment is the same as that of FIG. 46. A G ($\gamma$th power) signal is separated into G$_1$ ($\gamma$th power) and G$_2$ ($\gamma$th power) signals located at positions shown in FIG. 42 by a switch 128.

Assume a monochrome object at a position $(0,\frac{1}{2}P_V)$ in the frequency space is picked up by the image pickup element 101. This object represents horizontal fringes having a period 2P$_V$. For this object, an (R ($\gamma$th power) —G$_1$ ($\gamma$th power)) signal and a (B ($\gamma$th power) —G$_2$ ($\gamma$th power)) signal respectively output from adders 129 and 130 become zero. Therefore, the (R ($\gamma$th power)—G$_1$ ($\gamma$th power)) signal and the (B ($\gamma$th power)—G$_2$ ($\gamma$th power)) signal output from the adders 129 and 130 become zero and are not output. This indicates that the carrier of the color difference signal at the frequency point $(0,\frac{1}{2}P_V)$ is canceled. In other words, the carrier of the R ($\gamma$th power) signal is set in phase with that of the G$_1$ ($\gamma$th power), and the carrier of the B ($\gamma$th power) is also in phase with that of the G$_2$ ($\gamma$th power) signal at the frequency point $(0,\frac{1}{2}P_V)$. Since these difference signals, i.e., the (R ($\gamma$th power)—G$_1$ ($\gamma$th power)) signal and the (B ($\gamma$th power)—G$_2$ ($\gamma$th power)) signal can cancel their carriers at this frequency, the carriers of the color difference signals are not generated. When an output signal obtained from the apparatus shown in FIG. 46 is to be recorded in an analog form, D/A converters 118, 114, and 115 are necessary. However, when this output signal is recorded in a digital form in a magnetic medium, an optomagnetic medium, an E$^2$PROM (Electrically Erasable PROM), or the like, the above D/A converters can be omitted.

The optical low-pass filter 1 may comprise an arrangement shown in FIG. 37, 39, or 44. The spatial frequency characteristics are excellent to properly suppress folded distortion, as shown in FIGS. 43 and 45.

The luminance signal is formed in the same manner as in the fourteenth embodiment.

Figure 49:
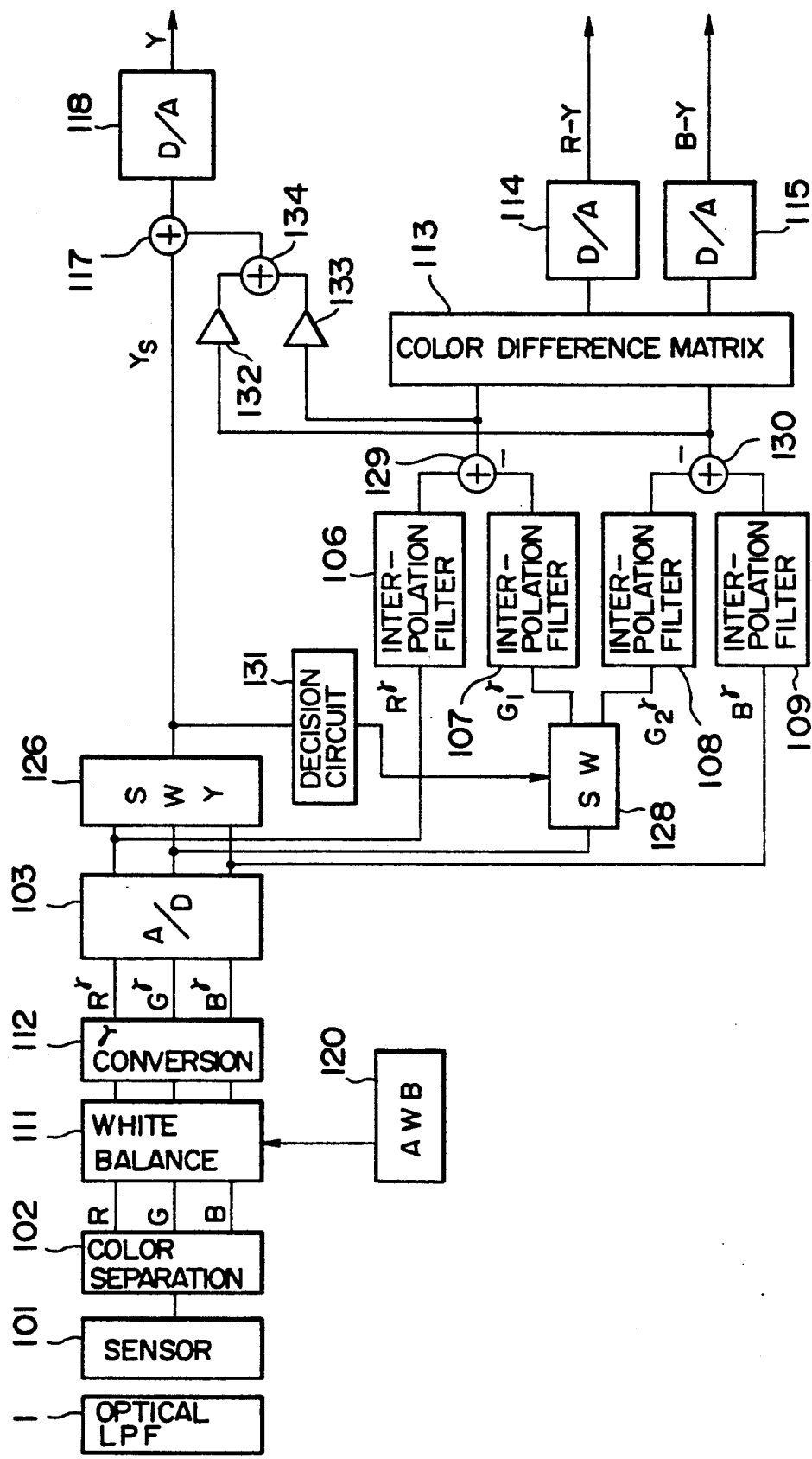
FIG. 49 is a block diagram showing the sixteenth embodiment of the present invention.
Figure 50:
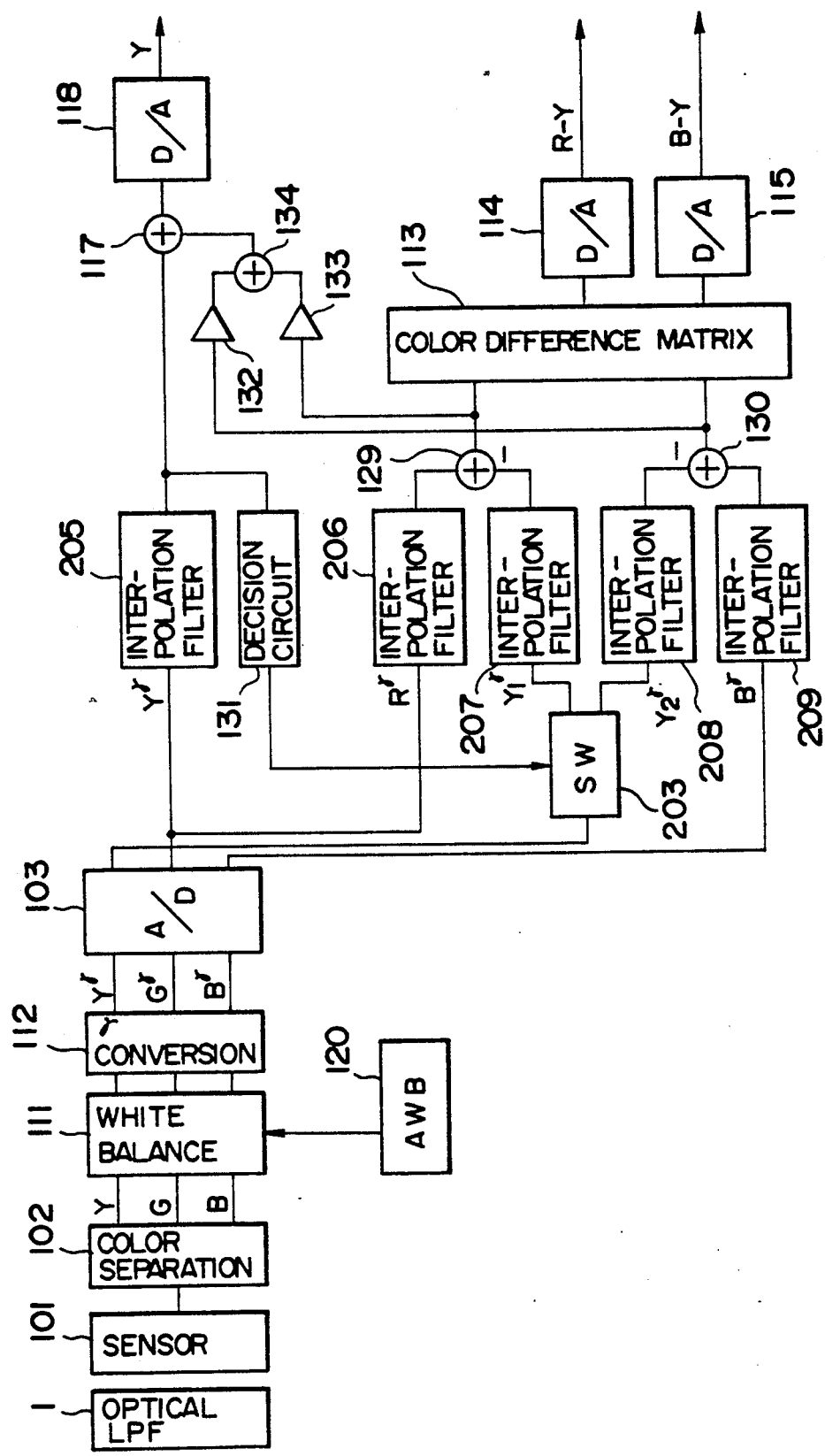
FIG. 50 is a block diagram showing the seventeenth embodiment of the present invention.

In addition, the color difference signals may be formed as follows. That is, as shown in FIG. 49, separation of the G ($\gamma$th power) signal by the switch 128 can be switched between timings shown in FIGS. 36 and 42 in accordance with a luminance signal of an object. This arrangement will be described as the sixteenth embodiment. Selection of the timing of FIG. 36 or 42 is determined by a decision circuit 131 (to be described later). Similarly, as shown in FIG. 50, separation of the G ($\gamma$th power) signal by a switch 203 is performed by switching between timings shown in FIGS. 36 and 42 in accordance with a luminance signal of the object. This arrangement will be described as the seventeenth embodiment.

Selection of either timing is determined by a decision circuit 131. The decision circuit 131 can be arranged in the same manner as in FIG. 33 or 34.

The color filters of the image pickup element need not be R, G, and B filters. As shown in FIG. 47, a Bayer array having a Y filter (i.e., a filter having spectral characteristics close to those of the luminance signal), an R filter, and a B filter respectively corresponding to the first, second, and third filters may be used. As shown in FIG. 48, a Bayer array having a W (white) filter, an R filter, and a B filter respectively corresponding to the first, second, and third filters may be used. Any array can be employed if color difference signals R-Y and B-Y represented by matrix (1) can be obtained by an arithmetic operation using the first and second difference signals when the first color signal is separated as shown in FIG. 36 or 42 to form the first and second difference signals (the matrix coefficients need not be limited to the specific ones shown in the matrix for obtaining the signals R-Y and B-Y).

As described above, since the color filters constituting the Bayer array are used in the image pickup element, appropriate signal processing is performed. There is therefore provided a color image pickup apparatus capable of producing an image having a high resolution, reduced moiré, and a high S/N ratio.

The present invention will be described in detail with reference to still another embodiment hereinafter.

Figure 51:
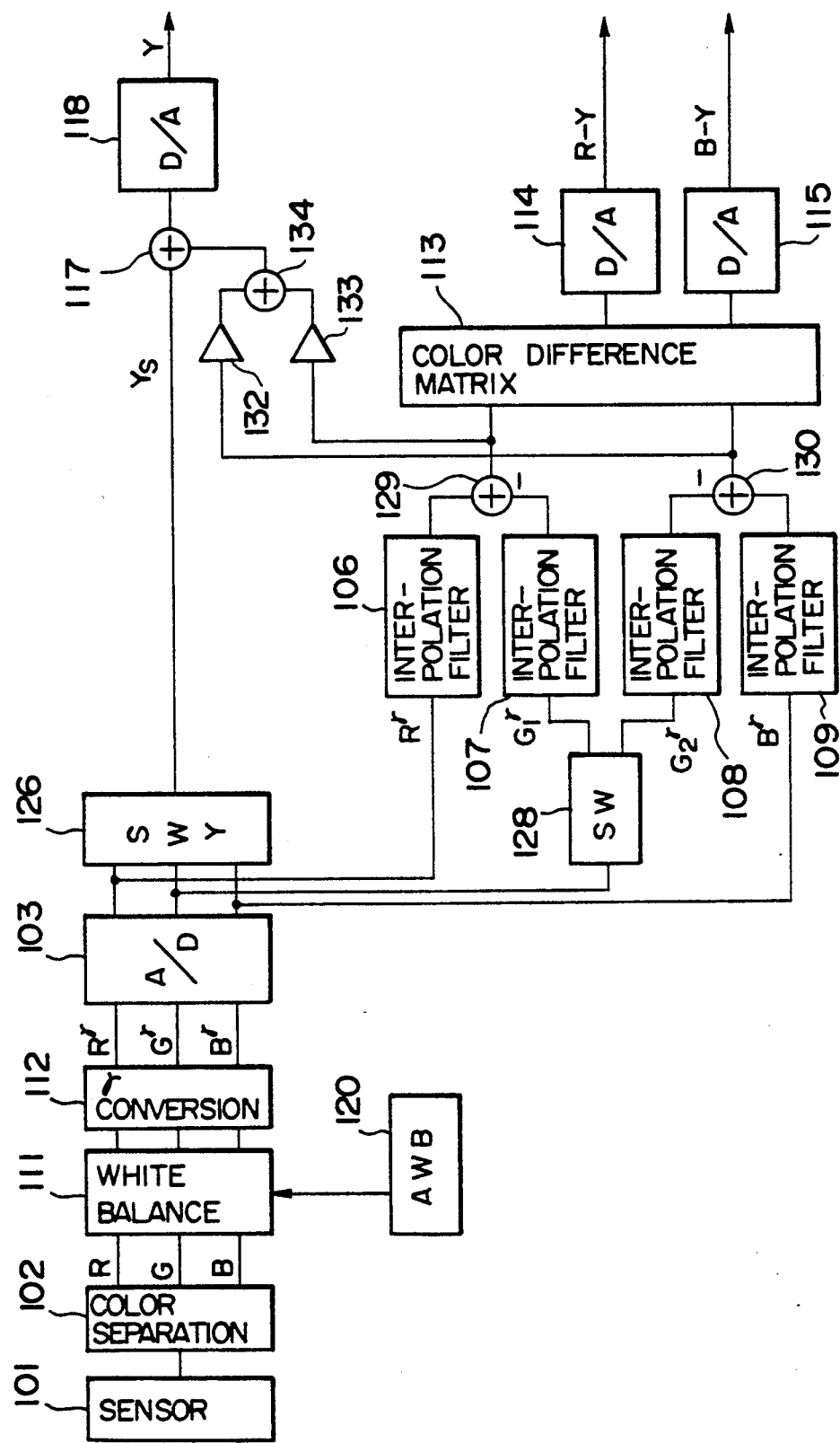
FIG. 51 is a block diagram showing the eighteenth and nineteenth embodiments of the present invention.

FIG. 51 is a block diagram showing a "color image pickup apparatus" as the eighteenth embodiment of the present invention. R, G, and B filters (filter array) having a Bayer array shown in FIG. 4A are arranged in an image pickup element (sensor) 101. An image signal read from the image pickup element 101 pixel by pixel is separated into R, G, and B signals by a color separation unit 102. The R, G, and B signals are subjected to white balance adjustment by a white balance unit 111 on the basis of color temperature information obtained from a white balance sensor (AWB) 120. An output from the white balance unit 111 is subjected to $\gamma$ correction by a $\gamma$ correction unit 112. An output from the $\gamma$ correction unit 112 is A/D-converted by an A/D (analog-to-digital) converter 103.

A luminance signal is switched by a switch circuit (SWY) 126 and is rearranged in a read order. The rearranged luminance signal is read as a luminance signal Y$_S$ including a high-frequency component. This luminance signal Y$_S$ is added by an adder 117 to signals representing the products between constants and a first difference signal, i.e., an (R ($\gamma$th power)—G$_1$ ($\gamma$th power)) signal and a second difference signal, i.e., a (B ($\gamma$th power)—G$_2$ ($\gamma$th power)) signal. An output from the adder 117 is D/A-converted by a D/A (digital-to-analog) converter 118.

Meanwhile, a G ($\gamma$th power) signal of outputs from the A/D converter 103 is separated by a switch (SW) 128 into G$_1$ ($\gamma$th power) and G$_2$ ($\gamma$th power) signals located at positions shown in FIG. 52. This operation can be performed by operating the switch 128, e.g., every horizontal scanning period. The separated G$_1$ ($\gamma$th power) and $G_2$ ($\gamma$th power) signals are input together with an R ($\gamma$th power) signal and a B ($\gamma$th power) signal to interpolation filters 106, 107, 108, and 109, respectively, thereby obtaining coincident R ($\gamma$th power), $G_1$ ($\gamma$th power), $G_2$ ($\gamma$th power), and B ($\gamma$th power) signals. In addition to the coincidence operation by interpolation in the interpolation filters 106 to 109, linear processing such as two-dimensional low-pass filtering and edge emphasis are performed. Since these processing operations are linear processing operations, they can be performed after addition and matrix processing (both will be described in detail later).

The coincident R ($\gamma$th power) and $G_1$ ($\gamma$th power) signals are subtracted from each other by an adder 129, and an (R ($\gamma$th power)—$G_1$ ($\gamma$th power)) signal is output from the adder 129. Similarly, the B ($\gamma$th power) and $G_2$ ($\gamma$th power) signals are subtracted from each other by an adder 130, and a (B ($\gamma$th power)—$G_2$ ($\gamma$th power)) signal is output from the adder 130. These output signals are input to a color difference matrix processor 113, and the following matrix operation is performed to derive color difference signals R-Y and B-Y.

$$\begin{bmatrix} R - Y \\ B - Y \end{bmatrix} = \begin{bmatrix} 0.70 & -0.11 \\ -0.30 & +0.89 \end{bmatrix} \begin{bmatrix} R^\gamma - G_1^\gamma \\ B^\gamma - G_2^\gamma \end{bmatrix}$$

Assume a monochrome object at a position ($\frac{1}{2}P_H$,0) in the frequency space is picked up by the image pickup element 101. This object represents vertical fringes having a period $2P_H$. For this object, conditions R ($\gamma$th power)=$G_1$ ($\gamma$th power) and B ($\gamma$th power)=$G_2$ ($\gamma$th power) are established. The color difference signals, i.e., the (R ($\gamma$th power)—$G_1$ ($\gamma$th power)) signal and the (B $\gamma$th power)—$G_2$ ($\gamma$th power)) signal respectively output from the adders 129 and 130 become zero. Therefore, the color difference signals R-Y and B-Y output from the color difference matrix processor 113 become zero and are not output. This indicates that the carrier of the color difference signal at the frequency point ($\frac{1}{2}P_H$,0) is canceled. In other words, the carrier of the R ($\gamma$th power) signal is set in phase with that of the G ($\gamma$th power), and the carrier of the B ($\gamma$th power) is also in phase with that of the $G_2$ ($\gamma$th power) signal at the frequency point ($\frac{1}{2}P_H$,0). Since these difference signals, i.e., the (R ($\gamma$th power)—$G_1$ ($\gamma$th power)) signal and the (B ($\gamma$th power)—$G_2$ ($\gamma$th power)) signal, can cancel their carriers at this frequency, the carriers of the color difference signals are not generated. These color difference signals are D/A-converted by D/A converters 114 and 115.

The first difference signal (R ($\gamma$th power)—$G_1$ ($\gamma$th power)) signal and the second difference signal (B ($\gamma$th power)—$G_2$ ($\gamma$th power)) are multiplied with constants by constant multipliers 132 and 133 and are added by an adder 134. An output from the adder 134 is added to the luminance signal $Y_S$ by the adder 117, thereby obtaining a luminance signal Y whose spectral characteristics are corrected.

The principle of this operation will be described below.

Assume that outputs from the respective pixels of the image pickup element 101 are simply synthesized, and the resultant luminance signal is defined as $Y_S$. The luminance signal $Y_S$ is obtained by switching the output signals from the respective pixels by means of the switch circuit 126. One of the color-separated components, e.g., a G signal may be used. To the contrary, the luminance signal whose spectral characteristics are corrected to be equal to visibility sensitivity is defined as $Y_L$. The luminance signal $Y_L$ can be formed by linear coupling of coincident color signals and is defined as follows:

$$Y_L \delta R^\gamma \alpha G_1^\gamma + \beta G_2^\gamma + \epsilon B^\gamma$$

for $\delta + \alpha + \beta + \epsilon = 1$ \hfill (1)

In the NTSC scheme, $$\delta = 0.30, \alpha + \beta = 0.59, \epsilon = 0.11 \hfill (2)$$

The luminance signal $Y_L$ has a lower band than that of the luminance signal $Y_S$. Of all the luminance signals $Y_S$, a luminance signal having the same band as that of the luminance signal $Y_L$ is defined as $Y_{SL}$. At this time, the luminance signal Y is corrected by substituting the low-frequency component $Y_{SL}$ of the luminance signal $Y_S$ with the luminance signal $Y_L$ having the correct spectral characteristics. That is, $$Y = (Y_S - Y_{SL}) + Y_L = Y_L + (Y_L - Y_{SL}) \hfill (3)$$

The luminance signal $Y_{SL}$ can be expressed by linear coupling of respective color signals and is defined as follows:
$$Y_{SL} = sR^\gamma + tG_1^\gamma + uG_2^\gamma + wB^\gamma$$

for $s + t + u + w = 1$ \hfill (4)

At this time, terms within the parentheses on the right side in equation (3) are defined as follows:

$$Y_L - Y_{SL} = (\delta - s)R^\gamma - (t - \alpha)G_1^\gamma + (\epsilon - w)B^\gamma - (u - \beta)G_2$$
wherein if $\delta - s = t - \alpha$, then $s + t = \alpha + \delta$ and
$\delta + \alpha + \beta + \epsilon = s + t + u + w (=1)$, so that
$\beta + \epsilon = u + w$ therefore $$\epsilon - w = u - \beta$$

If the following conditions are given:

$$C_1 = \delta - s = t - \alpha \hfill (5)$$

$$C_2 = \delta - w = u - \beta \hfill (6)$$

the following equation is derived:

$$Y_L - Y_{SL} = C_1(R^\gamma G_1^\gamma) + C_2(B^\gamma - G_2^\gamma)$$

A substitution of this equation into equation (3) yields the following:

$$Y = Y_S + C_1(R^\gamma - G_1^\gamma) + C_2(R^\gamma - G_2^\gamma) \hfill (7)$$

The spectral characteristics of the luminance signal Y are obtained by adding products of the constants and the first and second difference signals (R ($\gamma$th power)—$G_1$ ($\gamma$th power)) and (B ($\gamma$th power)—$G_2$ ($\gamma$th power)) to the simply synthesized luminance signal $Y_S$.

When the luminance signal $Y_S$ is obtained by a switching operation of the switch circuit 126, values s, t, u, and w in equation (4) satisfy the following equation:

$$s = t = u = w = 0.25 \hfill (8)$$

the following relations are derived from equations (2), (5), and (6):

$$\alpha = 0.20, \beta = 0.39,$$
$$c_1 = 0.05, c_2 = -0.14 \quad (9)$$

When the luminance signal $Y_S$ is obtained using the G signal, the values s, t, u, and w are given as follows:

$$s = w = 0, t = u = 0.5 \quad (10)$$

The following relations are then derived from equations (2), (5), and (6):

$$\alpha = 0.20, \beta = 0.39,$$
$$c_1 = 0.30, c_2 = 0.11 \quad (11)$$

The luminance signal whose spectral characteristics are corrected as described above is D/A-converted by the D/A converter 118, and an analog signal is output from the D/A converter 118. Since the color difference signals R-Y and B-Y and the low-frequency component $Y_L$ of the luminance signal generally have bandwidths sufficiently narrower than the luminance signal Y, operations of the adders 129 and 130, the color difference matrix processor 113, and the like for the interpolated coincident R ($\gamma$th power), $G_1$ ($\gamma$th power), $G_2$ ($\gamma$th power), and B ($\gamma$th power) signals may be performed using a clock having a lower clock rate than that of the luminance signal Y by extraction or interlacing.

As described above, according to this embodiment, since stripe filters are not used, the moiré can be minimized. In addition, since complementary color filters are not used, a high S/N ratio can be obtained. Since the color signals carriers at the frequency point ($\frac{1}{2}P_S$,0) can be canceled, a higher resolution can be obtained The luminance information whose spectral characteristics are corrected can be obtained by a simple technique.

The nineteenth embodiment of the present invention will be described below.

A filter array as in the eighteenth embodiment (FIG. 4A) is arranged in an image pickup element 101. The overall arrangement of the eighteenth embodiment is substantially the same as that of FIG. 51, except that a G ($\gamma$th power) signal output from an A/D converter 103 is separated into $G_1$ ($\gamma$th power) and $G_2$ ($\gamma$th power) signals located at positions shown in FIG. 53 by a switch 128.

Assume that a monochrome object at a position $(0,\frac{1}{2}P_V)$ in the frequency space is picked up by the image pickup element 101. This object represents horizontal fringes having a period $2P_V$. For this object, conditions R ($\gamma$th power) = $G_1$ ($\gamma$th power) and B ($\gamma$th power) = $G_2$ ($\gamma$th power) are established. The color difference signals, i.e., the (R ($\gamma$th power) — $G_1$ ($\gamma$th power)) signal and the (B ($\gamma$th power) — $G_2$ ($\gamma$th power)) signal respectively output from adders 129 and 130 become zero. Therefore, the color difference signals, R-Y and B-Y output from a color difference matrix processor 113 become zero and are not output. This indicates that the carrier of the color difference signal at the frequency point $(0,\frac{1}{2}P_V)$ is canceled. In other words, the carrier of the R ($\gamma$th power) signal is set in phase with that of the $G_1$ ($\gamma$th power), and the carrier of the B ($\gamma$th power) is also in phase with that of the $G_2$ ($\gamma$th power) signal at the frequency point $(0,\frac{1}{2}P_V)$. Since these difference signals, i.e., the (R ($\gamma$th power) — $G_1$ ($\gamma$th power)) signal and the (B ($\gamma$th power) — $G_2$ ($\gamma$th power)) signal, can cancel their carriers at this frequency, the carriers of the color difference signals are not generated. The luminance information is formed in the same manner as in the eighteenth embodiment.

When an output signal obtained from the apparatus shown in FIG. 51 is to be recorded in an analog form, D/A converters 118, 114, and 115 are necessary. However, when this output signal is recorded in a digital form in a magnetic medium, an optomagnetic medium, an $E^2PROM$ (Electrically Erasable PROM), or the like, the above D/A converters can be omitted.

The twentieth embodiment of the present invention will be described below.

Figure 54:
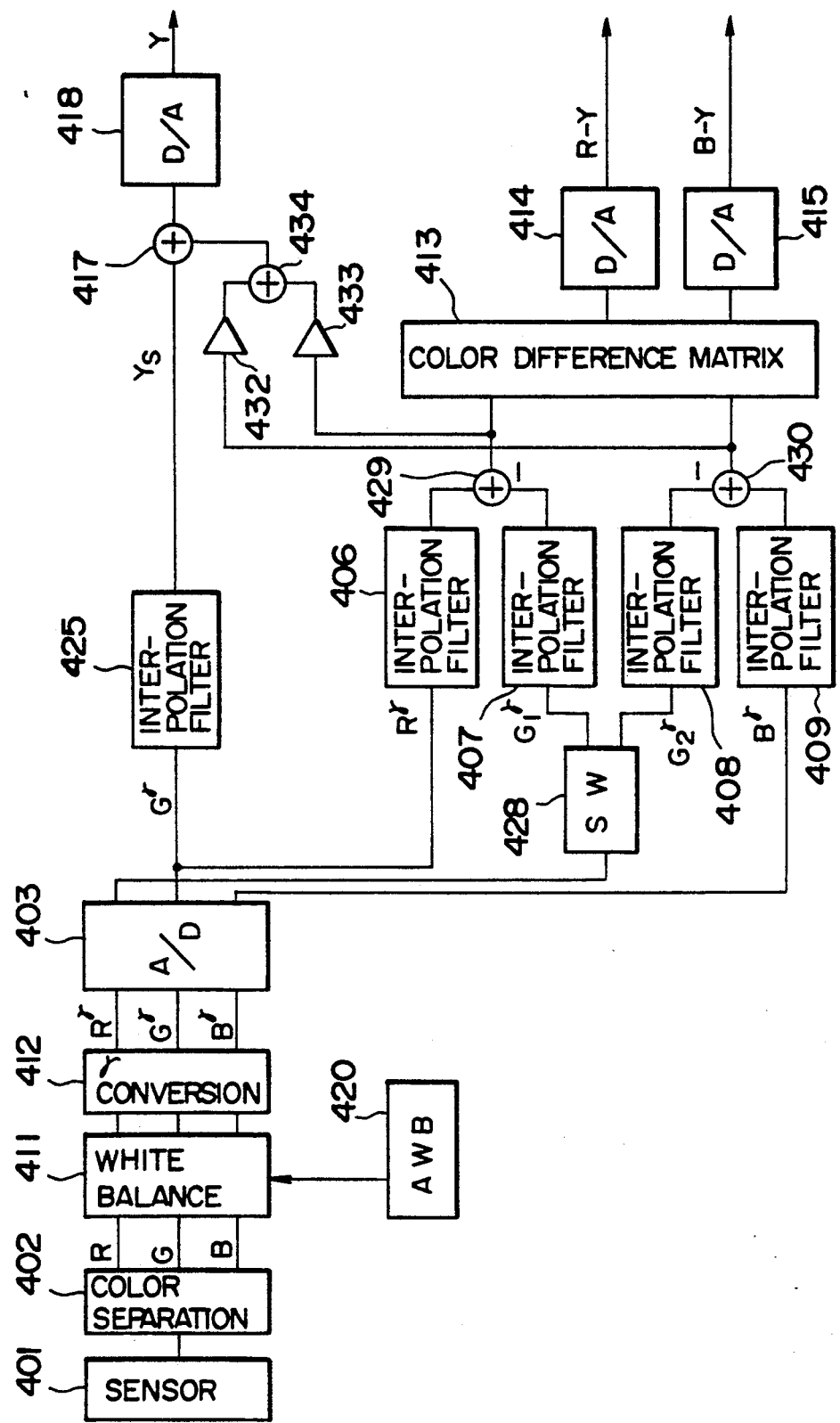
FIG. 54 is a block diagram showing the twentieth and twenty-first embodiments.

FIG. 54 is a block diagram showing a signal processing section of a "color image pickup apparatus" of the twentieth embodiment of the present invention. R, G, and B filters having a Bayer array shown in FIG. 4A are arranged in an image pickup element (sensor) 401. An image signal read from the image pickup element 401 pixel by pixel is separated into R, G, and B signals by a color separation unit 402. The R, G, and B signals are subjected to white balance adjustment by a white balance unit 411 on the basis of color temperature information obtained from a white balance sensor (AWB) 420. An output from the white balance unit 411 is subjected to $\gamma$ correction by a $\gamma$ correction unit 412. An output from the $\gamma$ correction unit 412 is A/D-converted by an A/D (analog-to-digital) converter 403.

A luminance signal is obtained as follows. An offset sampling structure of a G ($\gamma$th power) signal is two-dimensionally interpolated by an interpolation filter 425, the spectral characteristics of the G signal are corrected by first and second difference signals (to be described later) by an adder 417, and an output from the interpolation filter 425 is D/A-converted by a D/A converter 418. An analog signal is thus output from the D/A converter 418. In addition to the coincidence operation by interpolation in the interpolation filter 425, processing such as two-dimensional low-pass filtering and edge emphasis are performed.

Meanwhile, a G ($\gamma$th power) signal of outputs from the A/D converter 403 is separated by a switch 428 into $G_1$ ($\gamma$th power) and $G_2$ ($\gamma$th power) signals located at positions shown in FIG. 52. This operation can be performed by operating the switch 428, e.g., every horizontal scanning period. The separated $G_1$ ($\gamma$th power) and $G_2$ ($\gamma$th power) signals are input together with an R ($\gamma$th power) signal and a B ($\gamma$th power) signal to interpolation filters 406, 407, 408, and 409, respectively, thereby obtaining coincident R ($\gamma$th power), $G_1$ ($\gamma$th power), $G_2$ ($\gamma$th power), and B ($\gamma$th power) signals. In addition to the coincidence operation by interpolation in the interpolation filters 406 to 409, linear processing such as two-dimensional low-pass filtering and edge emphasis are performed. Since these processing operations are linear processing operations, they can be performed after addition (to be described in detail later).

The coincident R ($\gamma$th power) and $G_1$ ($\gamma$th power) signals are subtracted from each other by an adder 429, and a first difference signal, i.e., an (R ($\gamma$th power) — $G_1$ ($\gamma$th power)) signal is output from the adder 429. Similarly, the B ($\gamma$th power) and $G_2$ ($\gamma$th power) signals are subtracted from each other by an adder 430, and a second difference signal, i.e., a (B ($\gamma$th power) — $G_2$ ($\gamma$th power)) signal is output from the adder 430. Color difference signals R-Y and B-Y are generated by a color difference matrix processor 413.

Assume that a monochrome object at a position ($\frac{1}{2}P_H$,0) in the frequency space is picked up by the image pickup element 401. This object represents vertical fringes having a period $2P_H$. For this object, the (R ($\gamma$th power)—$G_1$ ($\gamma$th power)) signal and the (B ($\gamma$th power)—$G_2$ ($\gamma$th power)) signal respectively output from the adders 429 and 430 become zero and are not output. This indicates that the carrier of the color difference signal at the frequency point ($\frac{1}{2}P_H$,0) is canceled.

The luminance signal is formed by directly using the G signal as $Y_S$ in the description of the principle of luminance signal correction.

The twenty-first embodiment of the present invention will be described below.

An image pickup element has a Bayer array (FIG. 4A) as in the twentieth embodiment. The overall arrangement of the twentieth embodiment is substantially the same as that of the arrangement shown in FIG. 54, except that a Y ($\gamma$th power) signal output from an A/D converter 403 is separated into $G_1$ ($\gamma$th power) and $G_2$ ($\gamma$th power) signals located at positions shown in FIG. 53 by a switch 428.

Assume that a monochrome object at a position (0,$\frac{1}{2}P_V$) in the frequency space is picked up by an image pickup element 401. This object represents horizontal fringes having a period $2P_V$. For this object, the (R ($\gamma$th power)—$G_1$ ($\gamma$th power)) signal and the (B ($\gamma$th power)—$G_2$ ($\gamma$th power)) signal respectively output from adders 429 and 430 become zero and are not output. This indicates that the carrier of the color difference signal at the frequency point (0,$\frac{1}{2}P_V$) is canceled. The luminance signal is formed in the same manner as in the twentieth embodiment.

The color filters of the image pickup element need not be R, G, and B filters. As shown in FIG. 47, a Bayer array having a Y filter (i.e., a filter having spectral characteristics close to those of the luminance signal), an R filter, and a B filter respectively corresponding to the first, second, and third filters may be used. As shown in FIG. 48, a Bayer array having a W (white) filter, an R filter, and a B filter respectively corresponding to the first, second, and third filters may be used. Any array can be employed if color difference signals R-Y and B-Y represented by matrix (1) can be obtained by an arithmetic operation using the first and second difference signals when the first color signal is separated as shown in FIG. 52 or 53 to form the first and second difference signals (the matrix coefficients need not be limited to the specific ones shown in matrix (1) for causing the color difference matrix processor 113 to obtain the color difference signals R-Y and B-Y).

As described above, there is provided a color image pickup apparatus capable of obtaining luminance information whose spectral characteristics are corrected by a simple technique and of obtaining a good image having a high resolution, reduced moiré and a high S/N ratio.

The present invention will be described in detail with reference to still another embodiment hereinafter.

Figure 55:
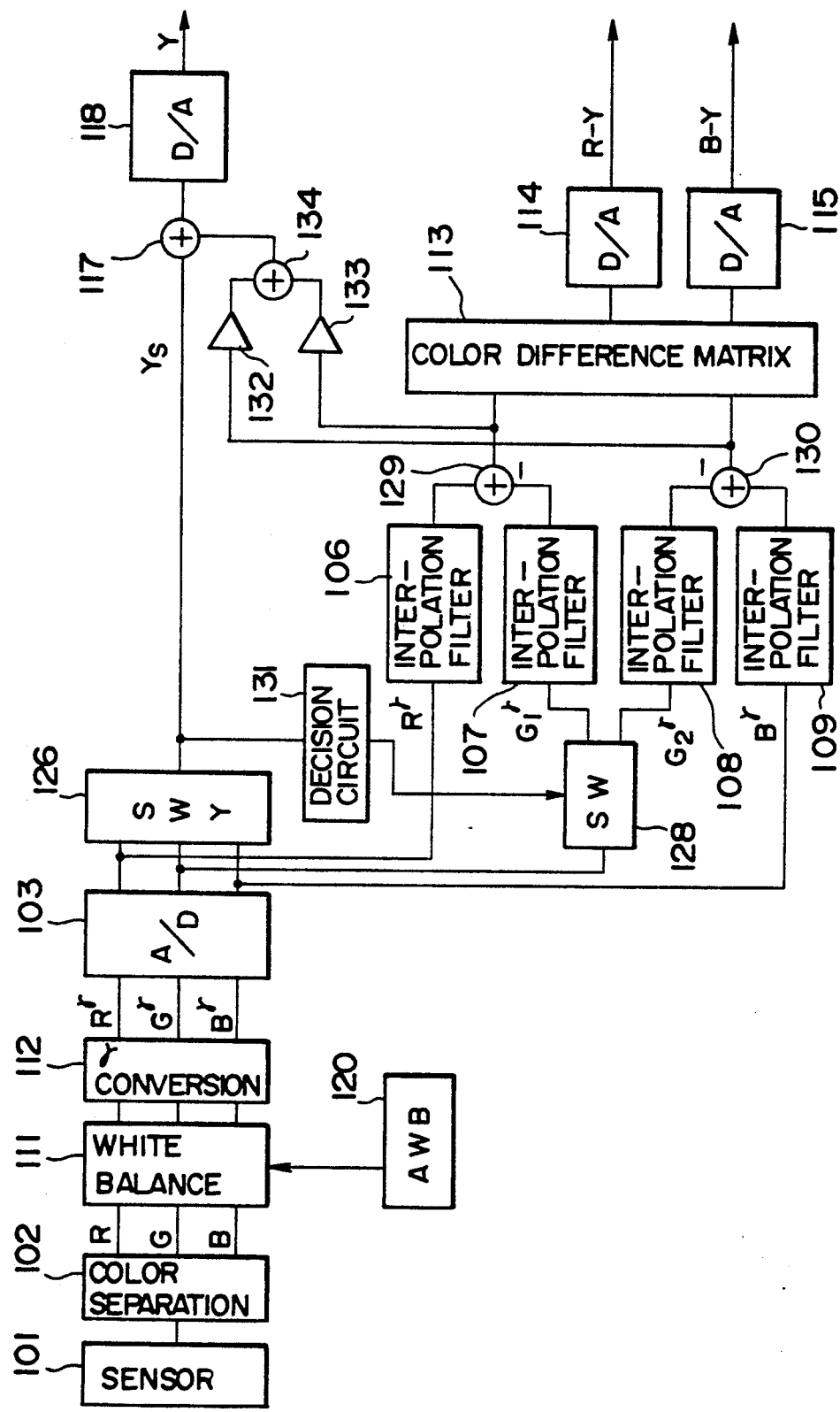
FIG. 55 is a block diagram showing the twenty-second embodiment of the present invention.

FIG. 55 is a block diagram showing a "color image pickup apparatus" as the twenty-second embodiment of the present invention. R, G, and B filters (filter array) having a Bayer array shown in FIG. 4A are arranged in an image pickup element (sensor) 101. An image signal read from the image pickup element 101 pixel by pixel is separated into R, G, and B signals by a color separation unit 102. The R, G, and B signals are subjected to white balance adjustment by a white balance unit 111 on the basis of color temperature information obtained from a white balance sensor (AWB) 120. An output from the white balance unit 111 is subjected to $\gamma$ correction by a $\gamma$ correction unit 112. An output from the $\gamma$ correction unit 112 is A/D-converted by an A/D (analog-to-digital) converter 103.

A luminance signal is switched by a switch circuit (SWY) 126 and is rearranged in a read order. The rearranged luminance signal is extracted as a luminance signal $Y_S$. The luminance signal $Y_S$ is added by an adder 117 to products between constants and a first or third difference signal (R ($\gamma$th power)—$G_1$ ($\gamma$th power)) and a second or fourth difference signal (B ($\gamma$th power)—$G_2$ ($\gamma$th power)) (these signals will be described in detail later). Sum signals are converted by a D/A (digital-to-analog) converter 118, and analog signals are output from the D/A converter 118.

Meanwhile, a G ($\gamma$th power) signal of outputs from the A/D converter 103 is separated by a switch (SW) 128 into $G_1$ ($\gamma$th power) and $G_2$ ($\gamma$th power) signals located at the illustrated positions at two timings, i.e., timing 1 shown in FIG. 56A and timing 2 shown in FIG. 56B. This operation can be performed by operating the switch 128, e.g., every horizontal scanning period. Switching between timings 1 and 2 is performed by a decision circuit 131 (to be described later) in accordance with a luminance signal of an object to be photographed. The separated G ($\gamma$th power) and $G_2$ ($\gamma$th power) signals are input together with an R ($\gamma$th power) signal and a B ($\gamma$th power) signal to interpolation filters 106, 107, 108, and 109, respectively, thereby obtaining coincident R ($\gamma$th power), $G_1$ ($\gamma$th power), $G_2$ ($\gamma$th power), and B ($\gamma$th power) signals. In addition to the coincidence operation by interpolation in the interpolation filters 106 to 109, linear processing such as two-dimensional low-pass filtering and edge emphasis are performed. Since these processing operations are linear processing operations, they can be performed after addition and matrix processing (both will be described in detail later). -

The coincident R ($\gamma$th power) and $G_1$ ($\gamma$th power) signals are subtracted from each other by an adder 129, and the first and third difference signals (R ($\gamma$th power)—$G_1$ ($\gamma$th power)) are output from the adder 129. Similarly, the B ($\gamma$th power) and $G_2$ ($\gamma$th power) signals are subtracted from each other by an adder 130, and the second and fourth signals (B ($\gamma$th power)—$G_2$ ($\gamma$th power)) are output from the adder 130. These output signals are input to a color difference matrix processor 113, and the following matrix operation is performed to derive color difference signals R-Y and B-Y.

$$\begin{bmatrix} R - Y \\ B - Y \end{bmatrix} = \begin{bmatrix} 0.70 & -0.11 \\ -0.30 & +0.89 \end{bmatrix} \begin{bmatrix} R^\gamma - G_1^\gamma \\ B^\gamma - G_2^\gamma \end{bmatrix}$$

Assume that switching between the $G_1$ ($\gamma$th power) and $G_2$ ($\gamma$th power) signals is performed at timing 1 shown in FIG. 56A, and that a monochrome object at a position ($\frac{1}{2}P_H$,0) in the frequency space is picked up by the image pickup element 101. This object represents vertical fringes having a period $2P_H$. For this object, conditions R ($\gamma$th power)=$G_1$ ($\gamma$th power) and B ($\gamma$th power)=$G_2$ ($\gamma$th power) are established. The difference signals (R ($\gamma$th power)—$G_1$ ($\gamma$th power)) signal and (B ($\gamma$th power)—$G_2$ ($\gamma$th power)) respectively output from the adders 129 and 130 become zero. Therefore, the color difference signals R-Y and B-Y output from the color difference matrix processor 113 become zero and are not output. This indicates that the carrier of the color difference signal at the frequency point ($\frac{1}{2}P_H$,0) is canceled. In other words, the carrier of the R (γth power) signal is set in phase with that of the $G_1$ (γth power), and the carrier of the B (γth power) is also in phase with that of the $G_2$ (γth power) signal at the frequency point ($\frac{1}{2}P_H$,0). Since the first and second difference signals (R (γth power)—$G_1$ (γth power)) and (B (γth power)—$G_2$ (γth power)) can cancel their carriers at this frequency, the carriers of the color difference signals are not generated.

Assume that switching between the G (γth power) and $G_2$ (γth power) signals is performed at timing 2 shown in FIG. 56B, and that a monochrome object at a position (0,$\frac{1}{2}P_V$) in the frequency space is picked up by the image pickup element 101. This object represents horizontal fringes having a period $2P_V$. For this object, the difference signals (R (γth power)—$G_1$ (γth power)) and (B (γth power)—$G_2$ (γth power)) respectively output from the adders 129 and 130 become zero. Therefore, the color difference signals R-Y and B-Y output from the color difference matrix processor 113 become zero and are not output. This indicates that the carrier of the color difference signal at the frequency point (0,$\frac{1}{2}P_V$) is canceled. In other words, the carrier of the R (γth power) signal is set in phase with that of the $G_1$ (γth power), and the carrier of the B (γth power) is also in phase with that of the $G_2$ (γth power) signal at the frequency point (0,$\frac{1}{2}P_V$). Since the third and fourth difference signals (R (γth power)—$G_1$ (γth power)) and (B (γth power)—$G_2$ (γth power)) can cancel their carriers at this frequency, the carriers of the color difference signals are not generated.

These color difference signals are converted into analog signals by the D/A converters 114 and 115, and the analog signals are output.

The third difference signal (R (γth power)—$G_1$ (γth power)) and the fourth difference signal (B (γth power)—$G_2$ (γth power)) are multiplied with constants by constant multipliers 132 and 133 and are added to each other by an adder 134. An output from the adder 134 is added to the luminance signal $Y_S$ by the adder 117, thereby obtaining the luminance signal Y whose spectral characteristics are corrected.

The principle of the above operation has been described previously, and a description thereof will be omitted.

When the luminance signal $Y_S$ is obtained by a switching operation of the switch circuit 126, values s, t, u, and w in equation (4) satisfy the following equation:

$$s = t = u = w = 0.25 \quad (8)$$

the following relations are derived from equations (2), (5), and (6):

$\alpha = 0.20, \beta = 0.39,$ $C_1 = 0.05, C_2 = -0.14 \quad (9)$

When the luminance signal $Y_S$ is obtained using the G signal, the values s, t, u, and w are given as follows:

$$s = w = 0, t = u = 0.5 \quad (10)$$

The following relations are then derived from equations (2), (5), and (6):

$\alpha = 0.20, \beta = 0.39,$ $C_1 = 0.30, C_2 = 0.11 \quad (11)$

The luminance signal whose spectral characteristics are corrected as described above is D/A-converted by the D/A converter 118, and an analog signal is output from the D/A converter 118. Since the color difference signals R-Y and B-Y and the low-frequency component $Y_L$ of the luminance signal generally have bandwidths sufficiently narrower than the luminance signal Y, operations of the adders 129 and 130, the color difference matrix processor 113, the adder 117 and the like for the interpolated coincident R (γth power), $G_1$ (γth power), $G_2$ (γth power), and B (γth power) signals may be performed using a clock having a lower clock rate than that of the luminance signal Y by extraction or interlacing.

When an output signal obtained from the apparatus shown in FIG. 55 is to be recorded in an analog form, D/A converters 118, 114, and 115 are necessary. However, when this output signal is recorded in a digital form in a magnetic medium, an optomagnetic medium, an $E^2$PROM (Electrically Erasable PROM), or the like, the above D/A converters can be omitted.

Figure 33:
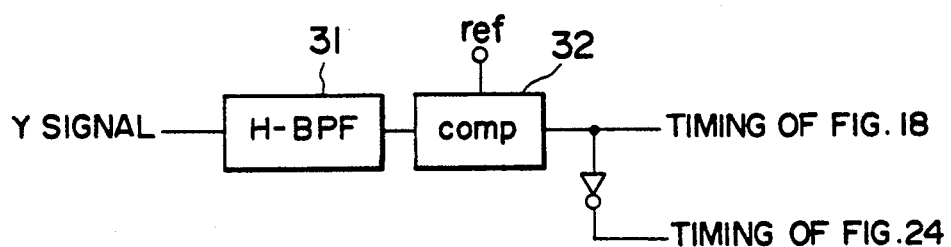
FIG. 33 is a block diagram showing an arrangement of a decision circuit.

A decision circuit 131 can be arranged in the same manner as in FIG. 33 or 34, and a repetitive description will be omitted for descriptive simplicity.

As described above, according to this embodiment, since the color filters constituting the Bayer array are used, the moiré can be minimized, and a high S/N ratio can be obtained. In addition, since the signal processing means suitable for the Bayer array is used, a high resolution can be obtained.

Luminance information whose spectral characteristics are corrected can be obtained by a simple technique.

The twenty-third embodiment of the present invention will be described below.

Figure 57:
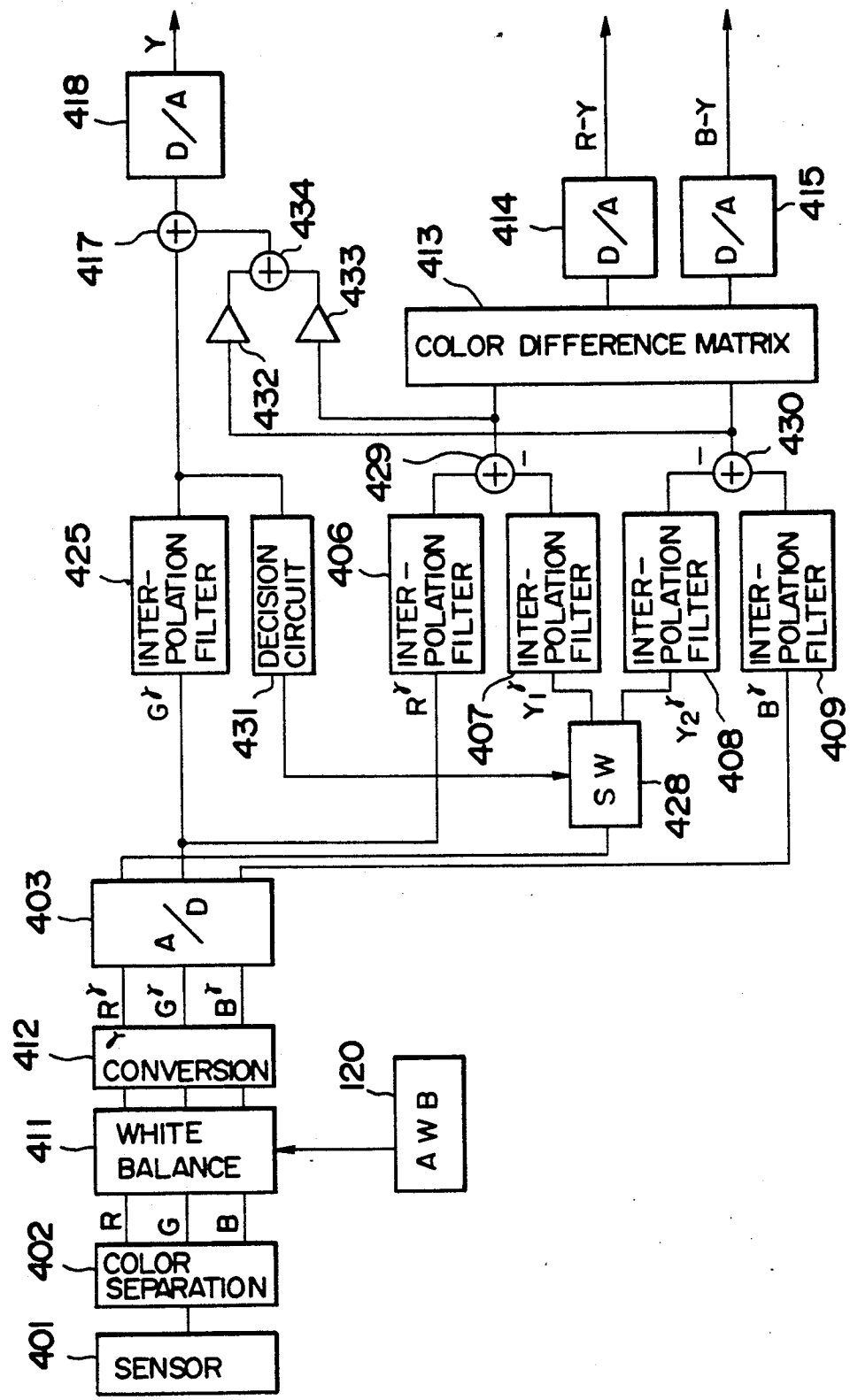
FIG. 57 is a block diagram showing the twenty-third embodiment of the present invention.

FIG. 57 is a block diagram showing a signal processing section of a "color image pickup apparatus" of the twenty-third embodiment of the present invention. R, G, and B filters having a Bayer array shown in FIG. 4A are arranged in an image pickup element (sensor) 401. An image signal read from the image pickup element 401 pixel by pixel is separated into R, G, and B signals by a color separation unit 402. The R, G, and B signals are subjected to white balance adjustment by a white balance unit 411 on the basis of color temperature information obtained from a white balance sensor (AWB) 120. An output from the white balance unit 411 is subjected to Y correction by a Y correction unit 412. An output from the Y correction unit 412 is A/D-converted by an A/D (analog-to-digital) converter 403.

A luminance signal is obtained as follows. An offset sampling structure of a G (γth power) signal is two-dimensionally interpolated by an interpolation filter 425, and an output from the interpolation filter 425 is D/A-converted by a D/A converter 418. An analog signal is thus output from the D/A converter 418. In addition to the coincidence operation by interpolation in the interpolation filter 425, processing such as two-dimensional low-pass filtering and edge emphasis are performed.

Meanwhile, a G (γth power) signal of outputs from the A/D converter 403 is separated by a switch 428 into $G_1$ (γth power) and $G_2$ (γth power) signals located at the illustrated positions at two timings, i.e., timing 1 shown in FIG. 56A and timing 2 shown in FIG. 56B. This operation can be performed by operating the switch 428, e.g., every horizontal scanning period. Switching between timings 1 and 2 is performed by a decision circuit 431 (to be described later) in accordance with a luminance signal of an object to be photographed.

The separated $G_1$ ($\gamma$th power) and $G_2$ ($\gamma$th power) signals are input together with an R ($\gamma$th power) signal and a B ($\gamma$th power) signal to interpolation filters 406, 407, 408, and 409, respectively, thereby obtaining coincident R ($\gamma$th power), $G_1$ ($\gamma$th power), $G_2$ ($\gamma$th power), and B ($\gamma$th power) signals. In addition to the coincidence operation by interpolation in the interpolation filters 406 to 409, linear processing such as two-dimensional low-pass filtering and edge emphasis are performed. Since these processing operations are linear processing operations, they can be performed after addition (to be described in detail later). The coincident R ($\gamma$th power) and $G_1$ ($\gamma$th power) signals are subtracted from each other by an adder 429, and difference signals (R ($\gamma$th power)—$G_1$ ($\gamma$th power)) are output from the adder 429. Similarly, the B ($\gamma$th power) and $G_2$ ($\gamma$th power) signals are subtracted from each other by an adder 430, and difference signals (B ($\gamma$th power)—$G_2$ ($\gamma$th power)) are output from the adder 430. Color difference signals are generated by a color difference matrix processor 413 as in the first embodiment.

Assume that switching between the $G_1$ ($\gamma$th power) and $G_2$ ($\gamma$th power) signals is performed at timing 1 shown in FIG. 56A, and that a monochrome object at a position ($\frac{1}{2}P_H$,0) in the frequency space is picked up by the image pickup element 401. This object represents vertical fringes having a period $2P_H$. For this object, the difference signals (R ($\gamma$th power)—$G_1$ ($\gamma$th power)) and (B ($\gamma$th power)—$G_2$ ($\gamma$th power)) respectively output from the adders 429 and 430 become zero and are not output. This indicates that the carrier of the color difference signal at the frequency point ($\frac{1}{2}P_H$,0) is canceled. In other words, the carrier of the R ($\gamma$th power) signal is set in phase with that of the $G_1$ ($\gamma$th power), and the carrier of the B ($\gamma$th power) is also in phase with that of the $G_2$ l$\gamma$th power) signal at the frequency point ($\frac{1}{2}P_H$,0). Since the first and second difference signals (R ($\gamma$th power)—$G_1$ ($\gamma$th power)) and (B ($\gamma$th power)—$G_2$ ($\gamma$th power)) can cancel their carriers at this frequency, the carriers of the color difference signals are not generated.

Assume that switching between the G ($\gamma$th power) and $G_2$ ($\gamma$th power) signals is performed at timing 2 shown in FIG. 56B, and that a monochrome object at a position (0,$\frac{1}{2}P_V$) in the frequency space is picked up by the image pickup element 401. This object represents horizontal fringes having a period $2P_V$. For this object, the difference signals (R ($\gamma$th power)—$G_1$ ($\gamma$th power)) and (B ($\gamma$th power)—$G_2$ ($\gamma$th power)) respectively output from the adders 429 and 430 become zero. Therefore, the color difference signals R-Y and B-Y output from the adders 429 and 430 become zero and are not output. This indicates that the carrier of the color difference signal at the frequency point (0,$\frac{1}{2}P_V$) is canceled. In other words, the carrier of the R ($\gamma$th power) signal is set in phase with that of the $G_1$ ($\gamma$th power), and the carrier of the B ($\gamma$th power) is also in phase with that of the $G_2$ ($\gamma$th power) signal at the frequency point (0,$\frac{1}{2}P_V$). Since the third and fourth difference signals (R l$\gamma$th power)—$G_1$ ($\gamma$th power)) and (B ($\gamma$th power)—$G_2$ ($\gamma$th power)) can cancel their carriers at this frequency, the carriers of the color difference signals are not generated. These color difference signals are converted into analog signals by the D/A converters 414 and 415, and the analog signals are output. Since the color difference signals R-Y and B-Y generally have bandwidths sufficiently narrower than the luminance signal Y, operations of the adders 429 and 430, and the like for the interpolated coincident R ($\gamma$th power), $G_1$ ($\gamma$th power), $G_2$ ($\gamma$th power), and B ($\gamma$th power) signals may be performed using a clock having a lower clock rate than that of the luminance signal Y by extraction or interlacing.

When an output signal obtained from the processing block shown in FIG. 57 is to be recorded in an analog form, the D/A converters 418, 414, and 415 are necessary. However, when this output signal is recorded in a digital form in a magnetic medium, an optomagnetic medium, an $E^2$PROM (Electrically Erasable PROM), or the like, the above D/A converters can be omitted.

The color filters of the image pickup element need not be R, G, and B filters. As shown in FIG. 47, a Bayer array having a Y filter (i.e., a filter having spectral characteristics close to those of the luminance signal), an R filter, and a B filter respectively corresponding to the first, second, and third filters may be used. As shown in FIG. 48, a Bayer array having a W (white) filter, an R filter, and a B filter respectively corresponding to the first, second, and third filters may be used. Any array can be employed if color difference signals R-Y and B-Y represented by matrix (1) can be obtained by an arithmetic operation using the first to fourth difference signals when the first color signal is separated as shown in FIG. 56A or 56B to form the first to fourth difference signals (the matrix coefficients need not be limited to the specific ones shown in matrix (1) for causing the color difference matrix processor 113 to obtain the color difference signals R-Y and B-Y).

As has been described above, according to the present invention, since the filter array as the Bayer array is arranged in the image pickup element and appropriate signal processing is performed, there is provided a color image pickup apparatus capable of obtaining luminance information whose spectral characteristics are corrected by a simple technique and of obtaining a good image having a high resolution, reduced moiré and a high S/N ratio.

What is claimed is:

1. A color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$; and c. color information forming means having first color signal forming means for forming the color information in accordance with a difference signal between a second color signal and a coincidence signal obtained by causing only a first color signal which is output from a pixel belonging to the same column as that of the second color signal to coincide therewith and a difference signal between a third color signal and a coincidence signal obtained by causing only a first color signal which is output from a pixel belonging to the same column as that of the third color signal to coincide therewith, and second color signal forming means for forming the color information in accordance with a difference signal between a second color signal and a coincidence signal obtained by causing only a first color signal which is output from a pixel belonging to the same row as that of the second color signal to coincide therewith and a difference signal between a third color signal and a coincidence signal obtained by causing only a first color signal which is output from a pixel belonging to the same row as that of the third color signal to coincide therewith, said first and second color signal forming means operating on the basis of the first, second, and third color signals output from pixels corresponding to the first, second, and third color filters, and said color information forming means switching between said first and second color signal forming means in accordance with a frequency component in a scanning direction of the object image or a direction perpendicular to the scanning direction.

2. A color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$; and c. color information forming means for forming the color information in accordance with a difference signal between a second color signal and a coincidence signal obtained by causing only a first color signal which is output from a pixel belonging to the same column or row as that of the second color signal to coincide therewith and a difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters.

3. A color image pickup apparatus for converting an object image into an electrical signal having luminance information and color information, comprising:

a. an image pickup element arranged in a rectangular matrix having pixels arranged at a horizontal pitch $P_a$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. an optical low-pass filter having an optical member for splitting an incident beam into two beams spaced apart from each other by a distance D in a direction forming an angle θ with respect to a scanning direction of the image pickup element in clockwise and counterclockwise directions, said optical low-pass filter being arranged in an image pickup optical system and satisfying the following condition:

$0.8P_HP_V/|P_H\sin\theta + P_V\cos\theta| \leq D \leq 1.2P_HP_V/|P_H\sin\theta + P_V\cos\theta|$ for $0 \leq \theta \leq \pi/2$; and d. color information forming means for forming the color information in accordance with a difference signal between a second color signal and a coincidence signal obtained by causing only a first color signal which is output from a pixel belonging to the same column or row as that of the second color signal to coincide therewith and a difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters.

4. A color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. an optical low-pass filter having an optical member for splitting an incident beam into two beams spaced apart from each other by a distance D in a direction forming an angle θ with respect to a scanning direction of the image pickup element in clockwise and counterclockwise directions, said optical low-pass filter being arranged in an image pickup optical system and satisfying the following condition:

$0.8P_HP_V/|P_H\sin\theta + P_V\cos\theta| \leq D \leq 1.2P_HP_V/|P_H\sin\theta + P_V\cos\theta|$ for $0 \leq \theta \leq \pi/2$; and d. color information forming means having first color signal forming means for forming the color information in accordance with a difference signal between a second color signal and a coincidence signal obtained by causing only a first color signal which is output from a pixel belonging to the same column as that of the second color signal to coincide therewith and a difference signal between a third color signal and a coincidence signal obtained by causing only a first color signal which is output from a pixel belonging to the same column as that of the third color signal to coincide therewith, and second color signal forming means for forming the color information in accordance with a difference signal between a second color signal and a coincidence signal obtained by causing only a first color signal which is output from a pixel belonging to the same row as that of the second color signal to coincide therewith and a difference signal between a third color signal and a coincidence signal obtained by causing only a first color signal which is output from a pixel belonging to the same row as that of the third color signal to coincide therewith, said first and second color signal forming means operating on the basis of the first, second, and third color signals output from pixels corresponding to the first, second, and third color filters, and said color information forming means switching between said first and second color signal forming means in accordance with a frequency component in a scanning direction of the object image or a direction perpendicular to the scanning direction.

5. A color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;
   b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;
   c. an optical low-pass filter having an optical member for splitting an incident beam into two beams spaced apart from each other by a distance D in a direction forming an angle $\theta$ with respect to a scanning direction of the image pickup element in clockwise and counterclockwise directions, said optical low-pass filter being arranged in an image pickup optical system and satisfying the following condition:

$0.8P_H P_V / |P_H \sin\theta + P_V \cos\theta| \leq D \leq 1.2 P_H P_V / |P_H \sin\theta + P_V \cos\theta|$
   for $0 \leq \theta \leq \pi/2$;

d. color information forming means for forming the color information in accordance with a first difference signal between a second color signal and a coincidence signal obtained by causing only a first color signal which is output from a pixel belonging to the same column or row as that of the second color signal to coincide therewith and a second difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters; and
   e. luminance information forming means for forming the luminance information by multiplying the first and second difference signals with constants, respectively, and adding the multiplied signals to a signal obtained by synthesizing at least one of the first, second, and third color signals.

6. A color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;
   b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;
   c. an optical low-pass filter having an optical member for splitting an incident beam into two beams spaced apart from each other by a distance D in a direction forming an angle $\theta$ with respect to a scanning direction of the image pickup element in clockwise and counterclockwise directions, said optical low-pass filter being arranged in an image pickup optical system and satisfying the following condition:

$0.8P_H P_V / |P_H \sin\theta + P_V \cos\theta| \leq D \leq 1.2 P_H P_V / |P_H \sin\theta + P_V \cos\theta|$
   for $0 \leq \theta \leq \pi/2$;

d. color information forming means having first color signal forming means for forming the color information in accordance with a first difference signal between a second color signal and a coincidence signal obtained by causing only a first color signal which is output from a pixel belonging to the same column as that of the second color signal to coincide therewith and a second difference signal between a third color signal and a coincidence signal obtained by causing only a first color signal which is output from a pixel belonging to the same column as that of the third color signal to coincide therewith, and second color signal forming means for forming the color information in accordance with a third difference signal between a second color signal and a coincidence signal obtained by causing only a first color signal which is output from a pixel belonging to the same row as that of the second color signal to coincide therewith and a fourth difference signal between a third color signal and a coincidence signal obtained by causing only a first color signal which is output from a pixel belonging to the same row as that of the third color signal to coincide therewith, said first and second color signal forming means operating on the basis of the first, second, and third color signals output from pixels corresponding to the first, second, and third color filters, and said color information forming means switching between said first and second color signal forming means in accordance with a frequency component in a scanning direction of the object image or a direction perpendicular to the scanning direction; and
   e. luminance information forming means for forming the luminance information by multiplying the first or third difference signal and the second or fourth difference signal with constants, respectively, and adding the multiplied signals to a signal obtained by synthesizing at least one of the first, second, and third color signals.

7. A color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. color information forming means for forming the color information in accordance with a first difference signal between a second color signal and a coincidence signal obtained by causing only a first color signal which is output from a pixel belonging to the same column or row as that of the second color signal to coincide therewith and a second difference signal between a third color signal and a coincidence signal obtained by causing only a first color signal which is output from a pixel belonging to the same column or row as that of the third color signal to coincide therewith on the basis of the first, second, and third color signals output from pixels corresponding to the first, second, and third color filters; and d. luminance information forming means for forming the luminance information by multiplying the first and second difference signals with constants, respectively, and adding the multiplied signals to a signal obtained by synthesizing at least one of the first, second, and third color signals.

8. A color image pickup apparatus for converting an object image into an electrical signal having luminance information and color information, comprising:

a. an image pickup element arranged in a rectangular matrix having pixels arranged at a horizontal pitch $P_H$ and a vertical pitch $P_V$;

b. a color filter array having first color filters arranged in correspondence with the pixels and having an offset sampling structure having a horizontal pitch $2P_H$ and a vertical pitch $P_V$ and offset by $P_H$ in a horizontal direction, and second and third color filters each having a rectangular matrix sampling structure having a horizontal pitch $2P_H$ and a vertical pitch $2P_V$;

c. color information forming means having first color signal forming means for forming the color information in accordance with a first difference signal between a second color signal and a coincidence signal obtained by causing only a first color signal which is output from a pixel belonging to the same column as that of the second color signal to coincide therewith and a second difference signal between a third color signal and a coincidence signal obtained by causing only a first color signal which is output from a pixel belonging to the same column as that of the third color signal to coincide therewith, and second color signal forming means for forming the color information in accordance with a third difference signal between a second color signal and a coincidence signal obtained by causing only a first color signal which is output from a pixel belonging to the same row as that of the second color signal to coincide therewith and a fourth difference signal between a third color signal and a coincidence signal obtained by causing only a first color signal which is output from a pixel belonging to the same row as that of the third color signal to coincide therewith, said first and second color signal forming means operating on the basis of the first, second, and third color signals output from pixels corresponding to the first, second, and third color filters, and said color information forming means switching between said first and second color signal forming means in accordance with a frequency component in a scanning direction of the object image or a direction perpendicular to the scanning direction; and d. luminance information forming means for forming the luminance information by multiplying the first or third difference signal and the second or fourth difference signal with constants, respectively, and adding the multiplied signals to a signal obtained by synthesizing at least one of the first, second, and third color signals.

* * * * *

UNITED STATES PATENT AND TRADEMARK OFFICE
CERTIFICATE OF CORRECTION

PATENT NO. : 5,253,046
DATED : October 12, 1993
INVENTOR(S) : Akihiro Shikaishi

It is certified that error appears in the above-indentified patent and that said Letters Patent is hereby corrected as shown below:

Col. 11, line 61.  Change "($\sim P_H$,O)" to -- (1/2 $P_H$,O) --

Col. 12, line 9.  Change "—G" to -- —$G_1$ --

Col. 12, line 23. Change "—$G_2$" to -- —$G_1$ --

Col. 13, line 8.  Change "show" to -- shown --

Col. 14, line 7.  Change "Y" to -- $Y_1$ --

Col. 16, line 16. Change "$\gamma G_1$" to -- —$G_1$ --

Col. 17, line 29. After "space" insert -- is picked up by the --

Col. 17, line 30. Change "Object" to -- object --

Col. 17, line 46. Change "—G" to -- —$G_1$ --

Col. 18, line 42. Change "$2P_2$" to -- $2P_H$ --

Col. 20, line 33. Change "Yr" to -- $Y_L$ --

Col. 22, line 21. Change "low-pas" to -- low-pass --

Col. 22, line 47. Change "G ($\gamma$th power)," to -- $G_1$ ($\gamma$th power), --

Col. 22, line 50. Change "signal" to -- signals -- and after "signals" insert -- i.e., the (R ($\gamma$th power) -$G_1$ ($\gamma$th power)) --

Col. 27, line 14. Change "G ($\gamma$th power)," to -- $G_1$ ($\gamma$th power), --

Col. 27, line 50. Change "$\gamma R^\gamma$" to -- $\delta R^\gamma$ --

Col. 28, line 12. Change "($\leq 1$)," to -- (=1), -- and change " so that $B+\epsilon \leq u+w$" to -- so that $B+\epsilon = u+w$ --

UNITED STATES PATENT AND TRADEMARK OFFICE
CERTIFICATE OF CORRECTION

PATENT NO. : 5,253,046
DATED : October 12, 1993
INVENTOR(S) : Akihiro Shikaishi

It is certified that error appears in the above-indentified patent and that said Letters Patent is hereby corrected as shown below:

Col. 29, line 62. Change "Carriers" to -- carriers --

Col. 29, line 64. Change "$\Theta_1 = \Theta_2 \pi/4$" to -- $\Theta_1 = \Theta_2 = \pi/4$ --

Col. 30, line 18. Change "D" to -- $D_1$ --

Col. 30, line 51. Change "low-pas" to -- low-pass --

Col. 30, line 63. Change "G (γth power)" to -- $G_1$ (γth power) --

Col. 35, line 44. Change "G (γth power)" to -- $G_1$ (γth power) --

Col. 36, line 8. Change " $Y_L \delta R^\gamma a G_1^\gamma + BG_2^\gamma + \varepsilon B^\gamma$ " to -- $Y_L = \delta R^\gamma + a G_1^\gamma + BG_2^\gamma + \varepsilon B^\gamma$ --

Col. 36, line 49. Change "$C_2 = S$" to -- $C_2 = \varepsilon$ --

Col. 36, line 53. Change " $C_1 (R^\gamma G_1^\gamma)$ " to -- $C_1 (R^\gamma \cdot G_1^\gamma)$ --

Col. 37, line 37. Change "$(1/2P_s, 0)$" to -- $(1/2P_H, 0)$ --

Col. 40, line 29. Change "G (γth power)" to -- $G_1$ (γth power) --

Col. 41, line 15. Change "G (γth power)" to -- $G_1$ (γth power) --

Col. 43, line 50. Change "G (γth power)" to -- $G_1$ (γth power) --

Col. 43, line 68. Change " lγth power) " to -- (γth power) --

Col. 45, line 60. Change "Pa" to -- $P_H$ --

UNITED STATES PATENT AND TRADEMARK OFFICE
CERTIFICATE OF CORRECTION

PATENT NO. : 5,253,046
DATED : October 12, 1993
INVENTOR(S) : Akihiro Shikaishi

It is certified that error appears in the above-indentified patent and that said Letters Patent is hereby corrected as shown below:

Col. 48, line 16. Change "8" to -- $\ominus$ --

Signed and Sealed this

Twelfth Day of July, 1994

Attest:

BRUCE LEHMAN

Attesting Officer     Commissioner of Patents and Trademarks